US012715098B2

(12) United States Patent
Yuge et al.

(10) Patent No.: US 12,715,098 B2
(45) Date of Patent: Aug. 25, 2026

(54) WORK MACHINE

(71) Applicant: Koki Holdings Co., Ltd., Tokyo (JP)

(72) Inventors: Fumiya Yuge, Ibaraki (JP); Keita Saito, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/993,583

(22) PCT Filed: Jul. 21, 2023

(86) PCT No.: PCT/JP2023/026863

§ 371 (c)(1),
(2) Date: Jan. 13, 2025

(87) PCT Pub. No.: WO2024/024685

PCT Pub. Date: Feb. 1, 2024

(65) Prior Publication Data

US 2026/0014689 A1 Jan. 15, 2026

(30) Foreign Application Priority Data

Jul. 29, 2022 (JP) ................................ 2022-121654

(51) Int. Cl.
*B25F 5/00* (2006.01)
*B25F 5/02* (2006.01)

(52) U.S. Cl.
CPC .............. *B25F 5/001* (2013.01); *B25F 5/026* (2013.01)

(58) Field of Classification Search
CPC ................................ B25F 5/001; B25F 5/026
See application file for complete search history.

(56) References Cited

U.S. PATENT DOCUMENTS 10,940,580 B2 * 3/2021 Brennenstuhl .......... F16D 43/20
2013/0161040 A1 6/2013 Tomayko et al.
2018/0361558 A1 * 12/2018 Fuchs .................... B25F 5/001
(Continued)

FOREIGN PATENT DOCUMENTS

CN 105772799 7/2016
DE 9016415 7/1991
EP 2062694 5/2009
(Continued)

OTHER PUBLICATIONS

"Search Report of Europe Counterpart Application", issued on Oct. 23, 2025, p. 1-p. 9.
(Continued)

*Primary Examiner* — Michelle Lopez
(74) *Attorney, Agent, or Firm* — JCIPRNET

(57) ABSTRACT

Provided is a work machine that offers good repairability. A work machine 1 comprises an output switching unit 6 that switches the output of an output unit 7 (presence or lack of torque or vibration), and that is disposed so as to be sandwiched between the output unit 7 and a transmission unit 5. When the transmission unit 5 is removed from the output unit 7, the output switching unit 6 can be removed rearward from the output unit 7. Specifically, upon removing a screw 133 and removing a gear case 140 from a front case 340 (removing the transmission unit 5 from the output unit 7), the output switching unit 6 can be removed rearward from the output unit 7.

9 Claims, 34 Drawing Sheets

4

(56) References Cited

U.S. PATENT DOCUMENTS

| | | | | |
|---|---|---|---|---|
| 2020/0238483 | A1* | 7/2020 | Kamiya | B25B 21/00 |
| 2021/0170564 | A1* | 6/2021 | Gehret | F16H 3/663 |

FOREIGN PATENT DOCUMENTS

| | | |
|---|---|---|
| EP | 2184138 | 1/2013 |
| JP | 2006263914 | 10/2006 |
| JP | 2014018914 | 2/2014 |
| JP | 2015191735 | 11/2015 |
| JP | 2017080853 | 5/2017 |

OTHER PUBLICATIONS

"International Search Report (Form PCT/ISA/210) of PCT/JP2023/026863", mailed on Oct. 3, 2023, with English translation thereof, pp. 1-4.

* cited by examiner

WORK MACHINE

CROSS-REFERENCE TO RELATED APPLICATION

This application is a 371 application of the International PCT application serial no. PCT/JP2023/026863, filed on Jul. 21, 2023, which claims the priority benefits of Japan Patent Application No. 2022-121654, filed on Jul. 29, 2022. The entirety of each of the above-mentioned patent applications is hereby incorporated by reference herein and made a part of this specification.

TECHNICAL FIELD

The invention relates to a work machine.

RELATED ART

Patent Documents 1 and 2 disclose work machines such as driver drills. Patent Document 3 discloses a work machine with a detachable handle.

The work machine such as a driver drill includes a motor, a spindle, a transmission mechanism that transmits the rotation of the motor to the spindle, a chuck screwed to the spindle, a deceleration ratio switching mechanism that switches the deceleration ratio of the transmission mechanism, and a clutch mechanism that interrupts, at a predetermined torque, the rotation transmission from the transmission mechanism to the spindle.

The deceleration ratio switching mechanism has a shift knob operated by the user and a shift arm for advancing and retracting a slide ring gear of a transmission mechanism in conjunction with the operation of the shift knob. A clutch mechanism has a clutch dial for the user to change a predetermined torque. A driver drill with a vibration function, such as the one in Patent Document 2, is also referred to as a vibration driver drill, and the presence or absence of vibration can also be switched by operating the clutch dial.

PRIOR ART DOCUMENT(S)

Patent Document(s)

Patent Document 1: Japanese Laid-open Publication No. 2014-018914

Patent Document 2: Japanese Laid-open Publication No. 2015-191735

Patent Document 3: Japanese Laid-open Publication No. 2017-80853

SUMMARY OF INVENTION

Technical Problem

In a work machine such as a driver drill, a chuck and a spindle are fixed with high torque, and a special jig is required to release the fixation. In other words, without the special jig, the chuck and the spindle substantially serve as an integral tip tool holding part. Therefore, it is difficult to replace parts that cannot be removed without releasing the fixation of the chuck and spindle. A conventional work machine has many parts that are difficult to replace, resulting in poor repairability. The first issue recognized by the inventor of the invention is to provide a work machine with good repairability.

In a work machine such as a driver drill, the drill mode with maximum torque is set by fixing a ring gear of the transmission mechanism to be not rotatable. As a structure for setting the drill mode, a structure is formed in which a nut that rotates with a clutch dial and moves axially pushes a stopper pin toward the ring gear side. Here, depending on the rotational position of the ring gear, a portion of the ring gear may be present in the extension of the stopper pin. In such structure, if the stopper pin abuts against the portion, the clutch dial becomes unable to rotate, making it not possible to transition to the drill mode. As a result, the usability is poor. The second issue recognized by the inventor of the invention is to provide a work machine that can suppress the malfunction of being unable to make the ring gear non-rotatable.

In a work machine such as a driver drill, in the case of a structure where a transmission mechanism is accommodated in multiple cases divided in the front-rear direction, by fixing the cases in the front-rear direction by using a fixing part such as a screw, the rigidity of the cases can be increased and deformation can be suppressed by fixing multiple cases. In a structure in which a shift arm passes the outer side of the fixing part in the radial direction of the case, the size of the product increases in the radial direction. The third issue recognized by the inventor of the invention is to provide a work machine that can prevent the size from increasing.

In the work machine such as a vibration driver drill, when the operation amount required for the clutch dial to switch between vibration and non-vibration modes is large, it takes more effort to switch between vibration and non-vibration, resulting in poor workability. The fourth issue recognized by the inventor of the invention is to provide a work machine that can reduce the effort required to switch between vibration and non-vibration.

As a structure in which a handle is detachable to a work machine, a structure is known where an annular mounting part is provided with a gap (opening) in a portion in the peripheral direction is attached to the work machine in a way that closes the gap. In the structure, when the maximum length of the gap in the mounting part is the natural length, it may be difficult to attach or detach the handle. The fifth issue recognized by the inventor of the invention is to provide a handle that can be easily attached to and detached from the work machine, and a work machine provided with a handle that can be easily attached and detached.

When the handle is not movable in a state of being mounted to the work machine, it may be inconvenient as fine adjustment to the mounting state cannot be made. The sixth issue recognized by the inventor of the invention is to provide a handle that allows fine adjustment to the mounting state of the work machine, and a work machine provided with a handle that allows fine adjustment in the mounting state.

An objective of the invention is to provide a work machine that at least solves the first issue among the above issues.

Solution to Problem

An aspect of the invention provides a work machine. The work machine includes: an output part, having a tip tool holding part, and a bearing part supporting the tip tool holding part, the output part being positioned on one side of the motor in an axial direction of the motor; a transmission part, configured as a transmission part that transmits a driving force of the motor to the tip tool holding part, and detachably assembled to the output part from an other side in the axial direction to be positioned on the one side of the motor in the axial direction; and an output switching part, configured as an output switching part that switches an output of the output part, and disposed by being sandwiched between the output part and the transmission part. When the transmission part is removed from the output part, the output switching part is able to be removed from the output part toward the other side in the axial direction The invention may also be expressed as "electric work machine", "electric tool", or "electric device", and such expressions are also valid as aspects of the invention.

Effects of Invention

According to the invention, a work machine having solved at least the first issues among the above issues can be provided.

DESCRIPTION OF EMBODIMENTS

Figure 1:
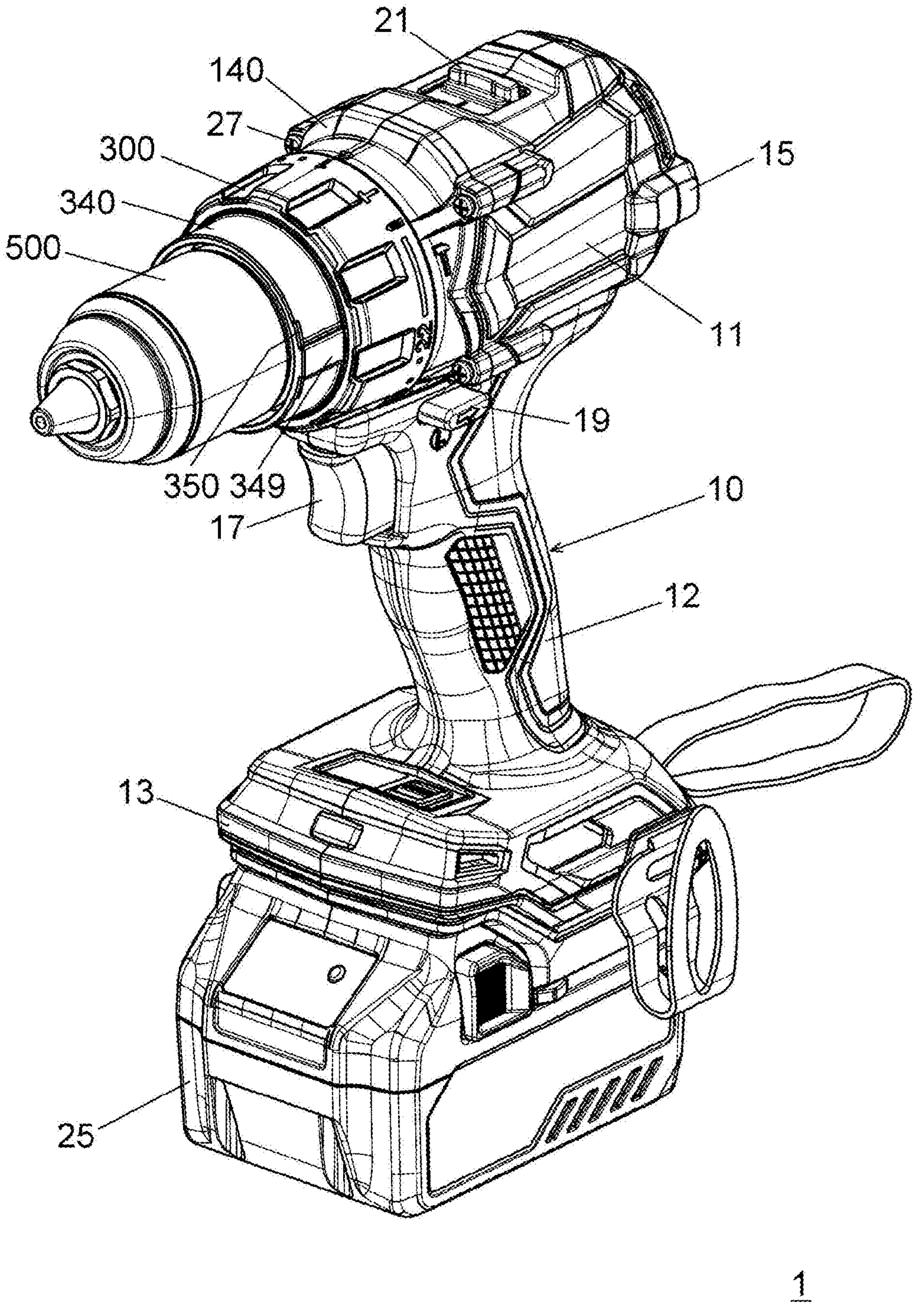
FIG. 1 is a perspective view of a work machine 1 according to an embodiment of the invention, as seen from the front side.
Figure 2:
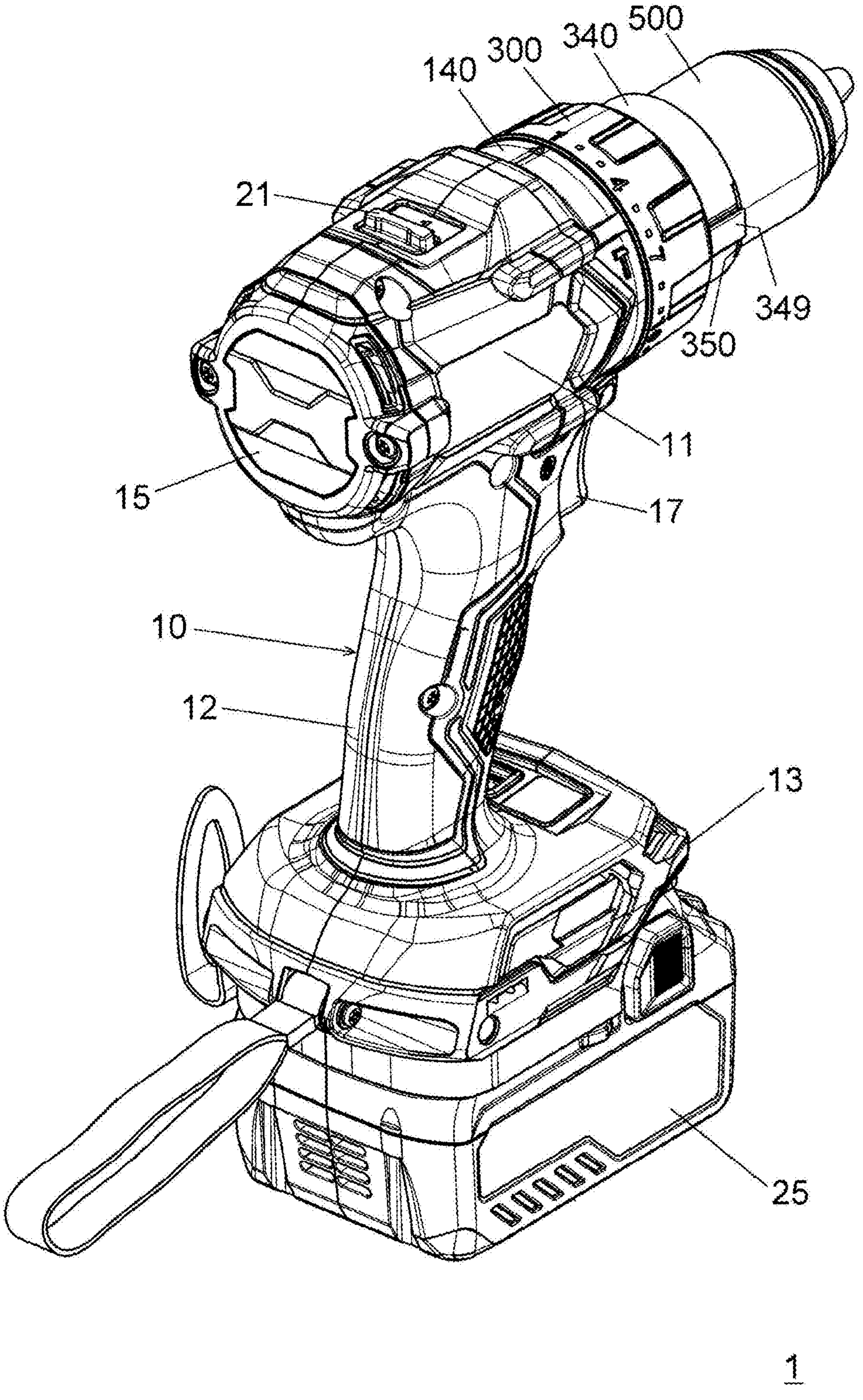
FIG. 2 is a perspective view of the work machine 1 as seen from the rear side.
Figure 3:
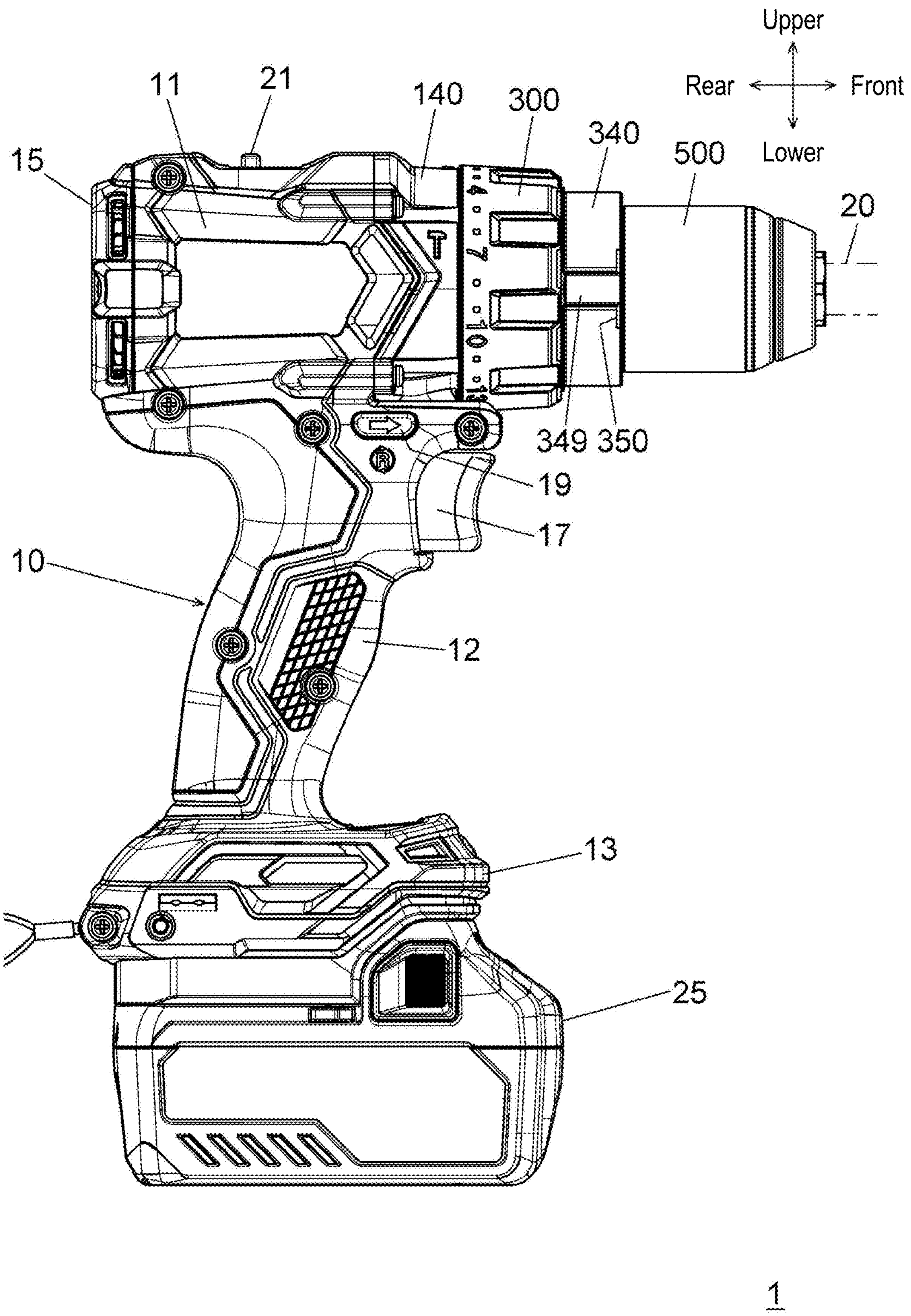
FIG. 3 is a right side view of the work machine 1.

An embodiment of the invention relates to a work machine 1. The work machine 1 is a vibration driver drill. Based on FIGS. 3 and 4, front-rear and up-down directions of the work machine 1 orthogonal to each other are defined. Additionally, the left-right direction, which is perpendicular to both the front-rear and up-lower directions, is defined based on an operator facing the front.

The front-rear direction is parallel to the axial direction of a motor shaft 31. The front side corresponds to a side of the axial direction. The rear side corresponds to the other side of the axial direction. The up-lower direction is a direction that connects the motor accommodation part 11 and the battery pack mounting part 13 and is perpendicular to the front-rear direction.

As shown in FIGS. 1 to 4, the work machine 1 includes a housing 10. The housing 10 is, for example, a resin molded body with a left-right split structure. The housing 10 has a motor accommodation part 11, a handle part 12, and a battery pack mounting part 13.

The motor accommodation part 11 is a tubular part in which the central axis is parallel to the front-rear direction. The work machine 1 includes a tail cover 15 that covers a rear opening of the motor accommodation part 11. The work machine 1 includes a shift knob 21 on the upper part of the motor accommodation part 11. The shift knob 21 is a deceleration ratio switching operation part that rotates a shift arm 71 appearing in FIGS. 5 to 7 to move a slide ring gear 57 (to be described afterwards) forward and rearward, and switches the deceleration ratio of the transmission mechanism 50 shown in FIG. 5. The shift arm 71 is, for example, made of metal and corresponds to the deceleration ratio switching part.

The handle part 12 extends downward from the lower part of the motor accommodation part 11. The work machine 1 includes a trigger switch 17 at the upper end of the handle part 12. The trigger switch 17 is able to switch the motor 30 between drive and stop. The work machine 1 includes a forward-reverse switch 19 at a boundary portion between the motor accommodation part 11 and the handle part 12, and the forward-reverse switch 18 is able to switch the motor 30 between forward and reverse rotation.

Figure 4:
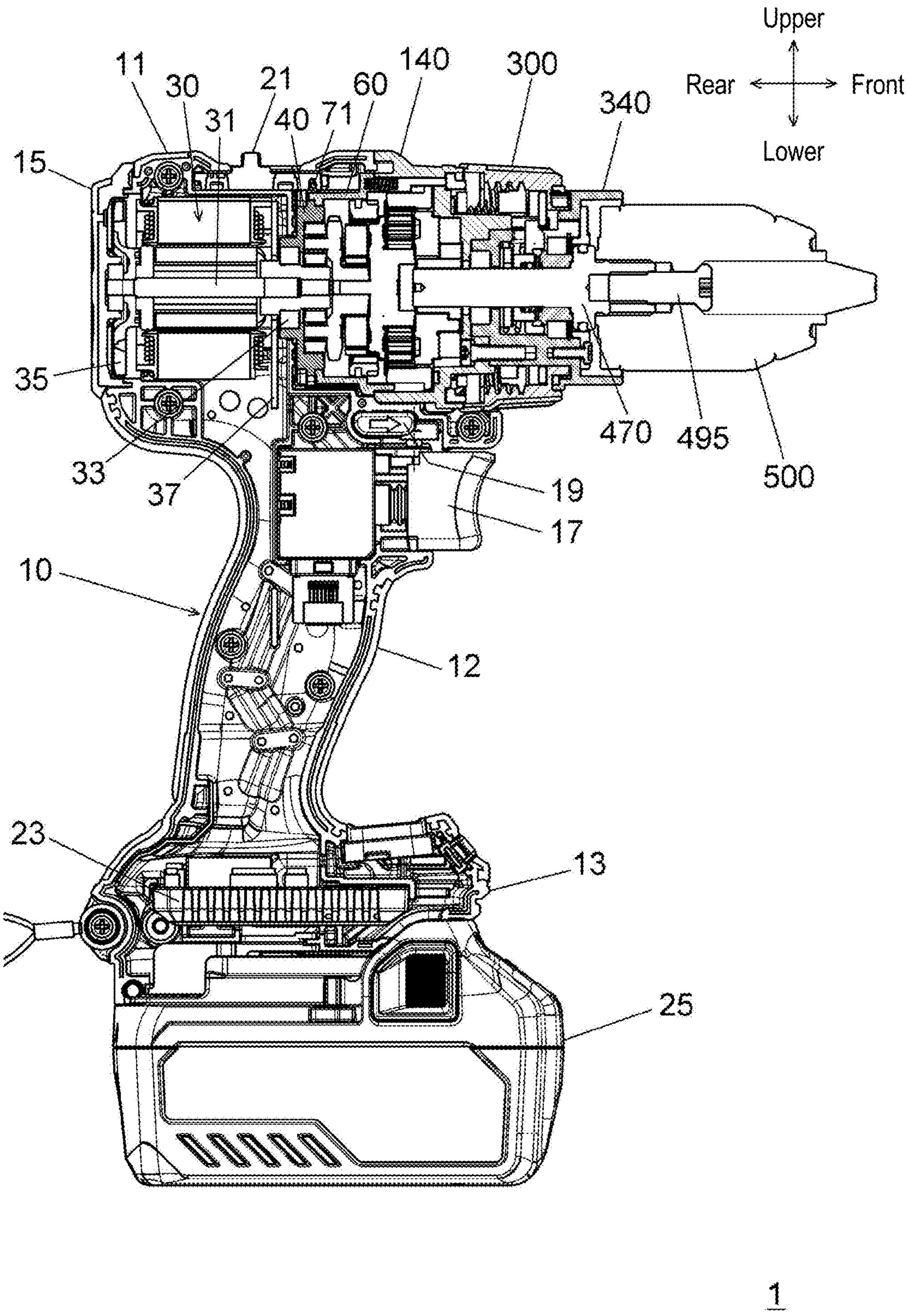
FIG. 4 a right side cross-sectional view of the work machine 1.

The battery pack mounting part 13 is connected to the lower end of the handle part 12. The battery pack mounting part 13 detachably mounts a battery pack 25 which serves as the power source for the work machine 1. As shown in FIG. 4, the work machine 1 includes a control substrate part 23 inside the battery pack mounting part 13. The control substrate part 23 is equipped with a microcontroller that controls the drive of the motor 30, an inverter circuit for supplying current to the motor 30, among other components.

As shown in FIG. 4, the work machine 1 includes a motor 30, a fan 35, and a sensor substrate 37 inside the motor accommodation part 11. The motor 30 is, for example, an inner rotor type brushless motor and driven by the power from the battery pack 25. The motor 30 has the motor shaft 31 which serves as an output shaft. The fan 35 is provided at the rear of the main body of the motor 30 (the part of the motor 30 excluding the motor shaft 31), rotates integrally with the motor shaft 31, and generates cooling air to cool the motor 30, etc. The sensor substrate 37 is provided at the front of the main body of the motor 30. The sensor substrate 37 is equipped with magnetic sensors such as Hall ICs that output signals corresponding to the rotational position of the motor 30.

(Structure of transmission and output configuration part 4)

FIGS. 5 to 20 relate to the structure of a transmission and output configuration part 4 (transmission and output unit) of the work machine 1. That is, FIGS. 5 to 20 relate to the structure of the portion in front of the motor 30.

The transmission and output configuration part 4 includes a motor spacer 40 serving as a lid of the first case.

Figure 6:
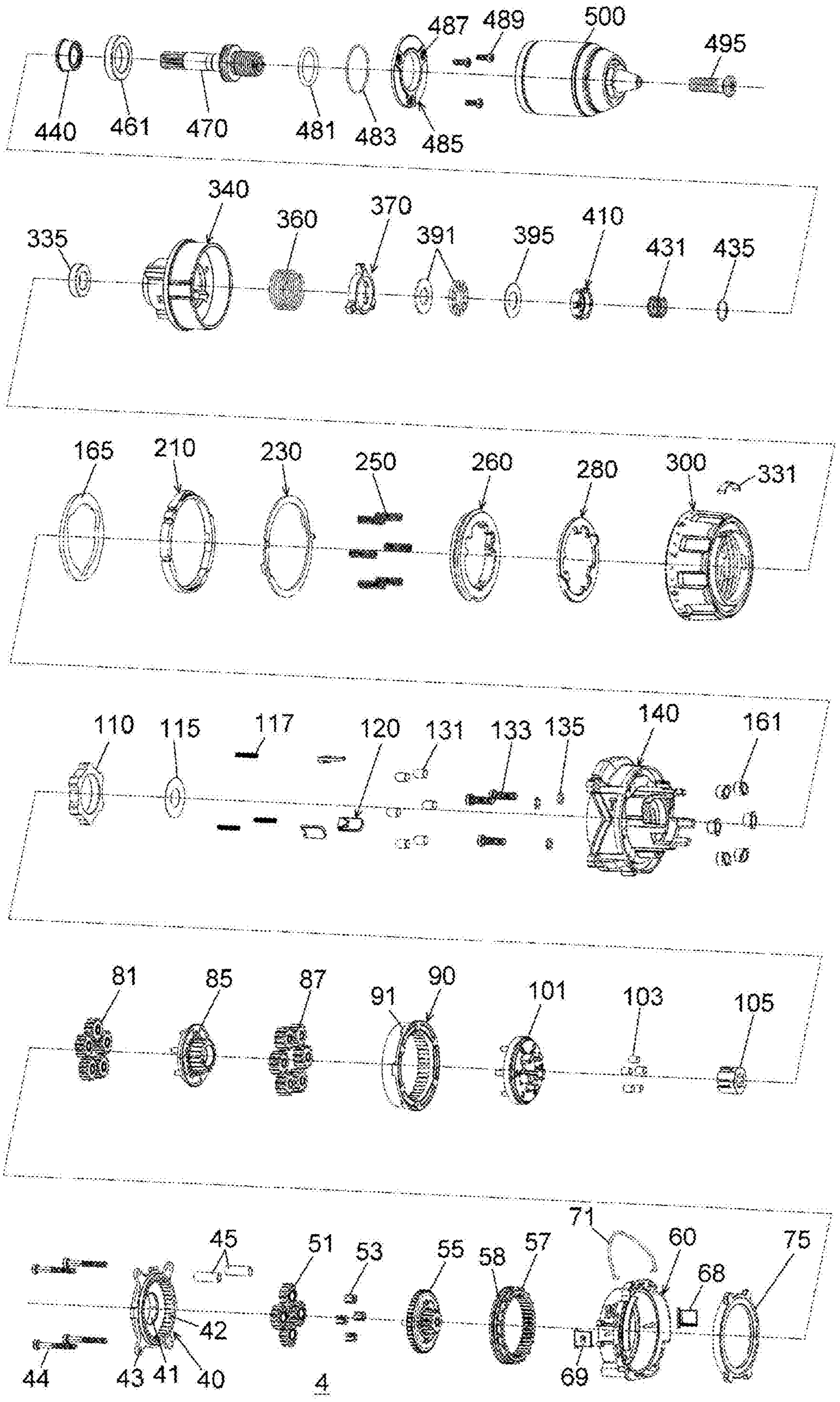
FIG. 6 is an exploded perspective view of the transmission and output configuration part 4, and is a perspective view seen from the front side.
Figure 7:
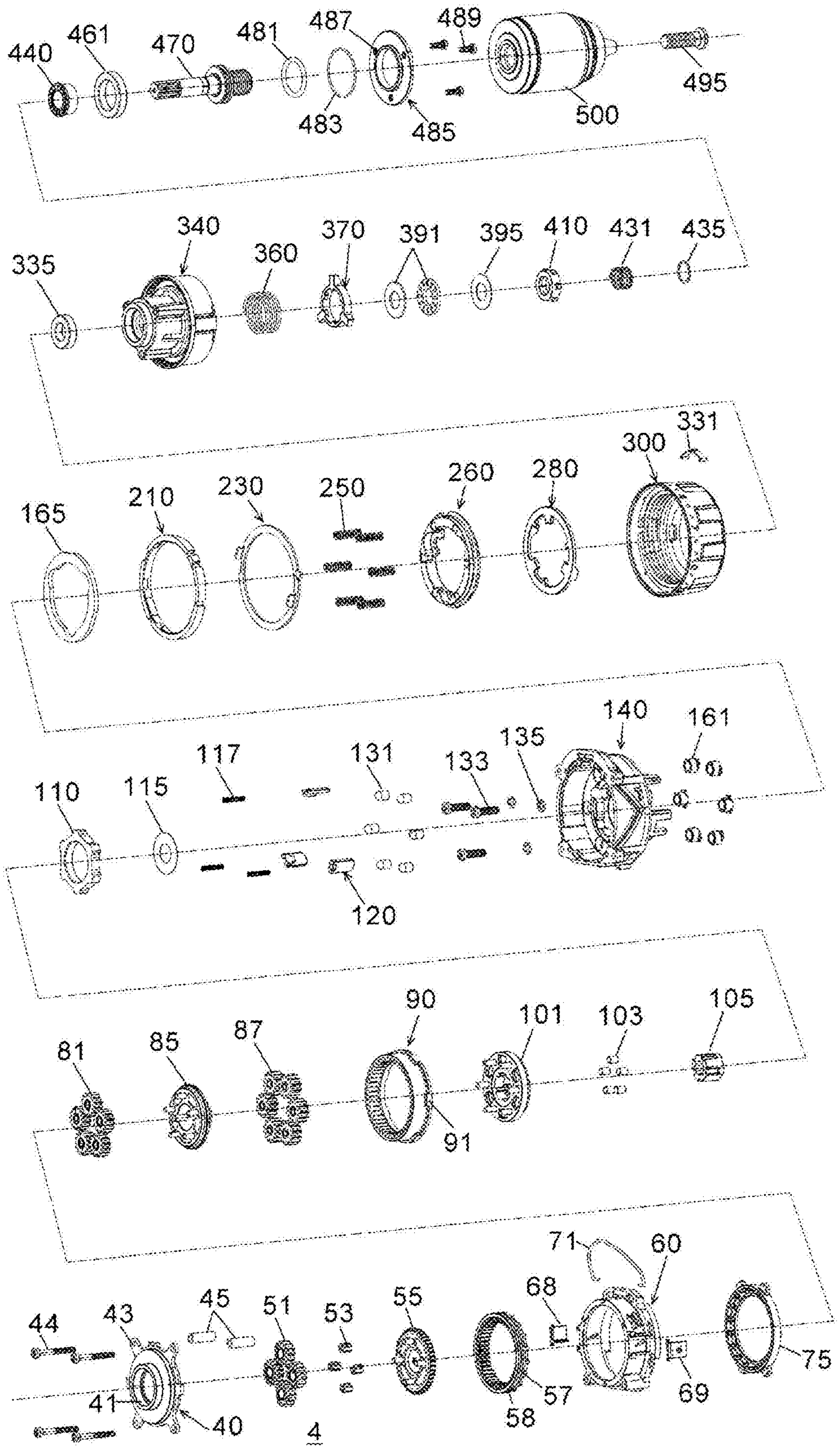
FIG. 7 is an exploded perspective view of the transmission and output configuration part 4, and is a perspective view seen from the rear side.
Figure 8A:
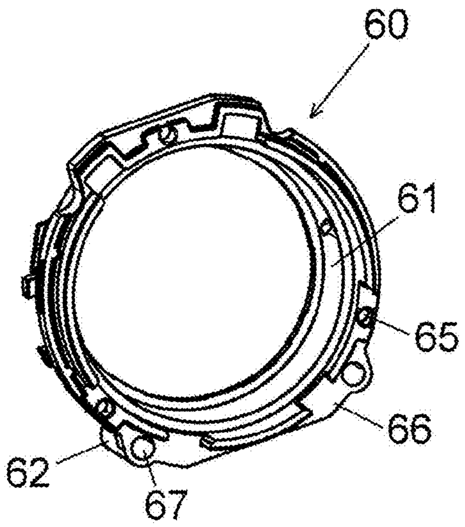
FIG. 8A is a perspective view of a rear case 60 appearing in FIGS. 5 to 7, as seen from the front side.
Figure 8B:
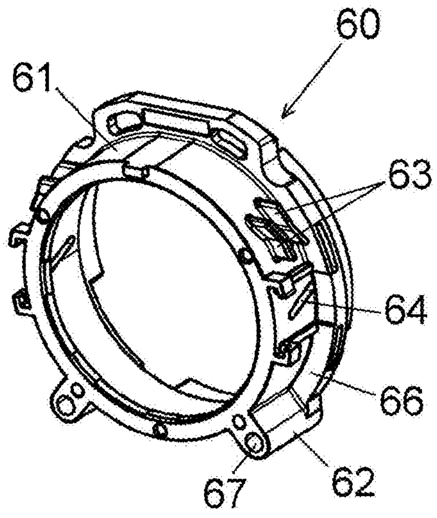
FIG. 8B is a perspective view of the rear case 60 as seen from the rear side.
Figure 8C:
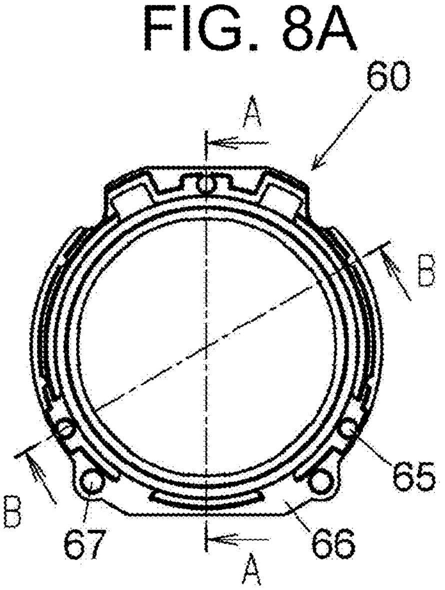
FIG. 8C is a front view of the rear case 60.
Figure 8D:
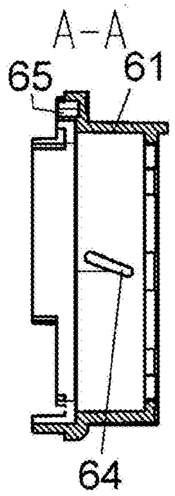
FIG. 8D is a cross-sectional view along line A-A in FIG. 8C.
Figure 8E:
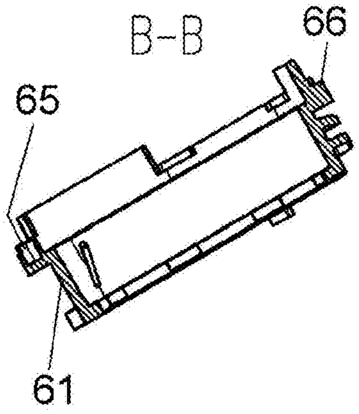
FIG. 8E is a cross-sectional view along line B-B in FIG. 8C.
Figure 8F:
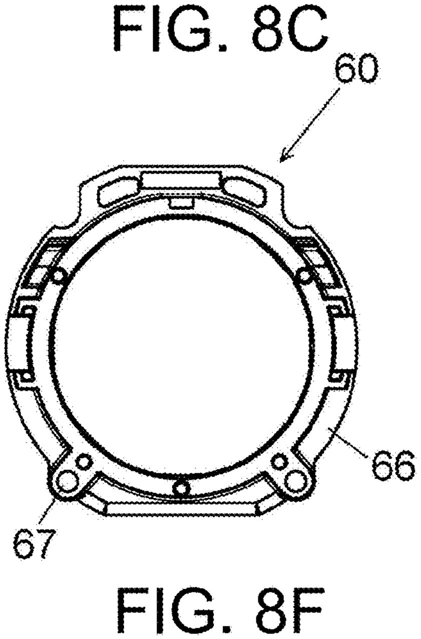
FIG. 8F is a rear view of the rear case 60.
Figure 8G:
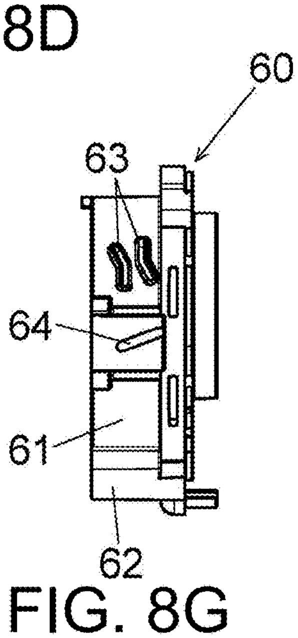
FIG. 8G is a right side view of the rear case 60.
Figure 9A:
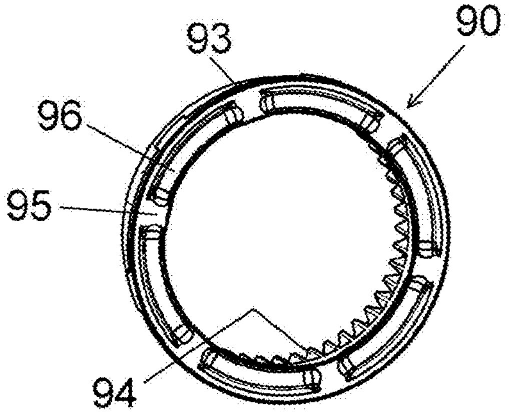
FIG. 9A is a perspective view of a final ring gear 90 appearing in FIGS. 5 to 7, as seen from the front side.
Figure 9B:
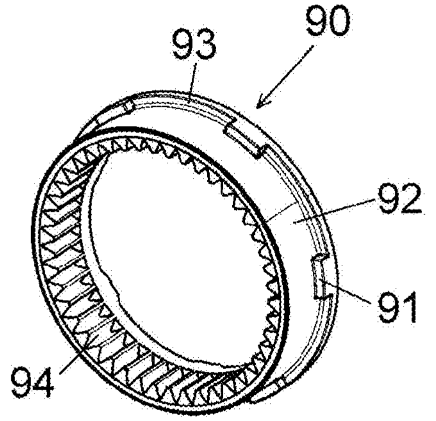
FIG. 9B is a perspective view of the final ring gear 90 as seen from the rear side.
Figure 9C:
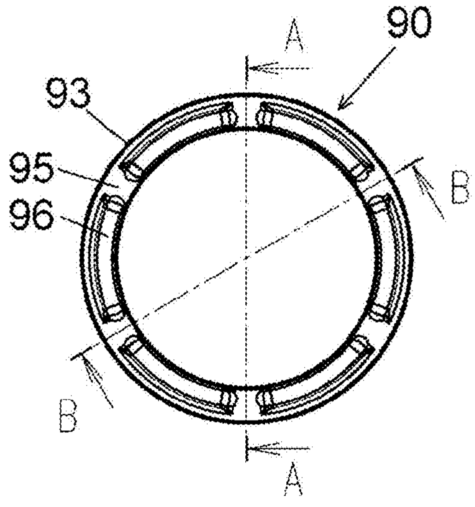
FIG. 9C is a front view of the final ring gear 90.
Figure 9D:
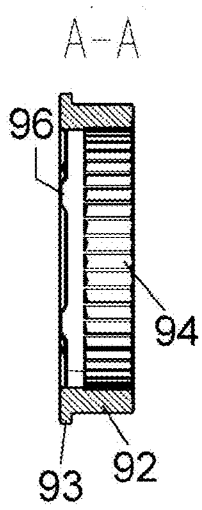
FIG. 9D is a cross-sectional view along line A-A in FIG. 9C.
Figure 9E:
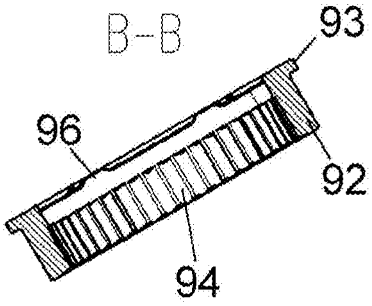
FIG. 9E is a cross-sectional view along line B-B in FIG. 9C.
Figure 9F:
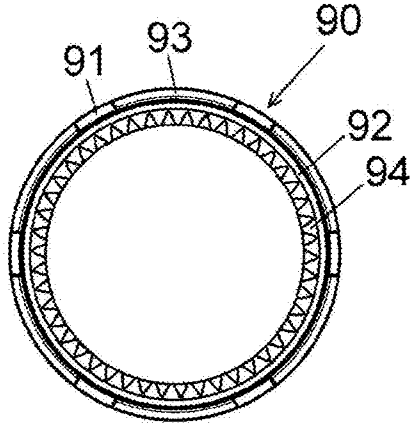
FIG. 9F is a rear view of the final ring gear 90.
Figure 9G:
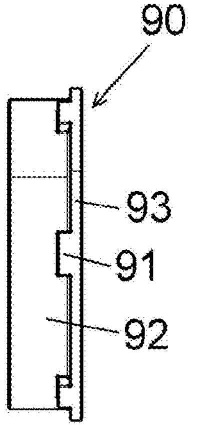
FIG. 9G is a right side view of the final ring gear 90.
Figure 10A:
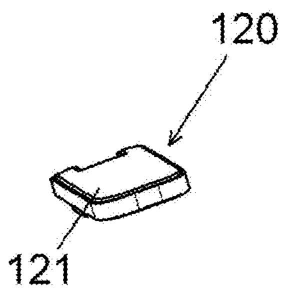
FIGS. 10A to 10D are perspective views of a stopper block 120 appearing in FIGS. 5 to 7, as seen from different viewpoints.
Figure 10B:
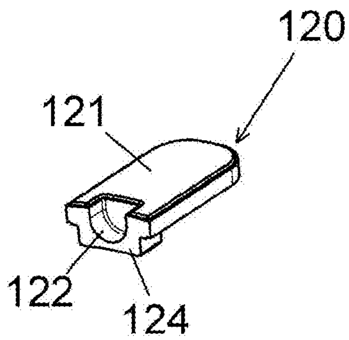
Figure 10C:
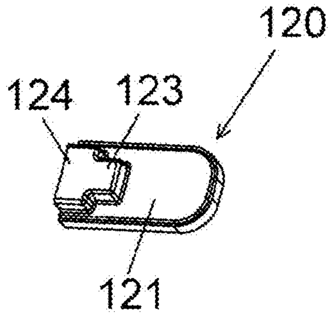
Figure 10D:
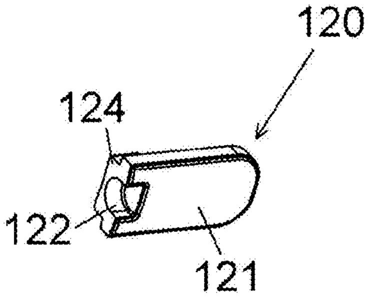
Figure 10E:
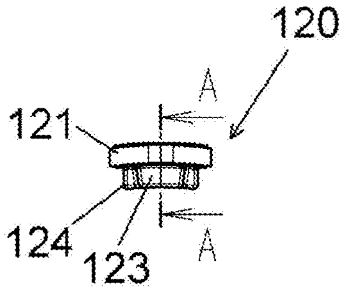
FIG. 10E is a front view of the stopper block 120.
Figure 10F:
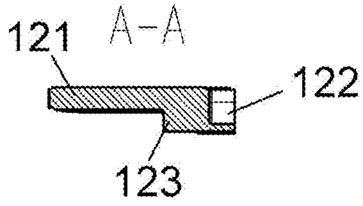
FIG. 10F is a cross-sectional view along line A-A in FIG. 10E.
Figure 10G:
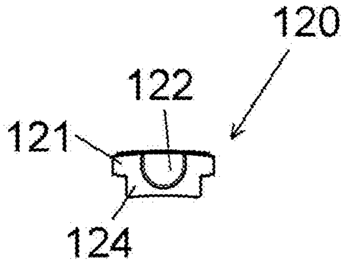
FIG. 10G is a rear view of the stopper block 120.
Figure 10H:
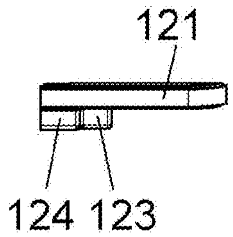
FIG. 10H is a right side view of the stopper block 120.
Figure 11A:
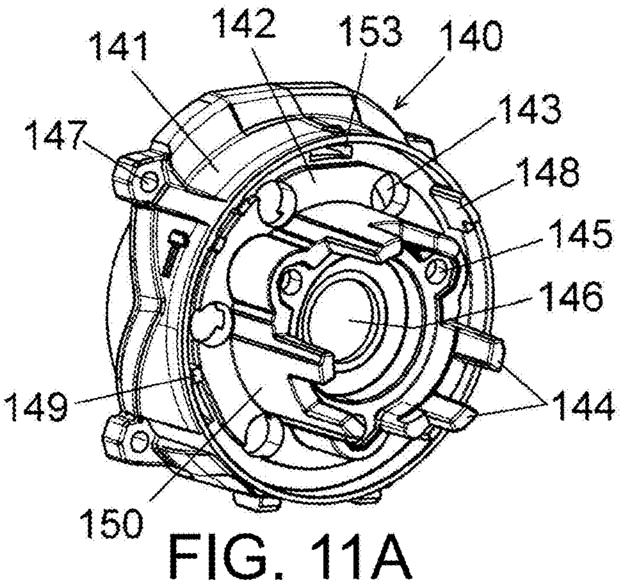
FIG. 11A is a perspective view of a gear case 140 appearing in FIGS. 5 to 7.
Figure 11B:
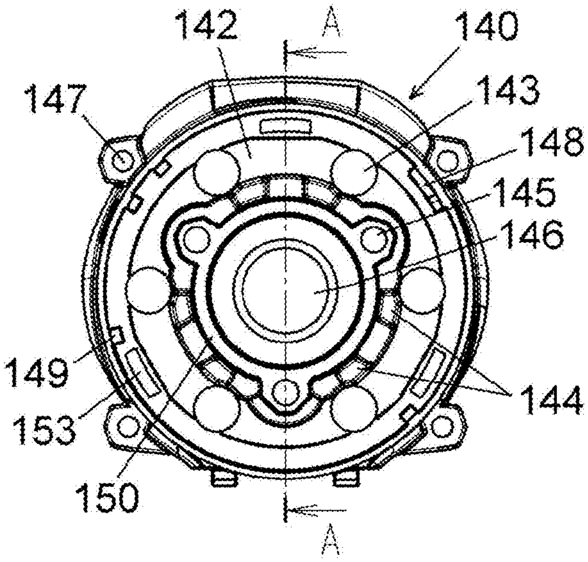
FIG. 11B is a front view of the gear case 140.
Figure 11C:
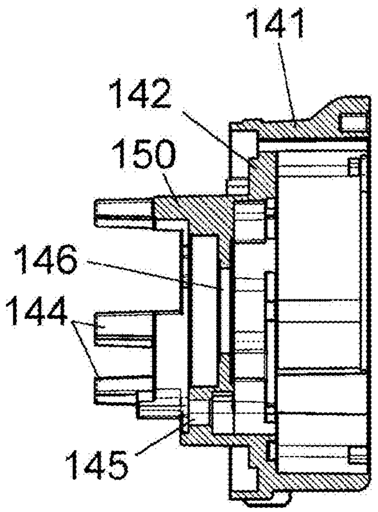
FIG. 11C is a cross-sectional view along line A-A in FIG. 11B.
Figure 11D:
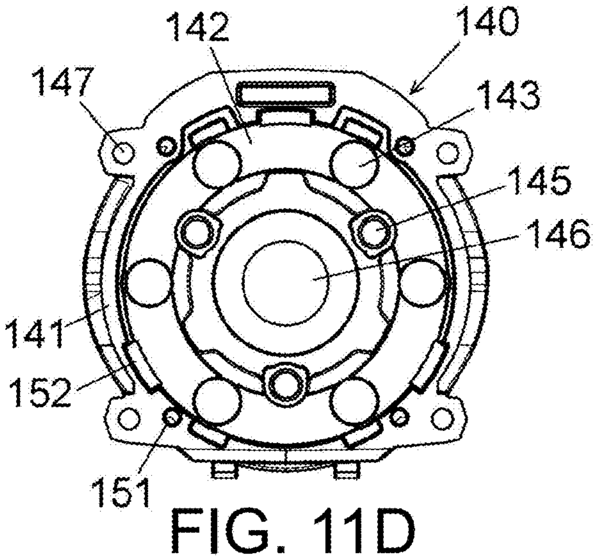
FIG. 11D is a rear view of the gear case 140.
Figure 11E:
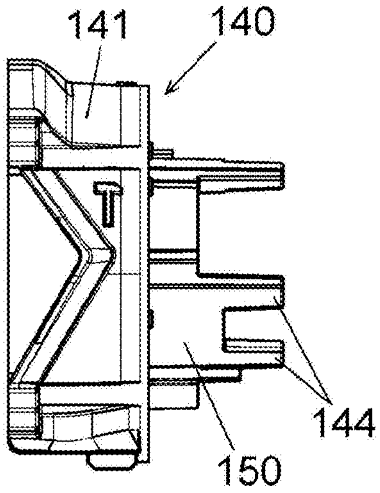
FIG. 11E is a right side view of the gear case 140.
Figure 12A:
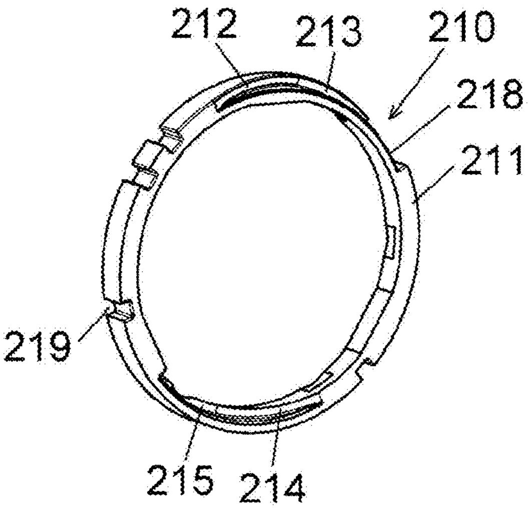
FIG. 12A is a perspective view of a rear stopper cam ring 210 appearing in FIGS. 5 to 7, as seen from the front side.
Figure 12B:
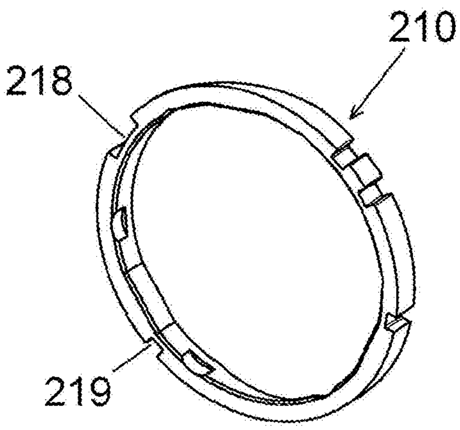
FIG. 12B is a perspective view of the rear stopper cam ring 210, as seen from the rear side.
Figure 12C:
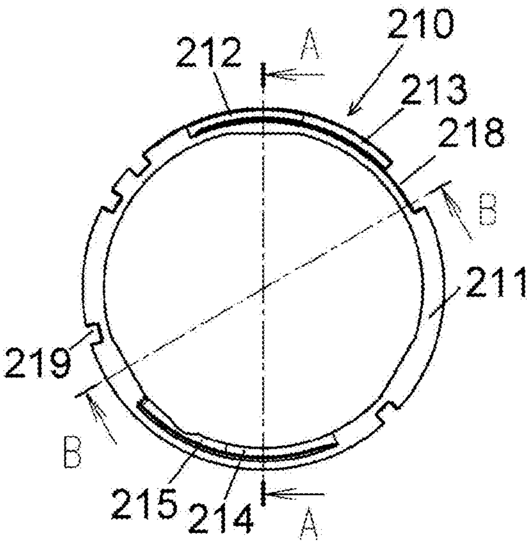
FIG. 12C is a perspective view of the rear stopper cam ring 210 as seen from the rear side.
Figure 12D:
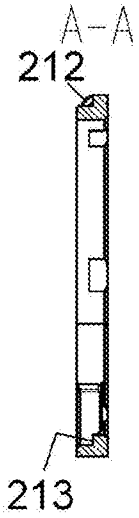
FIG. 12D is a cross-sectional view along line A-A in FIG. 12C.
Figure 12E:
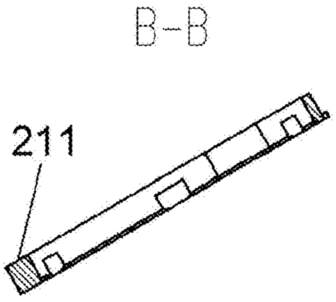
FIG. 12E is a cross-sectional view along line B-B in FIG. 12C.
Figure 12F:
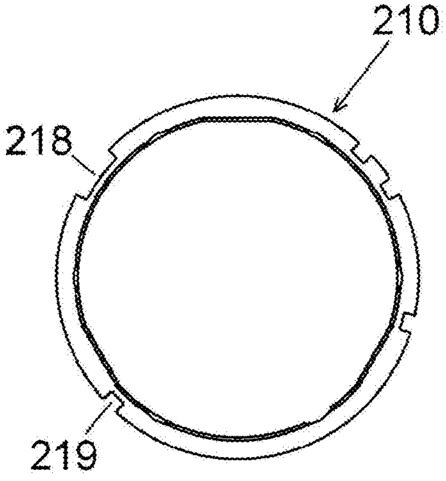
FIG. 12F is a rear view of the rear stopper cam ring 210.
Figure 12G:
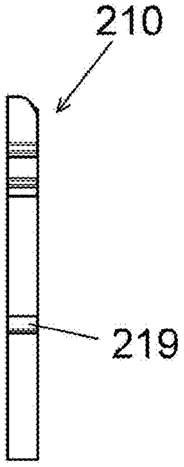
FIG. 12G is a right side view of the rear stopper cam ring 210.
Figure 13A:
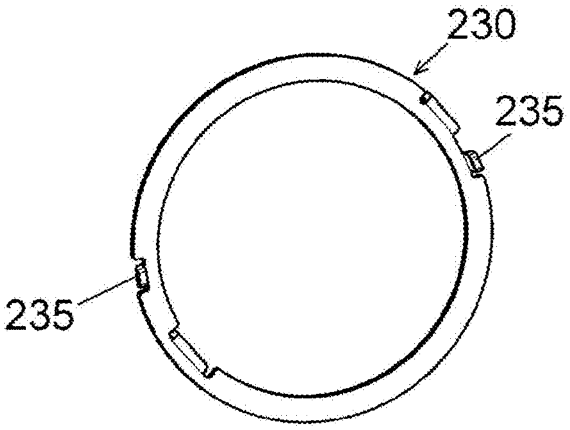
FIG. 13A is a perspective view of a front stopper cam ring 230 appearing in FIGS. 5 to 7, as seen from the front side.
Figure 13B:
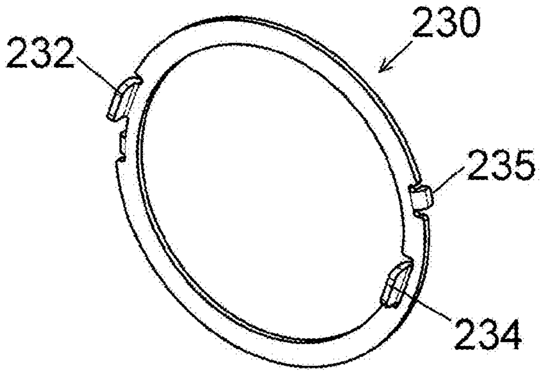
FIG. 13B is a perspective view of the front stopper cam ring 230, as seen from the rear side.
Figure 13C:
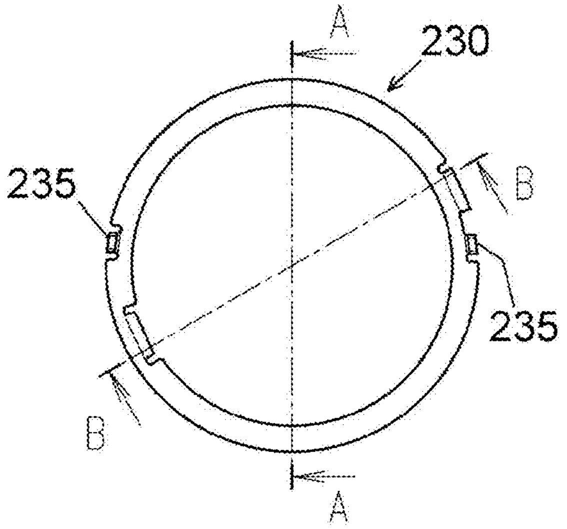
FIG. 13C is a perspective view of the front stopper cam ring 230 as seen from the rear side.
Figure 13D:
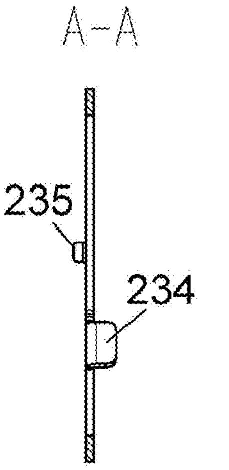
FIG. 13D is a cross-sectional view along line A-A in FIG. 13C.
Figure 13E:
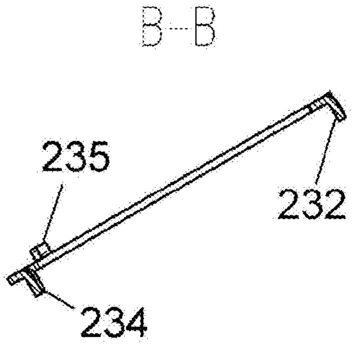
FIG. 13E is a cross-sectional view along line B-B in FIG. 13C.
Figure 13F:
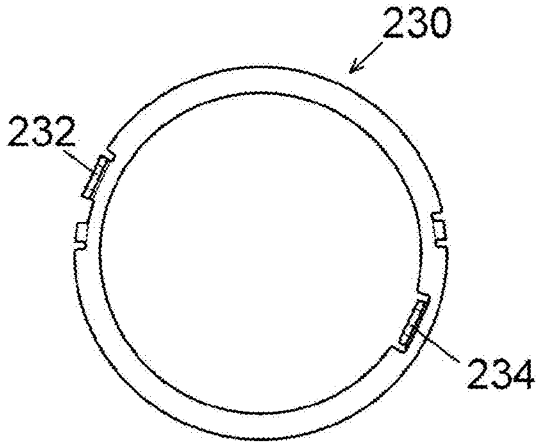
FIG. 13F is a rear view of the front stopper cam ring 230.
Figure 13G:
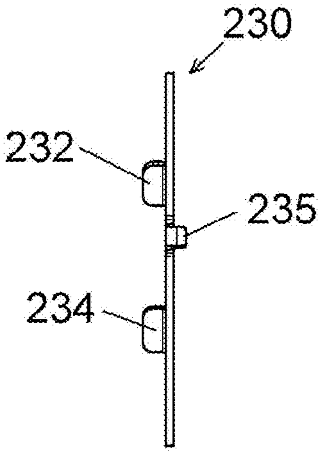
FIG. 13G is a right side view of the front stopper cam ring 230.
Figure 14A:
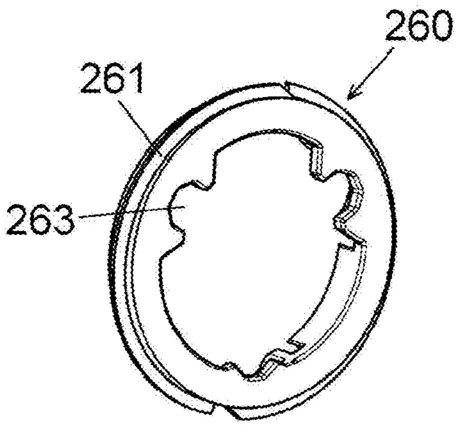
FIG. 14A is a perspective view of a nut 260 appearing in FIGS. 5 to 7.
Figure 14B:
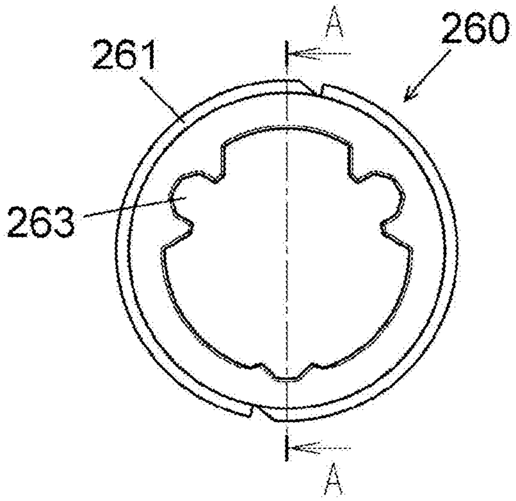
FIG. 14B is a front view of the nut 260.
Figure 14C:
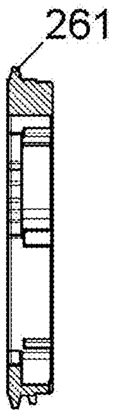
FIG. 14C is a cross-sectional view along line A-A in FIG. 14B.
Figure 14D:
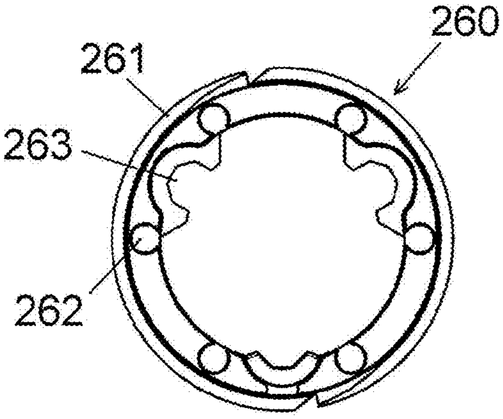
FIG. 14D is a rear view of the nut 260.
Figure 14E:
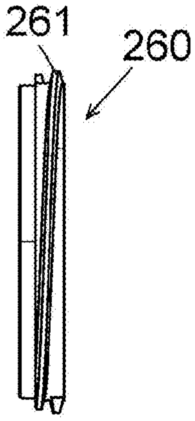
FIG. 14E is a right side view of the nut 260.

As shown in FIGS. 6 and 7, the motor spacer 40 has a bearing holding part 41, a gear part 42, and four screw through holes 43.

The bearing holding part 41 is positioned at the central rear of the motor spacer 40. As shown in FIG. 4, the bearing holding part 41 holds a ball bearing 33 (bearing) that supports the front part of the motor shaft 31. The gear part 42 is provided on the inner peripheral surface of the motor spacer 40. In other words, the motor spacer 40 functions as a first-stage ring gear of the transmission mechanism 50.

The four screw through holes 43 are through holes for passing screws 44 respectively. The screws 44 are fixing parts that secure the motor spacer 40 and a rear case 60 to a gear case 140. Two screws 44 on the upper side correspond to the first fixing part, and two screws 44 on the lower side correspond to the second fixing part. The screws 44 extend in the front-rear direction. Screw collars 45 appearing in FIGS. 6 to 7 are, for example, made of metal and are members through which the two screws 44 on the upper side pass.

The transmission and output configuration part 4 includes the rear case 60 serving as a cylindrical case of the first case. The rear case 60 is, for example, made of resin.

As shown in FIGS. 8A to 8G, the rear case 60 has a tubular part 61, two screw boss parts 62 serving as through parts, a guide convex part 63, a guide hole 64, a spring holding hole 65, a flange part 66, and two through holes 67.

The tubular part 61 is a cylindrical part coaxial with the motor shaft 31. The screw boss parts 62 are provided on the lower left and lower right parts of the tubular part 61, and protrude outward in the radial direction. The through holes 67 penetrate the screw boss parts 62 in the front-rear direction. The through holes 67 are portions through which the two screws 44 on the lower side as shown in FIGS. 6 and 7 pass.

The guide convex part 63 functions as a rotation guide of the shift arm 71. The guide hole 64 is an elongated hole (groove-like hole) for passing through the shift arm 71, and serves as a guide for the front-rear movement of the lower part of the shift arm 71. The spring holding hole 65 opens on the front surface of the flange part 66 and is a non-through hole that holds the rear end of a stopper spring 117 appearing in FIGS. 5 to 7. The flange part 66 extends outward in the radial direction from the front end of the tubular part 61.

A left grease cover 68 and a right grease cover 69 appearing in FIGS. 6-7 are, for example, made of resin and are attached to the left and right sides of the tubular part 61 to cover the left and right guide holes 64, respectively. The left grease cover 68 and the right grease cover 69 function as spaces to collect lubricating oil that leaks from the respective guide holes 64.

The transmission and output configuration part 4 includes a final ring gear 90. The final ring gear 90 is, for example, made of metal.

As shown in FIGS. 9A to 9G, the final ring gear 90 has six outer peripheral convex parts 91 (protrusion parts), a tubular part 92, a flange part 93, a gear part 94, six front surface convex parts 95, and six front surface concave parts 96.

The tubular part 92 is a cylindrical part coaxial with the motor shaft 31. The flange part 93 extends outward in the radial direction from the front end of the tubular part 92. The six outer peripheral convex parts 91 are arranged at equal angular intervals in the peripheral direction, each protruding outward in the radial direction from the outer peripheral surface front part of the tubular part 92. The outer peripheral convex parts 91 are provided straddling the outer peripheral surface front parts of the tubular part 92 and the back surface of the flange part 93. The gear part 94 is provided on the inner peripheral surface of the tubular part 92.

The front surface convex part 95 and the front surface concave part 96 are provided on the front surface of the flange part 93. The six front surface concave parts 96 are arranged at equal angular intervals in the peripheral direction. The front surface convex part 95 is positioned between adjacent front surface concave parts 96. The rear end of a clutch pin 131, which will be described later, is pressed against the front surface concave part 96.

The transmission and output configuration part 4 includes a stopper block 120 as a stopper part. The stopper block 120 is, for example, made of metal.

As shown in FIGS. 10A to 10H, the stopper block 120 has a base part 121, a spring holding part 122, a locking convex part 123, and a wide protrusion part 124.

The base part 121 is a surface part (plate-like part) that follows the inner peripheral surface of the gear case 140. The spring holding part 122 is a concave part provided on the back surface of the base part 121, and holds the front end of the stopper spring 117 that appears in FIGS. 5 to 7. The base part 121 is positioned between the inner peripheral surface of the gear case 140 and the outer peripheral surface of the final ring gear 90.

The locking convex part 123 is provided on a surface of the base part 121, which faces the outer peripheral surface of the final ring gear 90. The locking convex part 123 is a protrusion part that, when positioned at a lock position to be described later, engages with the outer peripheral convex part 91 of the final ring gear 90 to prevent the final ring gear 90 from rotating.

The wide convex part 124 is connected to the rear of the locking convex part 123. The wide convex part 124 has a greater width in the peripheral direction than the locking convex part 123. The wide convex part 124 is provided to form the spring holding part 122.

The transmission and output configuration part 4 includes a gear case 140 as a second case. The gear case 140 is, for example, made of metal.

As shown in FIGS. 11A to 11E, the gear case 140 has a rear tubular part 141, a front wall part 142, six through holes 143, three rotation stopping parts 144, three through holes 145, a central through hole 146, four through holes 147, rotation stopping convex parts 148 and 149, a front tubular part 150, four screw holes 151, three stopper insertion grooves 152, and three stopper through holes 153.

The rear tubular part 141 is a cylindrical part coaxial with the motor shaft 31 and formed a portion of the outer shell of the work machine 1. The front wall part 142 connects the front part of the rear tubular part 141 and the rear part of the front tubular part 150, and extends to the radially inner side of the front tubular part 150 in the radial direction. The six through holes 143 penetrate the front wall part 142 in the front-rear direction on the radially outer side of the front tubular part 150, and each holds a pin sleeve 161 (for example, made of metal) that appears in FIGS. 6 to 7.

The three rotation stopping parts 144 are arranged at equal angular intervals in the peripheral direction, and each protrudes forward from the front end of the front tubular part 150 and is bifurcated. The rotation stopping part 144 sandwiches the rotation stopping convex part 285 of a ratchet cam ring 280 to be described later, from both sides in the peripheral direction, preventing rotation of the ratchet cam ring 280.

The three through holes 145 penetrate the front wall part 142 in the front-rear direction on the radially inner side of the front tubular part 150. The through holes 145 are portions through which the screws 133 appearing in FIGS. 5 to 7 pass, and correspond to a transmission-part housing-side installation part. Spring washers 135 appearing in FIGS. 6 to 7 are, for example, made of metal, and are interposed between the head parts of the screws 133 and the peripheries of the through holes 145 to suppress loosening of the screw 133. The central through hole 146 is the portion through which a spindle 470 passes. The four through holes 147 are portions through which the screws 27 appearing in FIG. 1 pass, the screws 27 being provided for fixing the gear case 140 to the motor accommodation part 11 from the front.

The rotation stopping convex parts 148 and 149 are protrusion parts that engage (fit) with rotation stopping concave parts 218 and 219 of the rear stopper cam ring 210, to be described later, to prevent rotation of a rear stopper cam ring 210. The front tubular part 150 is a cylindrical part coaxial with the motor shaft 31 and has a smaller diameter than the rear tubular part 141. The four screw holes 151 are portions where the screws 44 appearing in FIGS. 6 to 7 are screwed in.

The three stopper insertion grooves 152 are provided in the peripheral direction at equal angular intervals on the inner peripheral surface of the rear tubular part 141, and each is a concave groove extending in the front-rear direction. The base part 121 of the stopper block 120 fits into each stopper insertion groove 152. The stopper block 120 can move in the front-rear direction by being guided by the stopper insertion groove 152.

The three stopper through holes 153 each penetrate the front wall part 142 in the front-rear direction and communicate with the stopper insertion groove 152. The stopper block 120 can protrude forward from the front wall part 142 through each stopper through hole 153.

The motor spacer 40, the rear case 60, and the gear case 140 are combined with each other by using four screws 44 and form a transmission part housing that accommodates the transmission mechanism 50.

The transmission mechanism 50 is a deceleration mechanism formed by a planetary gear mechanism, and includes the gear part 42 of the motor spacer 40, a first planetary gear 51, a first carrier 55, a slide ring gear 57, a second planetary gear 81, a second carrier 85, a final planetary gear 87, a final ring gear 90, and a final carrier 101. The components forming the transmission mechanism 50 are, for example, made of metal.

A needle bearing 53 appearing in FIGS. 6 to 7 is interposed between the inner peripheral surface of the first planetary gear 51 and the pin protruding rearward from the first carrier 55.

The slide ring gear 57 has a groove part 58 engaged with the end of the shift arm 71. The slide ring gear 57 moves back and forth in accordance with the front-rear movement of the end of the shift arm 71 accompanying the rotation of the shift arm 71.

The slide ring gear 57, when positioned at the front, meshes with the second planetary gear 81. At the time, the slide ring gear 57 is fixed to be non-rotatable by the shift dog 75 (for example, made of metal), and the transmission mechanism 50 achieves a high deceleration ratio with three-stage deceleration.

The slide ring gear 57, when positioned at the rear, meshes with both the first planetary gear 51 and the second planetary gear 81. At the time, the transmission mechanism 50 achieves a low deceleration ratio with two-stage deceleration.

Figure 5:
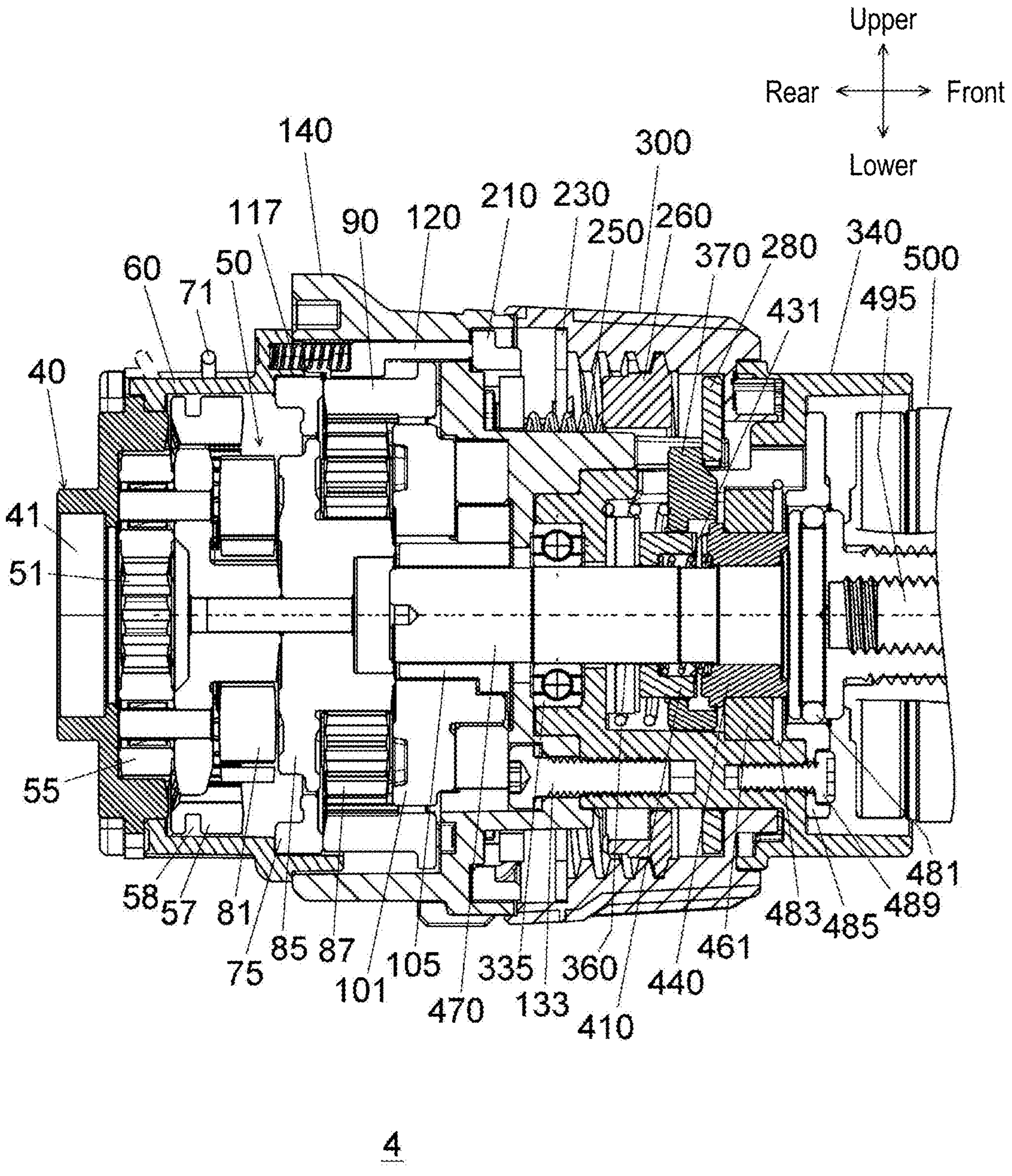
FIG. 5 is an enlarged right side cross-sectional view showing the structure of a transmission and output configuration part 4 of the work machine 1.

A spline hub 105 appearing in FIGS. 5 to 7 is, for example, made of metal, and is a part that meshes with the inner peripheral part of the final carrier 101 and the rear-end outer peripheral part of the spindle 470 and transmits the rotation of the final carrier 101 to the spindle 470. The final carrier 101 is, for example, made of metal.

A roller 103 and a lock ring 110 appearing in FIGS. 6 to 7 are, for example, made of metal, and are parts for suppressing the rotation transmission from the side of the spindle 470 and the chuck 500 to side of the final carrier 101. When attempting to rotate the chuck 500, the roller 103 is sandwiched and fixed between the outer peripheral part of the spline hub 105 and the inner peripheral part of the lock ring 110. The positional relationship of the respective components is such that the roller 103 is not fixed during the transmission of the rotation from the side of the final carrier 101 to the side of the spindle 470 and the chuck 500.

The hub washer 115 appearing in FIGS. 6 to 7 is, for example, made of metal, interposed between the front surface of the spline hub 105 and the rear surface of the front wall part 142 of the gear case 140, avoids the contact between the gear case 140 and the spline hub 105, and reduces friction.

The transmission and output configuration part 4 includes, as a first cam, the rear stopper cam ring 210.

The rear stopper cam ring 210 is positioned on the front side of the stopper block 120, contacts the front end of the stopper block 120, and is biased toward the front side with respect to the stopper spring 117 via the stopper block 120. In addition, the rotation of the rear stopper cam ring 210 with respect to the gear case 140 is restricted.

As shown in FIGS. 12A to 12G the rear stopper cam ring 210 includes a flat part 211, an outer peripheral inclination part 212, an outer peripheral flat part 213, an inner peripheral inclination part 214, an inner peripheral flat part 215, and rotation stopping concave parts 218, 219.

The flat part 211 is a plane part perpendicular to the front-rear direction provided on the front surface of the rear stopper cam ring 210. The outer peripheral inclination part 212 is provided on the radially outer portion on the front surface of the rear stopper cam ring 210. The outer peripheral inclination part 212 is an inclined surface connected at an end to the flat part 211 and inclined from the flat part 211, so that the further the outer peripheral inclination part 212 goes to the right, the further the outer peripheral inclination part 212 progresses rearward. The outer peripheral flat part 213 is a plane part perpendicular to the front-rear direction extending in the peripheral direction from the other end of the outer peripheral inclination part 212. The outer peripheral inclination part 212 and the outer peripheral flat part 213 form a concave part or a hole part.

The inner peripheral inclination part 214 is provided on the radially inner portion on the front surface of the rear stopper cam ring 210. The inner peripheral inclination part 214 is positioned substantially 180° apart from the outer peripheral inclination part 212 in the peripheral direction. The inner peripheral inclination part 214 is an inclined surface connected at an end to the flat part 21 and inclined from the flat part 211 so that the further inner peripheral inclination part 214 goes to the right, the further backward the inner peripheral inclination part 214 is inclined from the flat part 211. The inner peripheral flat part 215 is a plane part perpendicular to the front-rear direction extending in the peripheral direction from the other end of the inner peripheral inclination part 214. The inner peripheral inclination part 214 and the inner peripheral flat part 215 form a concave part or a hole part.

The rotation stopping concave parts 218, 219 engage (fit) with the rotation stopping convex parts 148, 149 of the gear case 140, making the rear stopper cam ring 210 unable to rotate with respect to the gear case 140.

The transmission and output configuration part 4 includes, as a second cam, a front stopper cam Oring 230. The front stopper block 230 is, for example, made of metal.

The front stopper cam ring 230 is positioned on the front side of the rear stopper cam ring 210 and rotates together with the clutch dial 300.

As shown in FIGS. 13A to 13G, the front stopper cam ring 230 includes an outer peripheral protrusion part 232, an inner peripheral protrusion part 234, and two locking protrusion parts 235.

The outer peripheral protrusion part 232 protrudes rearward from the radially outer portion of the front stopper cam ring 230. The outer peripheral protrusion part 232 is a flat plate-like or curved plate-like part substantially perpendicular to the radial direction. The radial position of the outer peripheral protrusion part 232 is equal to the radial positions of the outer peripheral inclination part 212 and the outer peripheral flat part 213 of the rear stopper cam ring 210.

The inner peripheral protrusion part 234 protrudes rearward from the radially inner portion of the front stopper cam ring 230. The inner peripheral protrusion part 234 is a flat plate-like or curved plate-like part substantially perpendicular to the radial direction. The inner peripheral protrusion part 234 is positioned substantially 180° apart from the outer peripheral protrusion part 232 in the peripheral direction. The radial position of the inner peripheral protrusion part 234 is equal to the radial positions of the inner peripheral inclination part 214 and the inner peripheral flat part 215 of the rear stopper cam ring 210.

The two locking protrusion parts 235 protrude forward from the radially outer portion of the front stopper cam ring 230 at positions substantially 180° apart in the peripheral direction. The locking protrusion part 235 is a flat plate-like or curved plate-like part substantially perpendicular to the radial direction. The locking protrusion parts 235 engage (fit) with locking concave parts 302 of the clutch dial 300, which will be described later. As a result, the front stopper cam ring 230 rotates together with the clutch dial 300.

The transmission and output configuration part 4 includes a nut 260 as a screw member. The nut 260 is, for example, made of resin.

As shown in FIGS. 14A to 14E, the nut 260 includes a screw part 261, six spring locking holes 262, and three notch parts 263.

The screw part 261 is provided on the outer peripheral surface of the nut 260 and screwed into the screw part 301 of the clutch dial 300, which will be described later. The six spring locking holes 262 are non-through holes arranged at equal angular intervals in the peripheral direction, and each holds the front end of the clutch spring 250 (for example, made of metal) that appears in FIGS. 5 to 7. The three notch parts 263 are arranged at equal angular intervals in the peripheral direction, and each allows the screw 133 that appears in FIGS. 5 to 7 to pass through.

A thrust plate 165 that appears in FIGS. 6 to 7 is, for example, made of metal and biased rearward with respect to the nut 260 by the clutch spring 250, presses the front end of the clutch pin 131 rearward, and pushes the rear end of the clutch pin 131 against the front surface of the final ring gear 90. The clutch pin 131, for example, is made of metal, extends in the front-rear direction through the pin sleeve 161 held in the through hole 143 of the gear case 140.

The transmission and output configuration part 4 includes the ratchet cam ring 280 as the cam ring. The ratchet cam ring 280 is, for example, made of metal.

As shown in FIGS. 15A to 15G, the ratchet cam ring 280 includes an outer peripheral protrusion part 282, an inner peripheral protrusion part 284, three rotation stopping convex parts 285, and three fine protrusions 288.

The outer peripheral protrusion part 282 protrudes forward from the radially outer portion of the ratchet cam ring 280. The outer peripheral protrusion part 282 is a flat plate-like or curved plate-like part substantially perpendicular to the radial direction.

The inner peripheral protrusion part 284 protrudes forward from the radially inner portion of the ratchet cam ring 280. The inner peripheral protrusion part 284 is a flat plate-like or curved plate-like part substantially perpendicular to the radial direction.

The three rotation stopping convex parts 285 are arranged at equal angular intervals in the peripheral direction, and each protrudes toward the center side of the ratchet cam ring 280. The rotation stopping convex part 285 is sandwiched in the gap of the bifurcated rotation stopping part 144 of the gear case 140. Accordingly, the ratchet cam ring 280 is unable to rotate relative to the gear case 140. The back surface of the rotation stopping convex part 285 is in contact with the front surface of the outer protrusion part 372 of the clutch hub 370, which will be described later, and pressed forward.

The three fine protrusions 288 respectively protrude radially inward at a predetermined angle in the peripheral direction from the rotation stopping convex part 285. The fine protrusion 288 contacts the outer peripheral surface of a screw boss part 345 of the front case 340, which will be described later, at a position where the peripheral position of the rotation stopping convex part 285 coincides with the peripheral position of the outer protrusion part 372 of the clutch hub 370, and plays a role in positioning in the peripheral direction.

When setting the ratchet cam ring 280 in front of the clutch hub 370, the outer protrusion part 372 of the clutch hub 370 passes through the gap between the rotation stopping convex part 285 and the fine protrusion 288 in the peripheral direction. Then, the ratchet cam ring 280 is rotated until the fine protrusion 288 contacts the outer peripheral surface of the screw boss part 345 of the front case 340, and the back surface of the rotation stopping convex part 285 is brought into contact with the front surface of the outer protrusion part 372 of the clutch hub 370 by using the biasing force of the ratchet spring 360.

The transmission and output configuration part 4 includes the clutch dial 300 as a switching operation part. The clutch dial 300 is, for example, made of resin.

As shown in FIGS. 16A to 16F, the clutch dial 300 includes a screw part 301, two locking concave parts 302, an inner peripheral concave part 304, an outer peripheral hole part 305, a tubular part 306, a front wall part 307, and a leaf spring installation part 308.

The tubular part 306 has a center axis that is coaxial with the motor shaft 31, has a cross-section perpendicular to the front-rear direction in a substantially circular shape, and is in a shape that becomes smaller in diameter toward the front. The front wall part 307 extends radially inward from the front end of the tubular part 306.

The screw part 301 is provided on the inner peripheral surface of the tubular part 306. The screw part 301 is screwed into the screw part 261 of the nut 260. The clutch dial 300 is sandwiched between the gear case 140 and the front case 340, which will be described later, in the front-rear direction to have a fixed position in the front-rear direction.

As a result, the nut 260 moves in the front-rear direction in conjunction with the rotation of the clutch dial 300.

The two locking concave parts 302 are positioned substantially 180° apart from each other in the peripheral direction, and are formed as notch parts where the lower end of the screw part 301 are respectively cut out partially. The locking concave parts 302 engage with the locking protrusion part 235 of the front stopper cam ring 230, causing the front stopper cam ring 230 to rotate together with the clutch dial 300.

The inner peripheral concave part 304 is positioned on the radially inner portion of the back surface of the front wall part 307. The radial position of the inner peripheral concave part 304 is equal to the radial position of (or includes the radial position range of) the inner peripheral protrusion part 284 of the ratchet cam ring 280.

The outer peripheral hole part 305 penetrates the radially outer portion of the front wall part 307 in the front-rear direction. The radial position of the outer peripheral hole part 305 is equal to the radial position of (or includes the radial position range of) the outer peripheral protrusion part 282 of the ratchet cam ring 280.

The leaf spring installation part 308 is a part for attaching the leaf spring 331 (for example, made of metal) that appears in FIG. 6 to FIG. 7.

The transmission and output configuration part 4 includes the front case 340 as the output part housing. The front case 340 is, for example, made of metal.

As shown in FIGS. 17A to 17E, the front case 340 includes a large-diameter tubular part 341, a small-diameter tubular part 342, a connection surface part 343, three notch parts 344, three screw boss parts 345, three screw holes 346, three screw holes 347, a bearing holding part 348, two rotation stopping convex parts 349, two stopping convex parts 350, and a locking concave part 351.

The large-diameter tubular part 341 is a cylindrical part coaxial with the motor shaft 31. The small-diameter tubular part 342 is a cylindrical part coaxial with the motor shaft 31. The small-diameter tubular part 342 has a diameter smaller than the large-diameter tubular part 341 and is positioned more rearward than the large-diameter tubular part 341. Inside the small-diameter tubular part 342, the ratchet spring 360, the rear ratchet 410, the front ratchet 440, and a ball bearing 461, etc., are disposed. The connection surface part 343 is a wall part perpendicular to the front-rear direction and connecting the rear end of the large-diameter tubular part 341 and the front end of the small-diameter tubular part 342.

The three notch parts 344 are arranged at equal angular intervals in the peripheral direction, and each allows the outer protrusion part 372 of the clutch hub 370, which will be described later, to pass through. The three screw boss parts 345 are arranged at equal angular intervals in the peripheral direction, and are each provided in a shape that protrudes radially outward from the outer peripheral surface of the small-diameter tubular part 342. The three screw holes 347 are respectively non-through holes that open on the back surfaces of the screw boss parts 345, and each is screwed with the screw 133 that appears in FIG. 5 to FIG. 7. The screw boss parts 345 and the screw holes 347 correspond to the output-part housing-side installation part.

The three screw holes 346 are non-through holes open on the front surface of the connection surface part 343, and each is screwed with a screw 489 that appears in FIG. 5 to FIG. 7. The three screw holes 346 are provided at the same positions in the peripheral direction as the three screw holes 347. The bearing holding part 348 holds the ball bearing 335 (bearing) that appears in FIG. 5 to FIG. 7. The ball bearing 335 is, for example, made of metal and rotatably supports the rear part of the spindle 470.

The two rotation stopping convex parts 349 are positioned substantially 180° apart from each other in the peripheral direction, and respectively protrude radially outward from the left and right parts of the outer peripheral surface of the large-diameter tubular part 341. The rotation stopping convex part 349 is a rotation restriction part that engages (fits) with the first rotation stopping concave part 616 or the second rotation stopping concave part 617 of a sub-handle 600 to be described later, and restricts the rotation of the sub-handle 600 relative to the front case 340.

The two stopping convex parts 350 are positioned substantially 180° apart from each other in the peripheral direction, and respectively protrude radially outward from the left and right part of the outer peripheral surface of the large-diameter tubular part 341. The protrusion length of the stopping convex part 350 is shorter than the protrusion length of the rotation stopping convex part 349. The stopping convex part 350 extends in both sides of the peripheral direction from the rotation stopping convex part 349. The stopping convex part 350 prevents the sub-handle 600 to be described later from coming off (detaching) forward from the front case 340.

The locking concave part 351 is a concave groove part into which the leaf spring 331 fits, and there are those corresponding to each level of the set tightening torque in the clutch mode, those corresponding to the drill mode, and those corresponding to the vibration mode. By fitting the leaf spring 331 into the locking concave part 351, the rotational position of the clutch dial 300 is determined, and the clutch dial 300 is locked in the rotational direction and held so as not to rotate inadvertently.

The transmission and output configuration part 4 includes the clutch hub 370.

The clutch hub 370 is a restricting part that restricts the movement (rotation) of the rear ratchet 410 in the vibration mode. The clutch hub 370 is, for example, made of metal.

As shown in FIGS. 18A to 18E, the clutch hub 370 has an annular part 371, three outer protrusion parts 372, and six locking convex parts 373.

The annular part 371 is a ring part coaxial with the motor shaft 31. The three outer protrusion parts 372 are arranged at equal angular intervals in the peripheral direction, and each protrudes radially outward from the outer peripheral surface of the annular part 371. The six locking convex parts 373 are arranged at equal angular intervals in the peripheral direction, and are protrusion parts each protruding radially inward from the rear part of the inner peripheral surface of the annular part 371.

The transmission and output configuration part 4 includes a rear ratchet 410 as a second vibration part. The rear ratchet 410 is, for example, made of metal.

As shown in FIGS. 19A to 19F, the rear ratchet 410 is ring-shaped, has an concavo-convex part 411 on the front surface, and has six locking convex parts 412 on the front part of the outer peripheral surface. The six locking convex parts 412 are arranged at equal angular intervals in the peripheral direction, and are protrusion parts each protruding radially outward.

The thrust bearing 391 and a bearing washer 395 appearing in FIG. 6 and FIG. 7 are, for example, made of metal, and are interposed between the back surface of the rear ratchet 410 and the opposing surface of the front case 340 and receive loads in the front-rear direction. The thrust bearing

391 and the bearing washer 395 reduce the friction and suppress the power loss when the tip tool 20 is used by being pressed against a workpiece.

The transmission and output configuration part 4 includes the front ratchet 440 as a first vibration part. The front ratchet 440 is, for example, made of metal.

As shown in FIGS. 20A to 20F, the front ratchet 440 is ring-shaped and has, on the back surface, a concavo-convex part 441. The concavo-convex part 441 is a vibration generating shape part, which contacts the concavo-convex part 411 (vibration generating shape part) of the rear ratchet 410 and outputs the vibration to the spindle 470 by relative rotation.

A spring 431 appearing in FIG. 5 to FIG. 7 is, for example, made of metal, and biases the front ratchet 440 forward with respect to the rear ratchet 410. As a result, when the tip tool 20 is not pressed against a workpiece, the rear ratchet 410 and the front ratchet 440 are not in contact, and the vibration is suppressed from being generated. The ratchet washer 435 is, for example, made of metal, avoids contact between the front ratchet 440 and the spring 431, and reduces friction.

The ball bearing 461 appearing in FIG. 5 to FIG. 7 is, for example, made of metal, and rotatably supports the intermediate part of the front ratchet 440 and the spindle 470 with respect to the front case 340. The front ratchet 440 rotates integrally with the spindle 470.

The transmission and output configuration part 4 includes the spindle 470 and the chuck 500. Both the spindle 470 and the chuck 500 are, for example, made of metal. The spindle 470 is rotationally driven by the motor 30 through the transmission mechanism 50. The chuck 500 holds the tip tool 20 appearing in FIG. 3 and rotates integrally with the spindle 470.

The screw part on the rear inner peripheral surface of the chuck 500 is screwed onto the screw part on the front-portion outer peripheral surface of the spindle 470, thereby fixing the chuck 500 to the spindle 470. Additionally, the chuck 500 is fixed to the spindle 470 by a left screw 495 (for example, made of metal). The spindle 470 and the chuck 500 are firmly fixed to each other and form a tip tool holding part that is substantially integral.

A bearing cover 485 appearing in FIG. 5 to FIG. 7 is, for example, made of metal, and is fixed to the front case 340 by the screw 489. The screw 489 passes through a through hole 487 of the bearing cover 485 and is screwed into the screw hole 346 of the front case 340.

An O-ring 481 appearing in FIG. 5 to FIG. 7 is made of an elastic material such as rubber, and is provided between the inner peripheral surface of the bearing cover 485 and the outer peripheral surface of the spindle 470. The O-ring 481 slides on the inner peripheral surface of the bearing cover 485 and reduces the impact during rotation stop (braking). The O-ring 481 also has the function of preventing oil leakage.

A stopping ring 483 appearing in FIG. 5 to FIG. 7 is, for example, made of metal, provided on the inner peripheral surface of the small-diameter tubular part 342 of the front case 340, and serves as a stopper for the ball bearing 461.

Figure 21:
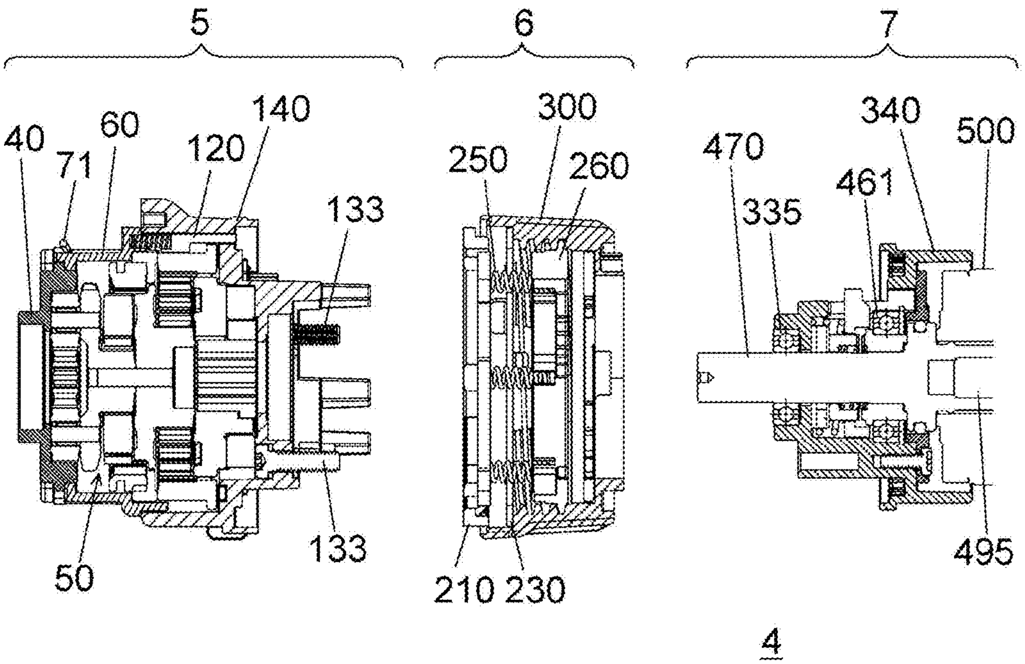
FIG. 21 is a right cross-sectional view showing a state where the transmission and output configuration part 4 is separated into a transmission part 5, an output switching part 6, and an output part 7.

(Disassembly of the transmission and output configuration part 4) FIG. 21 is a right cross-sectional view showing a state where the transmission and output configuration part 4 is separated into the transmission part 5, the output switching part 6, and the output part 7.

The transmission part 5 is positioned in front of the motor 30 and transmits the driving force of the motor 30 to the spindle 470. The transmission part 5 includes a transmission part housing (the motor spacer 40, the rear case 60, the gear case 140) and various components (such as the transmission mechanism 50) held or supported by the transmission part housing.

The output switching part 6 switches the output of the output part 7, namely the torque or the presence/absence of vibration. The output switching part 6 is positioned by being sandwiched between the output part 7 and the transmission part 5 in the front-rear direction. The output switching part 6 includes the clutch dial 300 and various components (such as the nut 260) held or supported by the clutch dial 300.

The output part 7 includes the front case 340 and various components held or supported by the front case 340, namely the spindle 470, the chuck 500, the ball bearings 335, 461, and so on.

The transmission part 5 is detachably assembled to the output part 7 from the rear side. Specifically, the gear case 140 is assembled to the front case 340 from the rear side by the screw 133. The screw 133 passes through the through hole 145 of the gear case 140 and is screwed into the screw hole 347 of the front case 340.

The screw 133 is an example of a fixing part that fixes the output part 7 and the transmission part 5. The ranges where the screw 133 and the output switching part 6 are present at least overlap partially. When the fixation by using the screw 133 is released, it is possible to remove the transmission part 5 from the output part 7.

When the transmission part 5 is removed from the output part 7, that is, when the screws 133 are removed to remove the gear case 140 from the front case 340, it is possible to remove the output switching part 6 from the output part 7 toward the rear side while the spindle 470 and chuck 500 remain fixed.

(Clutch mode, drill mode, vibration mode) The work machine 1 has a clutch mode, a drill mode, and a vibration mode, and either of the modes can be selected by operating the clutch dial 300.

The clutch mode is a mode in which the rotation transmission from the transmission mechanism 50 to the spindle 470 is interrupted when the set tightening torque (predetermined torque) is exceeded, that is, the clutch mode is a mode in which the clutch mechanism is effective. The set tightening torque can be adjusted in multiple stages, such as 22 stages, by operating the clutch dial 300.

FIGS. 23A to 23E indicate the state where the clutch mode is set and the set tightening torque is set to the lowest. FIGS. 24A to 24E indicate the state where the clutch mode is set and the set tightening torque is set to the highest.

The clutch mechanism stops the rotation of the final ring gear 90 until the set tightening torque is reached, while allows the rotation of the final ring gear 90 when the torque becomes equal to or greater than the set tightening torque. The clutch mechanism includes the nut 260, the clutch spring 250, the thrust plate 165, and the clutch pin 131.

When the load (torque) is applied to the tip tool 20 during the driving of the motor 30, the final ring gear 90 that is not fixed attempts to rotate. The clutch pin 131 is positioned in the front surface concave part 96 of the final ring gear 90 until the set tightening torque is reached. As a result, the final ring gear 90 becomes unable to rotate, and the torque transmission by the transmission mechanism 50 becomes effective.

On the other hand, when the torque applied to the tip tool 20 increases and exceeds the set tightening torque, that is, when the load (torque) equal to or greater than the force with which the clutch pin 131 pushes the final ring gear 90 rearward to stop the rotation of the final ring gear 90 from being applied to the final ring gear 90, the final ring gear 90 rotates, and the clutch pin 131 rides over the front surface convex part 95 of the final ring gear 90. This is the clutch operation, and the torque transmission by the transmission mechanism 50 is interrupted by the clutch mechanism.

The load (set tightening torque) when the clutch mechanism operates is proportional to the compression amount of the clutch spring 250. By rotating the clutch dial 300, the nut 260 moves back and forth, and the compression amount of the clutch spring 250 is changed.

In the state shown in FIGS. 23A to 23E, the nut 260 is at the most advanced position, and the compression amount of the clutch spring 250 is at the minimum (the set tightening torque is at its lowest). From such state, as the nut 260 is rotated clockwise when viewed from the front, the nut 260 moves backward, and the compression amount of the clutch spring 250 increases. In the state shown in FIGS. 24A to 24E, the nut 260 is in the most retracted position, and the compression amount of the clutch spring 250 is at the maximum (the set tightening torque is at the highest).

(Configuration for switching to the drill mode) The drill mode is a mode that makes the final ring gear 90 unable to rotate regardless of the clutch mechanism, and it is a mode in which the work machine 1 can output the maximum tightening torque.

From the state shown in FIGS. 24A to 24E, that is, from the state where the clutch mode is set and the set tightening torque is at its highest, when the clutch dial 300 is rotated clockwise when viewed from the front to the rotational position corresponding to the drill mode, the state of FIGS. 25A to 25E, that is, the drill mode, is set.

The structure for switching to the drill mode includes the stopper block 120, the stopper spring 117 as a biasing means, the rear stopper cam ring 210, and the front stopper cam ring 230.

The stopper block 120 is movable between a lock position (forward position) and a non-lock position (retracted position), and makes the final ring gear 90 unable to rotate when at the lock position. The front end of the stopper block 120 protrudes further forward than the final ring gear 90. The stopper spring 117, made of metal, for example, biases the stopper block 120 forward, that is, toward the lock position.

The clutch dial 300 is a switching operation part capable of switching the position of the stopper block 120 between the lock position and the non-lock position. The clutch dial 300 is positioned on the front side of the final ring gear 90. The clutch dial 300 is rotatable around the extension line of the axis of the motor shaft 31.

The rear stopper cam ring 210 and the front stopper cam ring 230 are restricting parts that restrict the movement of the stopper block 120 from the non-lock position to the lock position by resisting the biasing of the stopper spring 117. The restriction and the release using the rear stopper cam ring 210 and the front stopper cam ring 230 are switched according to the operation of the clutch dial 300. In other words, the rear stopper cam ring 210 and the front stopper cam ring 230 form a cam mechanism that moves the stopper block 120 between the non-lock position and the lock position in conjunction with the rotation of the clutch dial 300.

The rear stopper cam ring 210 is positioned on the front side of the stopper block 120, and the back surface of the rear stopper cam ring 210 contacts the stopper block 120. The rear stopper cam ring 210 contacts the stopper block 120 on the outer side of the final ring gear 90 in the radial direction of the final ring gear 90. The rear stopper cam ring 210 is positioned further forward than the final ring gear 90. The rear stopper cam ring 210 is biased forward with respect to the stopper spring 117 via the stopper block 120. The rotation of the rear stopper cam ring 210 relative to the gear case 140 is restricted by the engagement (fitting) of the rotation stopping convex part 148, 149 of the gear case 140 and the rotation stopping concave part 218, 219 of the rear stopper cam ring 210.

The front stopper cam ring 230 is positioned on the front side of the rear stopper cam ring 210. The front stopper cam ring 230 rotates together with the clutch dial 300 due to the engagement (fitting) of the locking protrusion part 235 of the front stopper cam ring 230 with the locking concave part 302 of the clutch dial 300. When the clutch dial 300 reaches the rotational position corresponding to the drill mode, that is, when the front stopper cam ring 230 reaches a predetermined rotational position, the rear stopper cam ring 210 moves forward. Accordingly, the movement restriction of the stopper block 120 from the non-lock position to the lock position is released.

The rear stopper cam ring 210 has the outer peripheral inclination part 212 and the outer peripheral flat part 213 as concave parts, as well as the inner peripheral inclination part 214 and the inner peripheral flat part 215 as the concave part. The front stopper cam ring 230 has the outer peripheral protrusion part 232 and the inner peripheral protrusion part 234 as the convex part. In the process of the front stopper cam ring 230 reaching the predetermined rotational position (the process of the clutch dial 300 reaching the rotational position for drill mode), the outer peripheral protrusion part 232 and the inner peripheral protrusion part 234 lower the outer peripheral inclination part 212 and the inner peripheral inclination part 214, and the rear stopper cam ring 210 moves forward. The inclination of the outer peripheral inclination part 212 and the inner peripheral inclination part 214 may be steeper than the inclination of the screw part 301 of the clutch dial 300.

FIGS. 24A to 24E and FIGS. 25A to 25E show the process of switching from the clutch mode to the drill mode, where the outer peripheral protrusion part 232 of the front stopper cam ring 230 lowers the outer peripheral inclination part 212 of the rear stopper cam ring 210, the rear stopper cam ring 210 advances due to the biasing of the stopper spring 117, and the stopper block 120 moves to the lock position (forward position). In the drill mode, the locking convex part 123 of the stopper block 120 in the lock position engages (abuts in the rotational direction) with the outer peripheral convex part 91 of the final ring gear 90, making the final ring gear 90 unable to rotate. It should be noted that the locking convex part 123 of the stopper block 120 in the non-lock position does not engage with the outer peripheral convex part 91 of the final ring gear 90, and the final ring gear 90 is allowed to rotate.

When the clutch dial 300 is within a predetermined rotational range corresponding to the clutch mode (the rotational position between the state shown in FIGS. 23A to 23E and the state shown in FIGS. 24A to 24E), the outer peripheral protrusion part 232 and the inner peripheral protrusion part 234 of the front stopper cam ring 230 abut against the flat part 211 of the rear stopper cam ring 210, the rear stopper cam ring 210 does not advance, and the stopper block 120 does not move to the lock position.

(Configuration for switching to the vibration mode) The vibration mode is a mode that applies the vibration in the front-rear direction to the spindle 470 in the drill mode.

From the state shown in FIGS. 25A to 25E, which is the drill mode, when the clutch dial 300 is further rotated clockwise as viewed from the front to the rotational position corresponding to the vibration mode, the mode transitions to the state shown in FIGS. 26A to 26E which is the vibration mode.

The structure for switching to the drill mode includes the ratchet cam ring 280, the ratchet spring 360, the clutch hub 370, the rear ratchet 410, and the front ratchet 440.

The rear ratchet 410 and the front ratchet 440 are vibration parts that output, as vibration, the driving force of the motor 30 to the spindle 470. The front ratchet 440 is driven (rotated) by the driving force of the motor 30. The clutch dial 300 switches between the vibration-on state and the vibration-off state of the rear ratchet 410 and the front ratchet 440.

The ratchet cam ring 280 and the clutch hub 370 are vibration switching parts that move from a vibration-off position (retracted position) to a vibration-on position (advanced position) in response to the operation of the clutch dial 300. The ratchet spring 360, which is made of metal for example, is a biasing part that biases the ratchet cam ring 280 and the clutch hub 370 forward, that is, toward the vibration-on position.

The outer peripheral protrusion part 282 and the inner peripheral protrusion part 284 of the ratchet cam ring 280 appearing in FIGS. 15A to 15E and FIG. 15G and the inner peripheral concave part 304 and the outer peripheral hole part 305 of the clutch dial 300 appearing in FIGS. 16A to 16C and FIG. 16E are guide parts that guide the ratchet cam ring 280 and the clutch hub 370 to move from the vibration-off position to the vibration-on position when the clutch dial 300 comes to the rotational position corresponding to the vibration mode.

When the clutch dial 300 comes to the rotational position corresponding to the vibration mode, the outer peripheral protrusion part 282 of the ratchet cam ring 280 faces the outer peripheral hole part 305 of the clutch dial 300, and the inner peripheral protrusion part 284 of the ratchet cam ring 280 faces the inner peripheral concave part 304 of the clutch dial 300. Then, with the outer peripheral protrusion part 282 and inner peripheral protrusion part 284 of the ratchet cam ring 280 entering into the outer peripheral hole part 305 and the inner peripheral concave part 304 of the clutch dial 300 respectively, the ratchet cam ring 280 and the clutch hub 370 move from the vibration-off position to the vibration-on position due to the biasing of the ratchet spring 360.

Figure 15A:
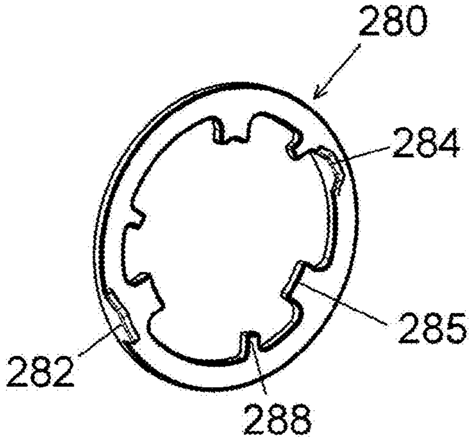
FIG. 15A is a perspective view of a ratchet cam ring 280 appearing in FIGS. 5 to 7, as seen from the front side.
Figure 15B:
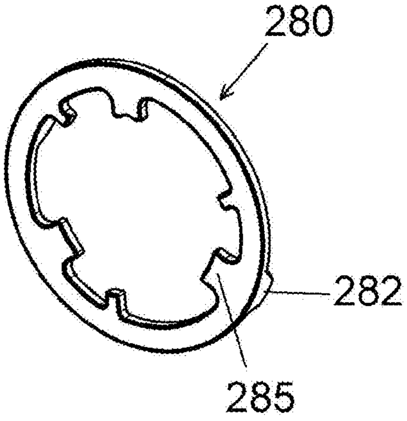
FIG. 15B is a perspective view of the ratchet cam ring 280, as seen from the rear side.
Figure 15C:
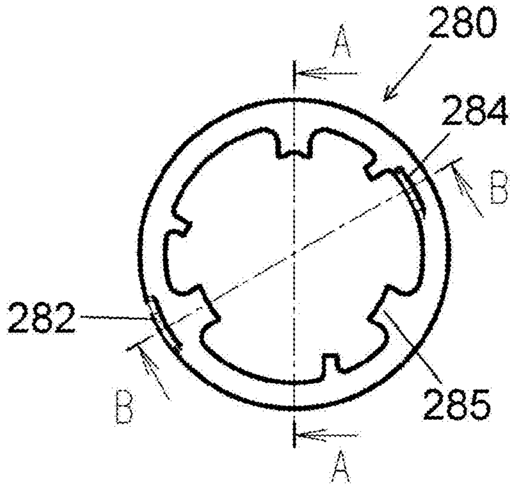
FIG. 15C is a front view of the ratchet cam ring 280.
Figure 15D:
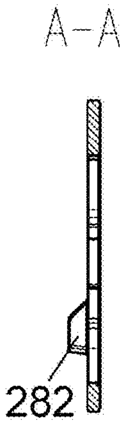
FIG. 15D is a cross-sectional view along line A-A in FIG. 15C.
Figure 15E:
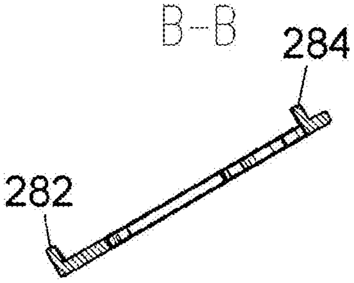
FIG. 15E is a cross-sectional view along line B-B in FIG. 15C.
Figure 15F:
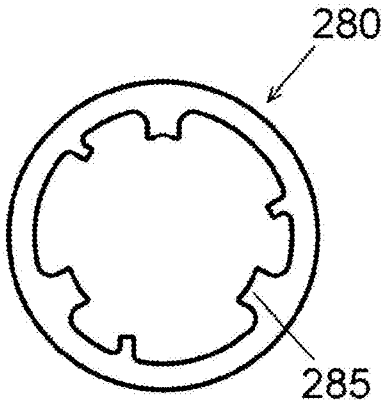
FIG. 15F is a rear view of the ratchet cam ring 280.
Figure 15G:
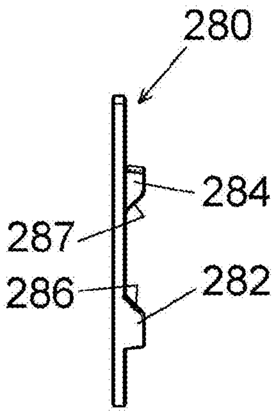
FIG. 15G is a right side view of the ratchet cam ring 280.
Figure 16A:
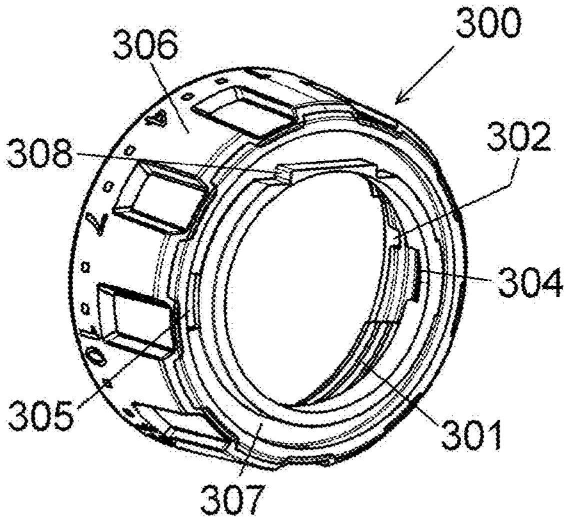
FIG. 16A is a perspective view of a clutch dial 300 appearing in FIGS. 5 to 7, as seen from the front side.
Figure 16B:
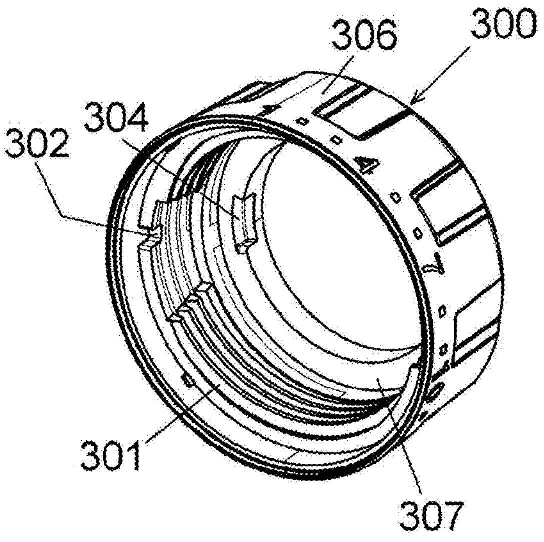
FIG. 16B is a perspective view of the clutch dial 300 as seen from the rear side.
Figure 16C:
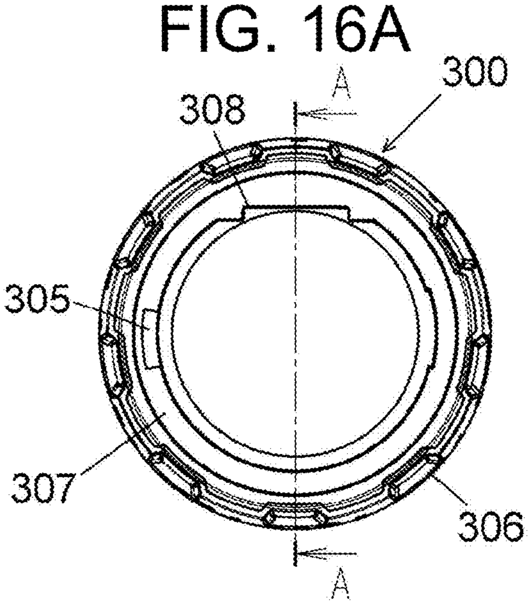
FIG. 16C is a front view of the clutch dial 300.
Figure 16D:
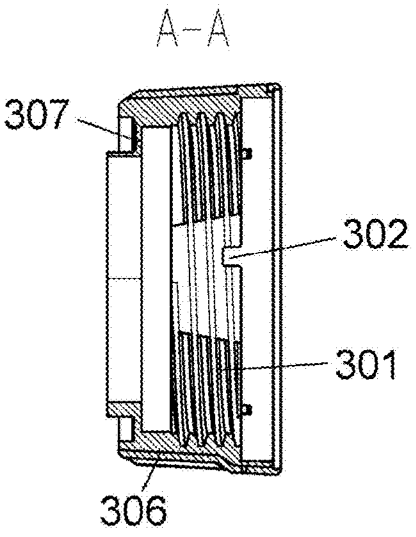
FIG. 16D is a cross-sectional view along line A-A in FIG. 16C.
Figure 16E:
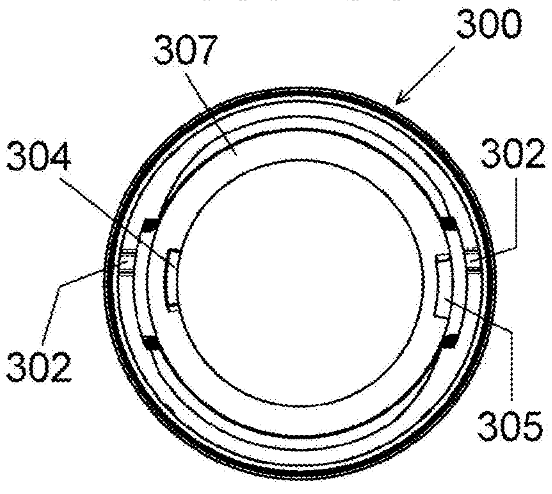
FIG. 16E is a rear view of the clutch dial 300.
Figure 16F:
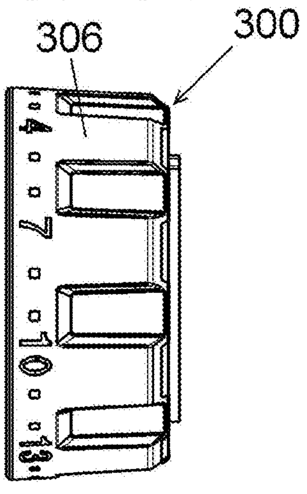
FIG. 16F is a right side view of the clutch dial 300.
Figure 17A:
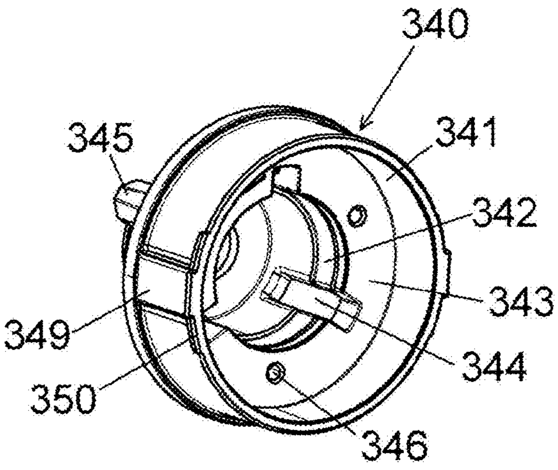
FIG. 17A is a perspective view of a front case 340 appearing in FIGS. 5 to 7.
Figure 17B:
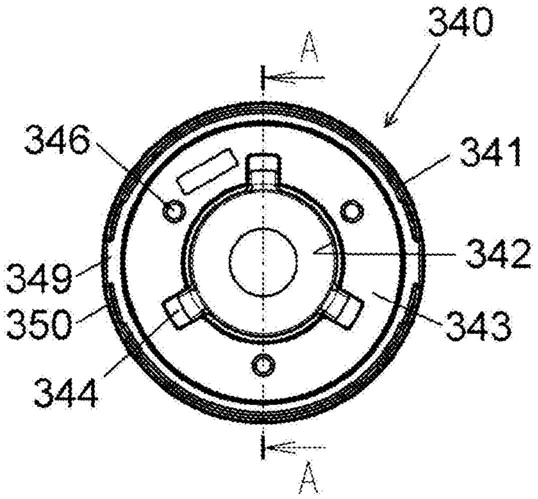
FIG. 17B is a front view of the front case 340.
Figure 17C:
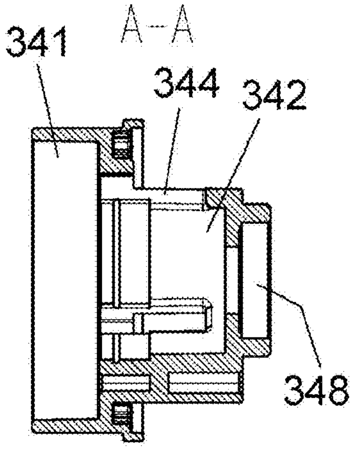
FIG. 17C is a cross-sectional view along line A-A in FIG. 17B.
Figure 17D:
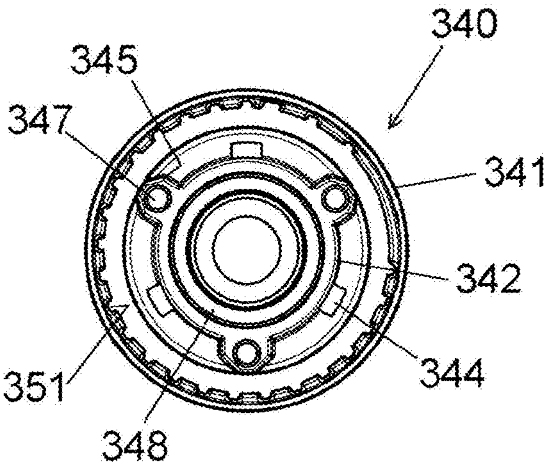
FIG. 17D is a rear view of the front case 340.
Figure 17E:
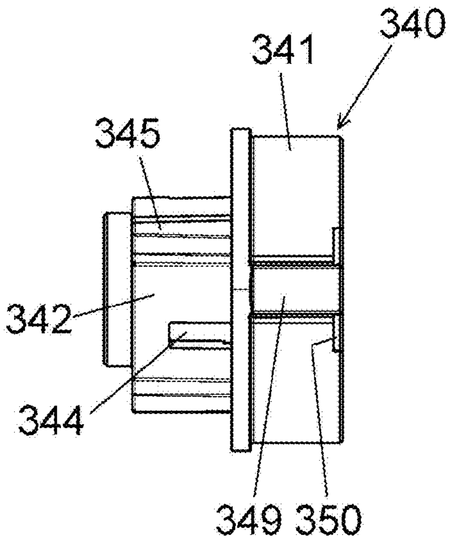
FIG. 17E is a right side view of the front case 340.
Figure 18A:
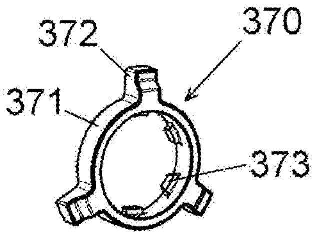
FIG. 18A is a perspective view of a clutch hub 370 appearing in FIGS. 5 to 7.
Figure 18B:
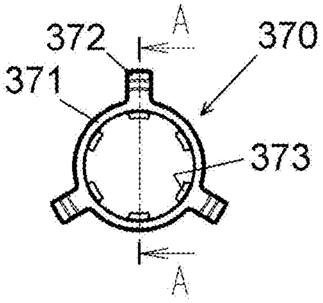
FIG. 18B is a front view of the clutch hub 370.
Figure 18C:
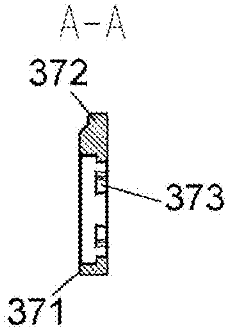
FIG. 18C is a cross-sectional view along line A-A in FIG. 18C.
Figure 18D:
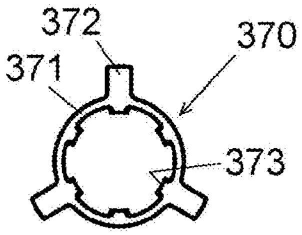
FIG. 18D is a rear view of the clutch hub 370.
Figure 18E:
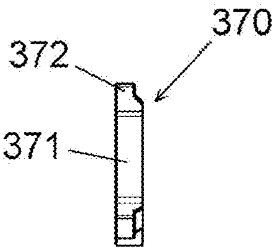
FIG. 18E is a right side view of the clutch hub 370.
Figure 19A:
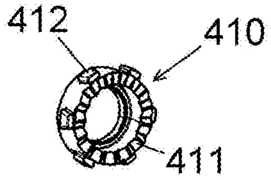
FIG. 19A is a perspective view of a rear ratchet 410 appearing in FIGS. 5 to 7, as seen from the front side.
Figure 19B:
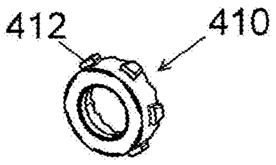
FIG. 19B is a perspective view of the rear ratchet 410 as seen from the rear side.
Figure 19C:
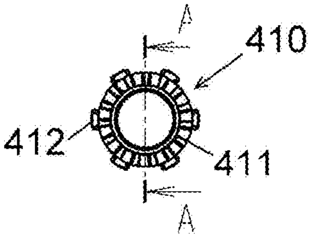
FIG. 19C is a front view of the rear ratchet 410.
Figure 19D:
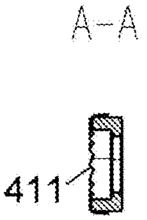
FIG. 19D is a cross-sectional view along line A-A in FIG. 19C.
Figure 19E:
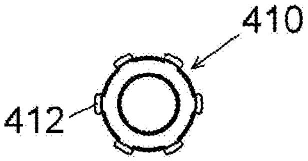
FIG. 19E is a rear view of the rear ratchet 410.
Figure 19F:
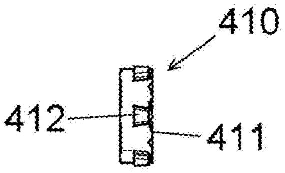
FIG. 19F is a right side view of the rear ratchet 410.
Figure 20A:
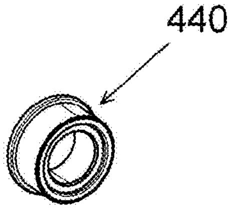
FIG. 20A is a perspective view of a front ratchet 440 appearing in FIGS. 5 to 7, as seen from the front side.
Figure 20B:
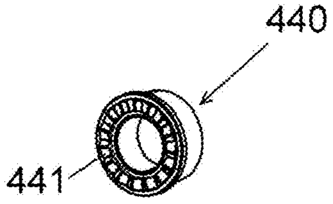
FIG. 20B is a perspective view of the front ratchet 440 as seen from the rear side.
Figure 20C:
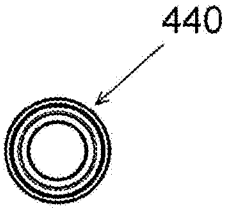
FIG. 20C is a front view of the front ratchet 440.
Figure 20D:
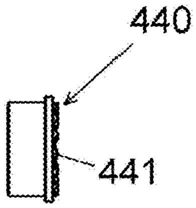
FIG. 20D is a left side view of the front ratchet 440.
Figure 20E:
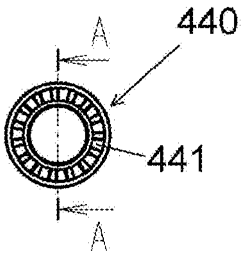
FIG. 20E is a rear view of the front ratchet 440.
Figure 20F:
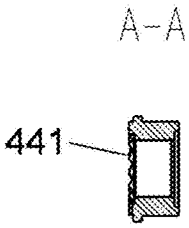
FIG. 20F is a cross-sectional view along line A-A in FIG. 20E.

The inclination parts 286, 287 appearing in FIG. 15G, which are provided at a peripheral end of the outer peripheral protrusion part 282 and the inner peripheral protrusion part 284 of the ratchet cam ring 280, respectively, serve to smoothen the entry and exit of the outer peripheral protrusion part 282 and the inner peripheral protrusion part 284 into and out of the outer peripheral hole part 305 and the inner peripheral concave part 304 of the clutch dial 300.

The clutch hub 370, in the vibration-off position, does not restrict the movement of the rear ratchet 410, and, in the vibration-on position, restricts the movement of the rear ratchet 410. Vibration is generated by driving the front ratchet 440 by using the driving force of the motor 30 with respect to the rear ratchet 410 whose movement is restricted.

Figure 26A:
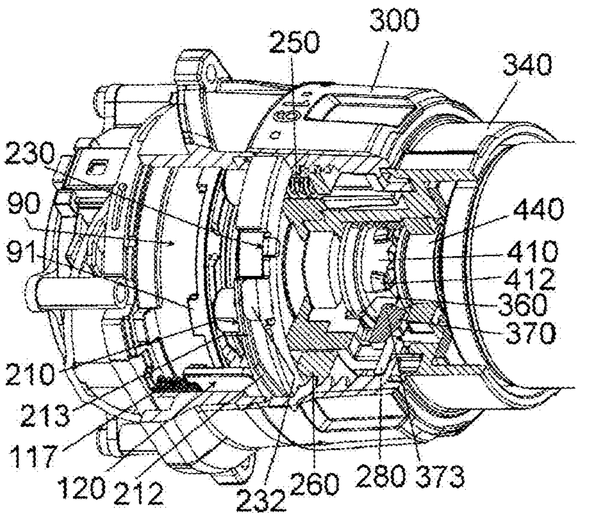
FIGS. 26A to 26E are views illustrating configurations in which a portion is cut off, and are views showing necessary structures of the work machine set to a vibration mode from respectively different viewpoints.
Figure 26D:
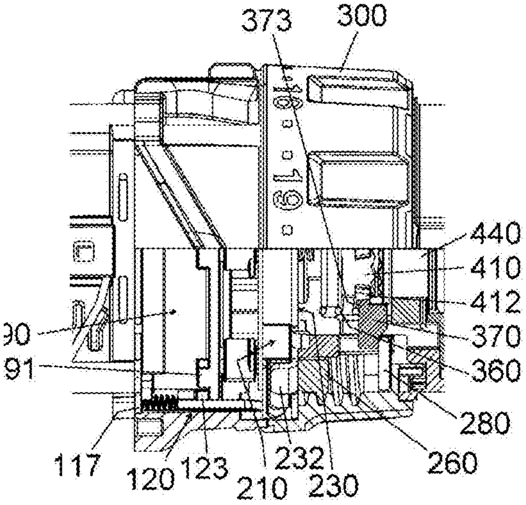
Figure 26B:
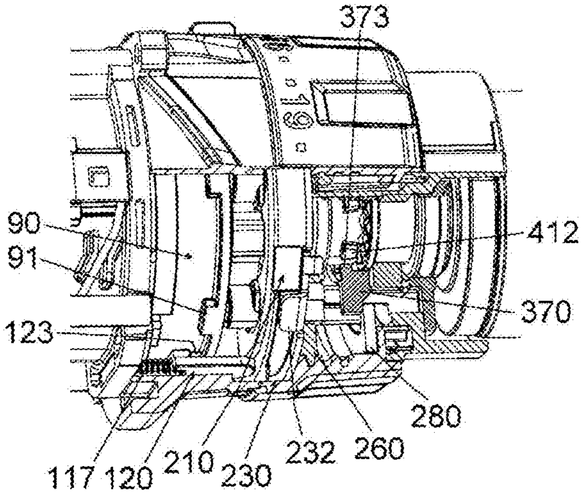
Figure 26E:
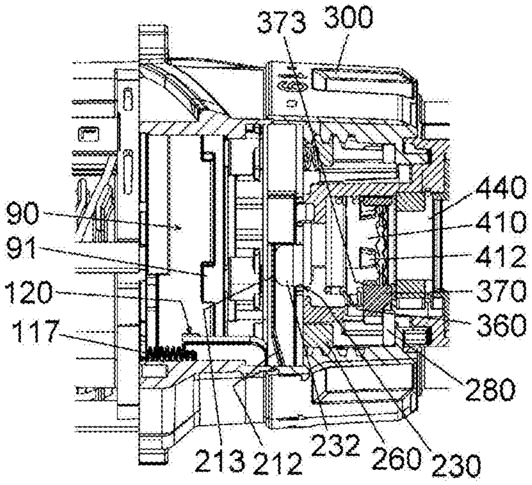
Figure 26C:
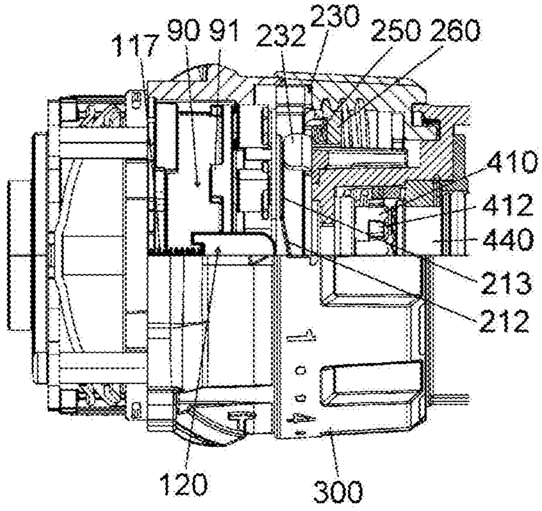
Figure 27:
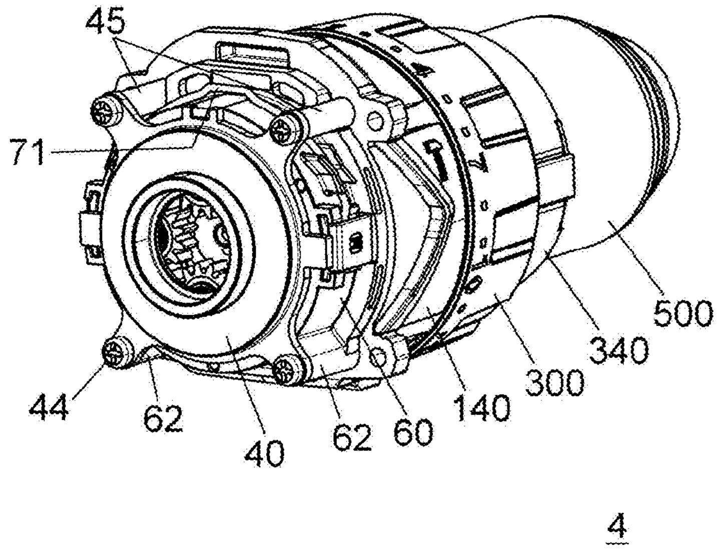
FIG. 27 is a perspective view of the transmission and output configuration part 4 as seen from the rear.
Figure 28:
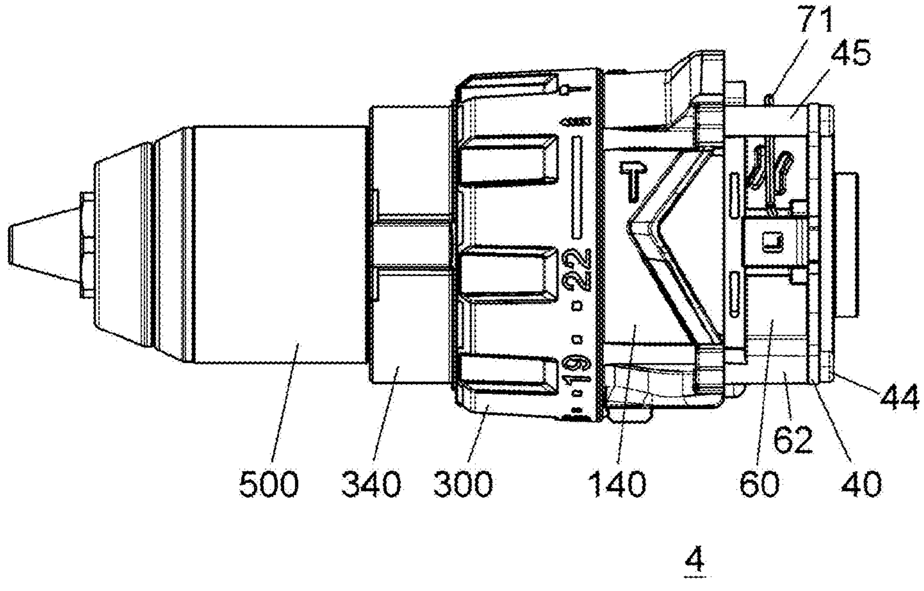
FIG. 28 is a left side view of the transmission and output configuration part 4.
Figure 29:
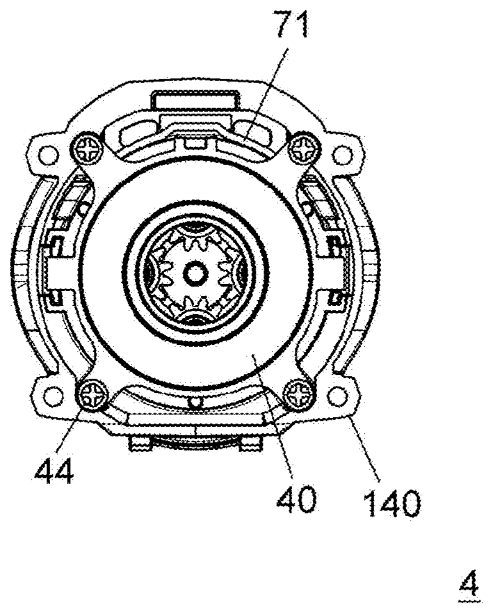
FIG. 29 is a rear view of the transmission and output configuration part 4.
Figure 30:
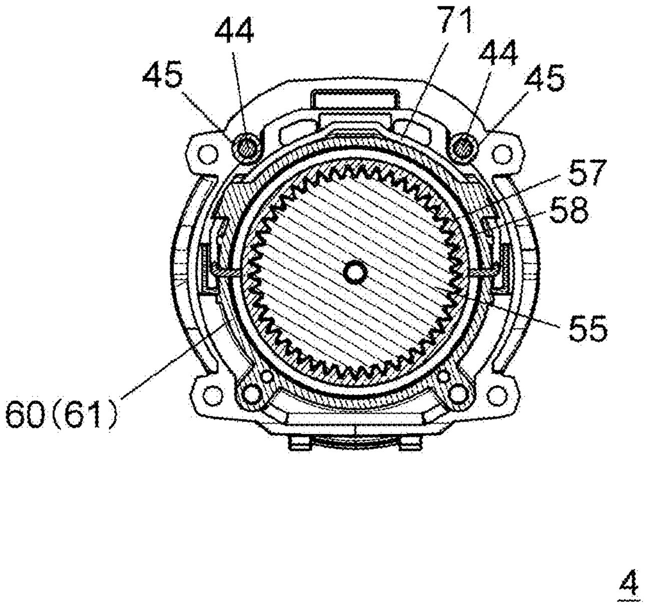
FIG. 30 is a rear cross-sectional view of the transmission and output configuration part 4, and is a cross-sectional view cut at an engagement portion between a shift arm 71 and a slide ring gear 57.

The clutch hub 370 is biased forward by the ratchet spring 360 and presses the ratchet cam ring 280 forward. The locking convex part 373 of the clutch hub 370 appearing in FIGS. 18A to 18D and the locking convex part 412 of the rear ratchet 410 appearing in FIGS. 19A to 19C and 19E to 19F engage with each other as shown in FIG. 22C and FIG. 26D when the clutch hub 370 is in the vibration-on position.

Figure 22A:
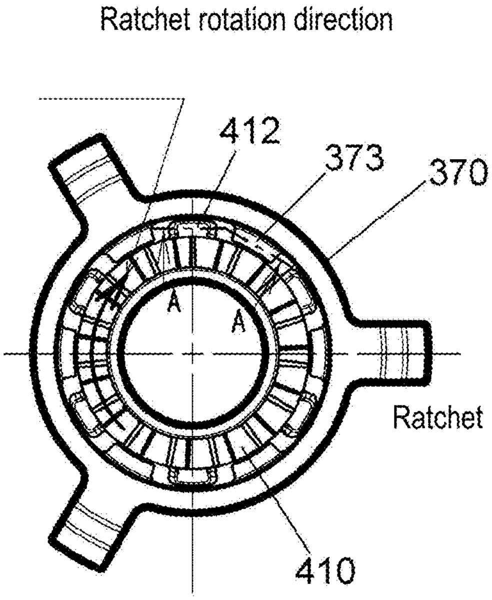
FIG. 22A is a view of the clutch hub 370 and the rear ratchet 410 as seen from the front.
Figure 22B:
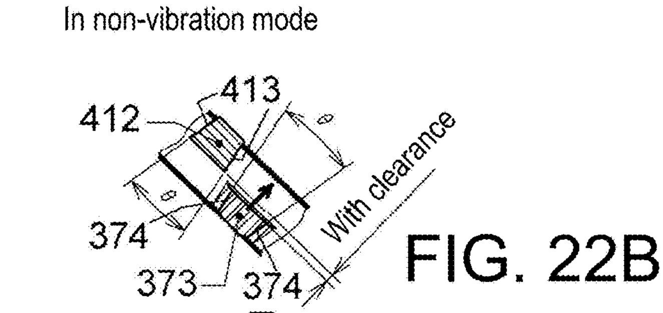
FIG. 22B is a cross-sectional view along line A-A in FIG. 22A, and shows a positional relationship between a locking convex part 373 of the clutch hub 370 and a locking convex part 412 of the rear ratchet 410 in a mode other than a vibration mode.
Figure 22C:
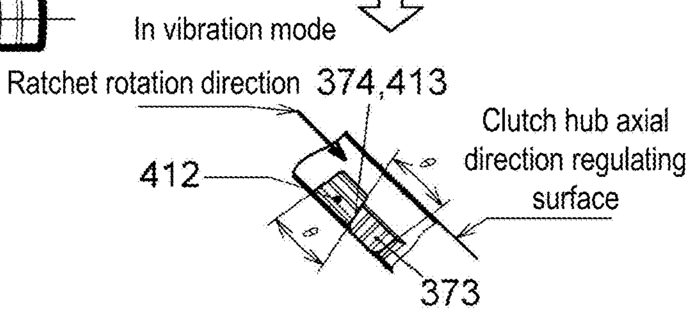
FIG. 22C is a cross-sectional view along line A-A in FIG. 22A, and shows a positional relationship between the locking convex part 373 of the clutch hub 370 and the locking convex part 412 of the rear ratchet 410 in the vibration mode.
Figure 23A:
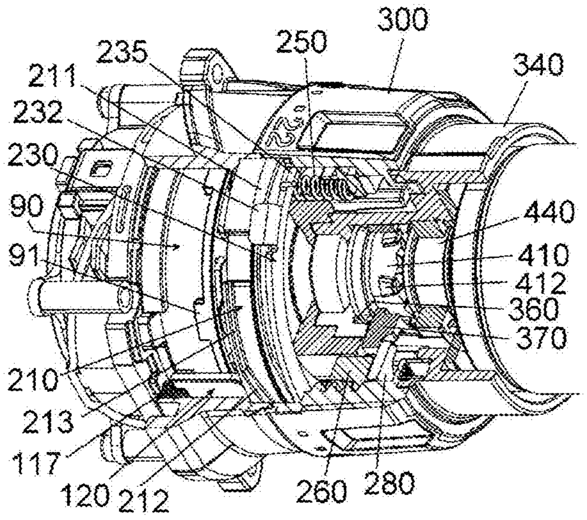
FIGS. 23A to 23E are views illustrating configurations in which a portion is cut off, and are views showing necessary structures of the work machine in which a clutch mode and a set tightening torque are set to the lowest from respectively different viewpoints.
Figure 23B:
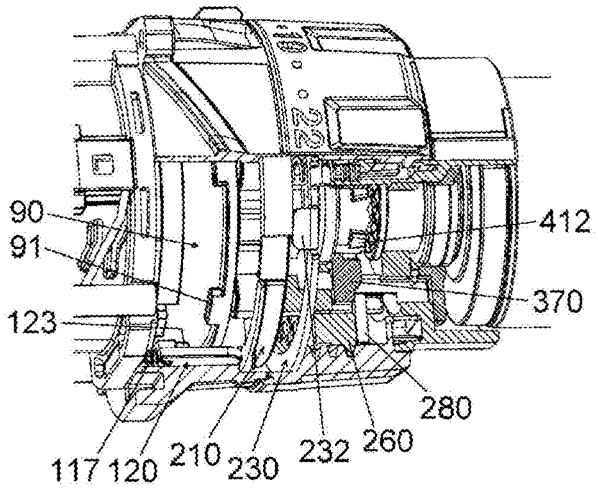
Figure 23C:
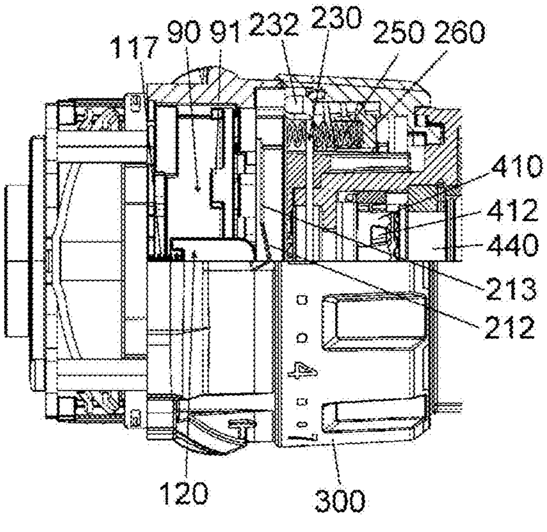
Figure 23D:
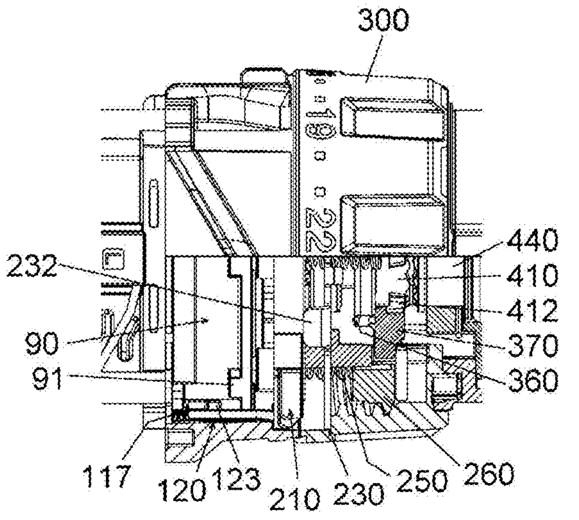
Figure 23E:
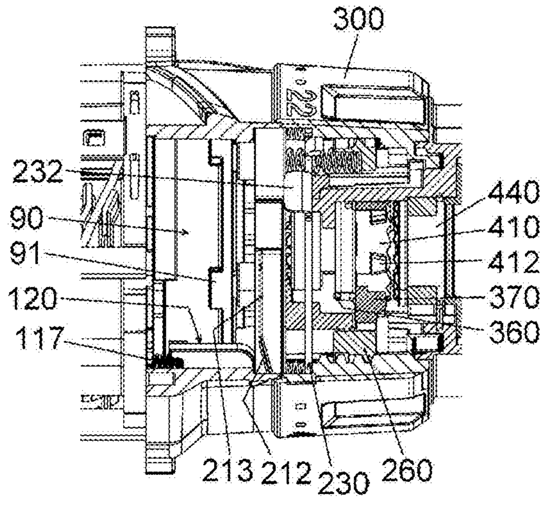
Figure 24A:
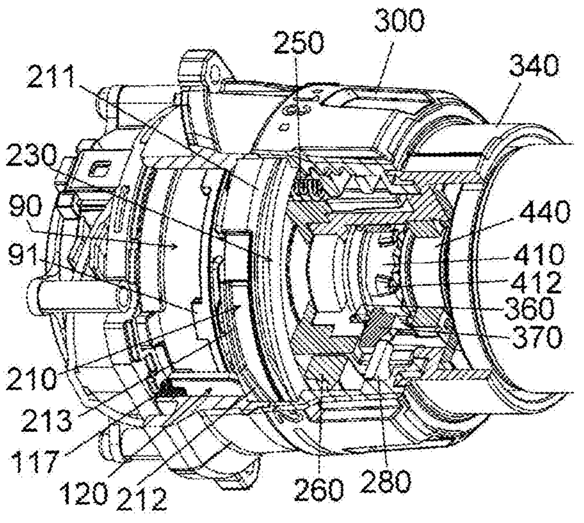
FIGS. 24A to 24E are views illustrating configurations in which a portion is cut off, and are views showing necessary structures of the work machine in which a clutch mode and a set tightening torque are set to the highest from respectively different viewpoints.
Figure 24B:
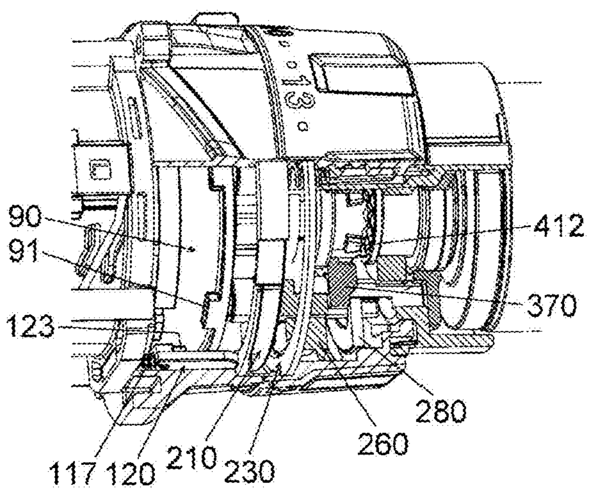
Figure 24C:
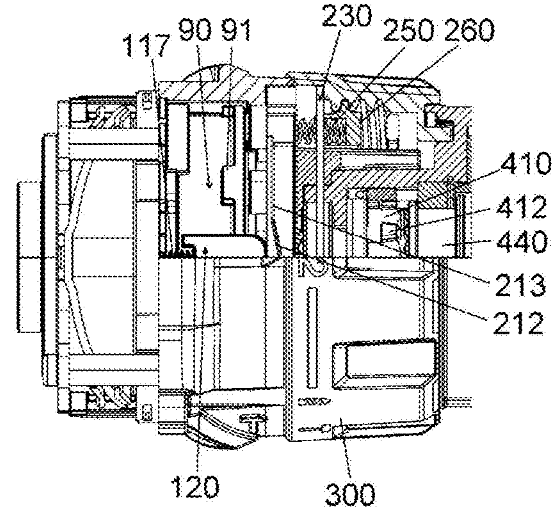
Figure 24D:
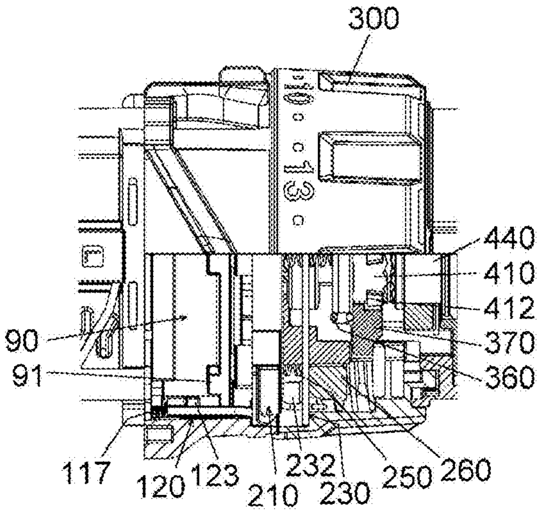
Figure 24E:
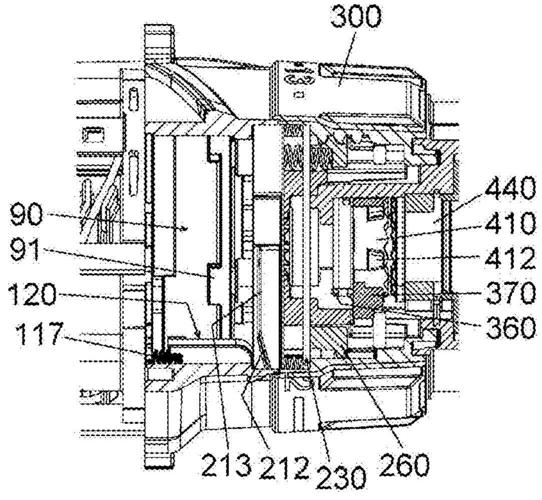
Figure 25A:
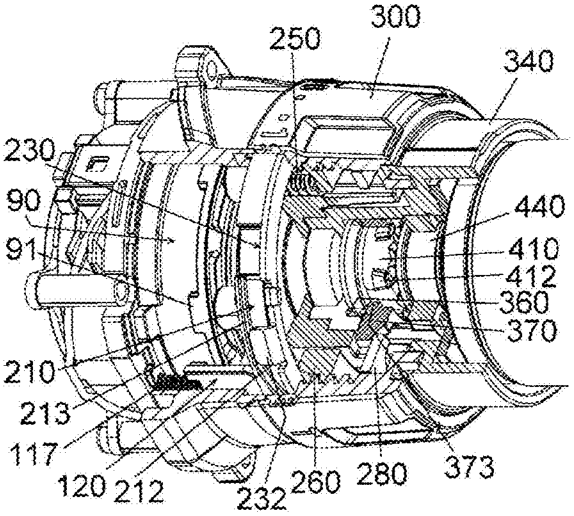
FIGS. 25A to 25E are views illustrating configurations in which a portion is cut off, and are views showing necessary structures of the work machine set to a drill mode from respectively different viewpoints.
Figure 25B:
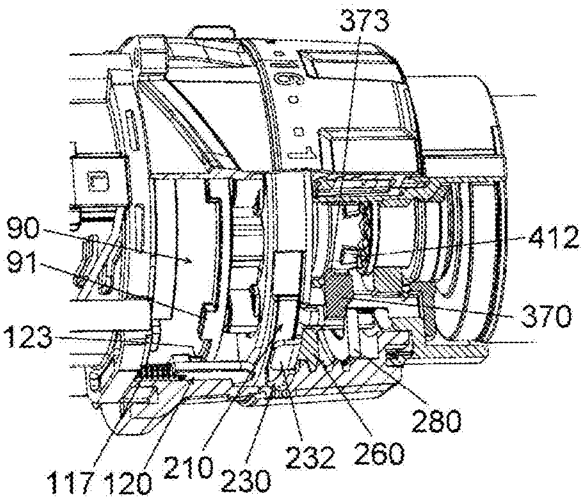
Figure 25C:
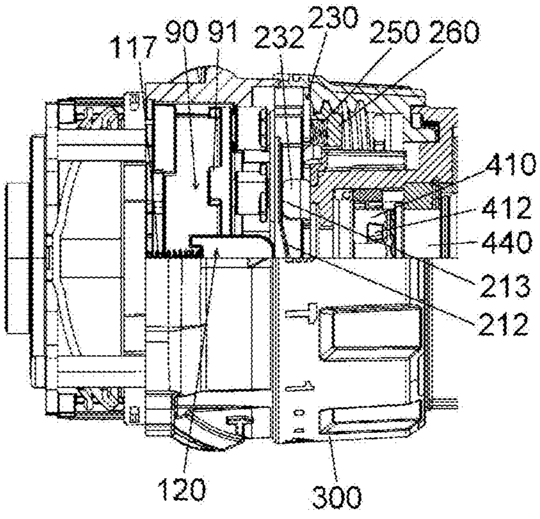
Figure 25D:
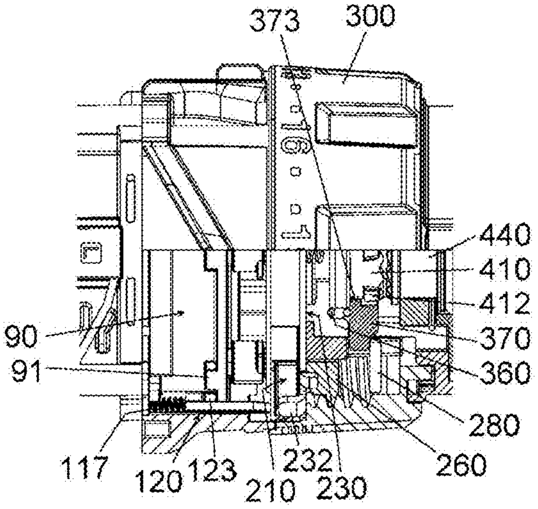
Figure 25E:
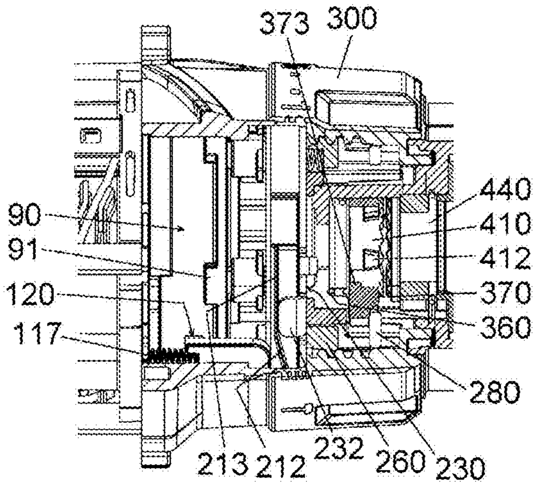

As shown in FIGS. 22B and 22C, inclination parts 374, 413 are provided on two side parts of the locking convex part 373 of the clutch hub 370 and the locking convex part 412 of the rear ratchet 410 in the peripheral direction, making it difficult for the clutch hub 370 to move from the vibration-on position to the vibration-off position. By using an angle θ shown in FIGS. 22B and 22C, the inclination angle is represented as θ/2 with respect to the front-rear direction. When the clutch hub 370 is at the vibration-on position, the inclination parts 374, 413 in the locking convex parts 373, 412 are in contact with each other. In such state, if a force in the rotational direction is applied to the rear ratchet 410, through the engagement of the inclination parts 374, 413, a forward force is applied to the clutch hub 370, and the movement to the vibration-off position becomes difficult.

FIGS. 25A to 25E and FIGS. 26A to 26E show the process of switching from the drill mode to the vibration mode, where the ratchet cam ring 280 and the clutch hub 370 advance through the biasing of the ratchet spring 360, and the positions of the locking convex part 373 of the clutch hub 370 and the locking convex part 412 of the rear ratchet 410 in the front-rear direction are aligned. In the process, the outer peripheral protrusion part 232 and the inner peripheral protrusion part 234 of the front stopper cam ring 230 move over the outer peripheral flat part 213 and the inner peripheral flat part 215 of the rear stopper cam ring 210, and the rotation restriction of the final ring gear 90 by the stopper block 120 is effectively maintained.

When the clutch dial 300 is within a predetermined rotation range corresponding to the aforementioned clutch mode and the drill mode (the rotational position between the state shown in FIGS. 23A to 23E and the state shown in FIGS. 25A to 25E), the outer peripheral protrusion part 282 and the inner peripheral protrusion part 284 of the ratchet cam ring 280 are in contact with the flat part (the plane part perpendicular to the front-rear direction) of the clutch dial 300, and the ratchet cam ring 280 and clutch hub 370 do not advance (do not move to the vibration-on position).

(Passing method of the shift arm 71) As described above, the motor spacer 40, the rear case 60, and the gear case 140 are fixed by using four screws 44, and the transmission part housing is formed. Accordingly, the rigidity of the entire transmission part housing is enhanced, and the deformation can be suppressed, for example, when the clutch mechanism operates.

On the other hand, in a structure where the shift arm 71 extends to the guide hole 64 of the rear case 60 through the outer side of the screw 44 in the radial direction of the rear case 60, the motor accommodation part 11 covering the further outer side of the shift arm 71 becomes larger, leading to an increase in the size of the product.

As shown in FIGS. 27 to 30, in the work machine 1, the shift arm 71 extends to the guide hole 64 of the rear case 60 by passing through the inner side of the screw 44 in the radial direction of the rear case 60.

In the state where the motor spacer 40, the rear case 60, and the gear case 140 are fixed by two screws 44 on the upper side, there is a gap between the outer surface of the rear case 60 and the two screws 44 on the upper side, and the shift arm 71 extends to the gap.

The two screws 44 on the upper side have portions extending the outer side of the rear case 60 in the front-rear direction. The portions are inserted through screw collars 45, which are tubular parts separate from the rear case 60. In other words, each of the two screws 44 on the upper side penetrates through the screw through hole 43 of the motor spacer 40 and the screw collar 45, and is screwed into the screw hole 151 of the gear case 140. The screw collar 45 is used to suppress the motor spacer 40 from being bent or broken due to over-tightening of the two screws 44 on the upper side. The shift arm 71 passes through the gap between the outer peripheral surface of the screw collar 45 and the outer peripheral surface of the rear case 60.

Each of the two screws 44 on the lower side penetrates through the screw through hole 43 of the motor spacer 40 and the through hole 67 of the rear case 60, and is screwed into the screw hole 151 of the gear case 140. The screw boss part 62 having the through hole 67 is a part of the rear case 60 (integral with the rear case 60), and there is no gap between the screw boss part 62 and the outer surface of the rear case 60. However, this is not the part where the shift arm 71 passes through, so there are no issues such as an increased size.

Figure 31:
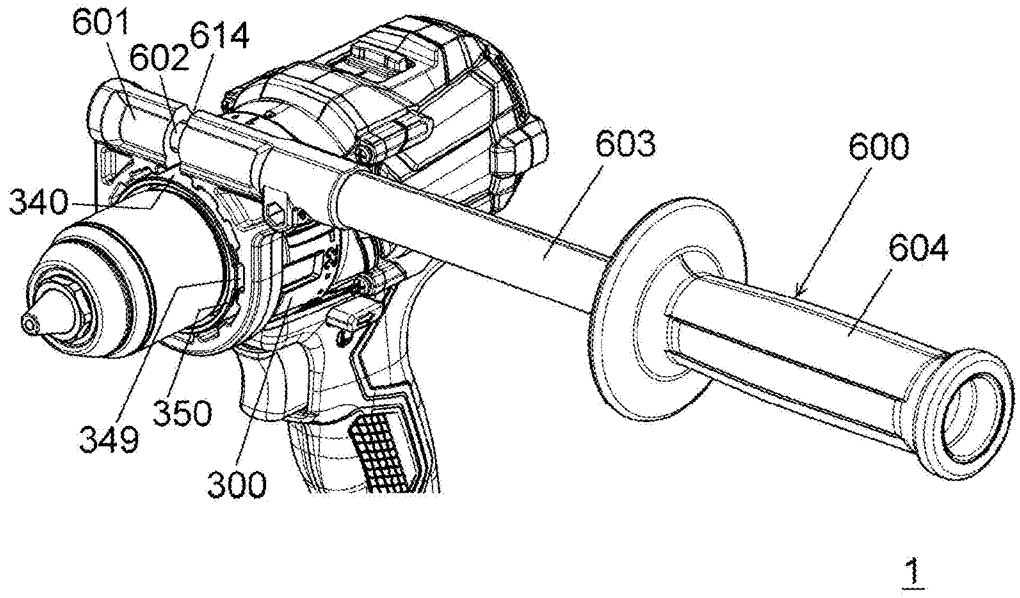
FIG. 31 is a perspective view of an upper part of the work machine 1 to which a sub-handle 600 is mounted, as seen from the front.
Figure 32:
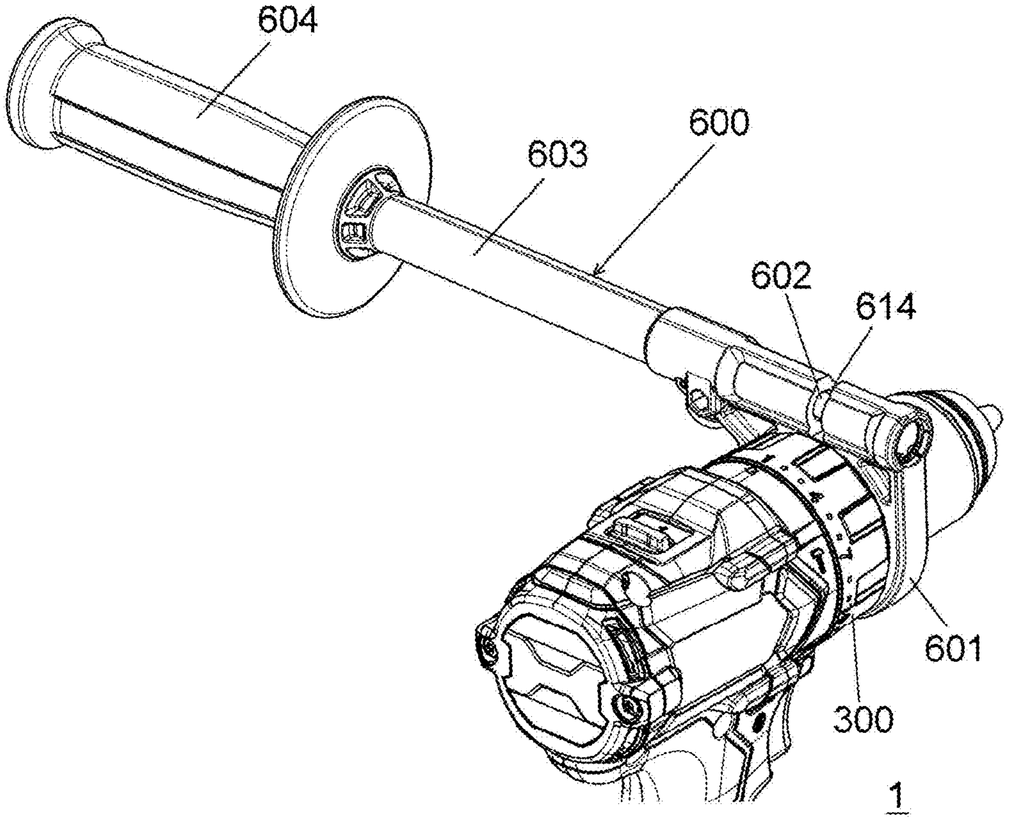
FIG. 32 is a perspective view of the upper part of the work machine 1 to which the sub-handle 600 is mounted, as seen from the rear.
Figure 33:
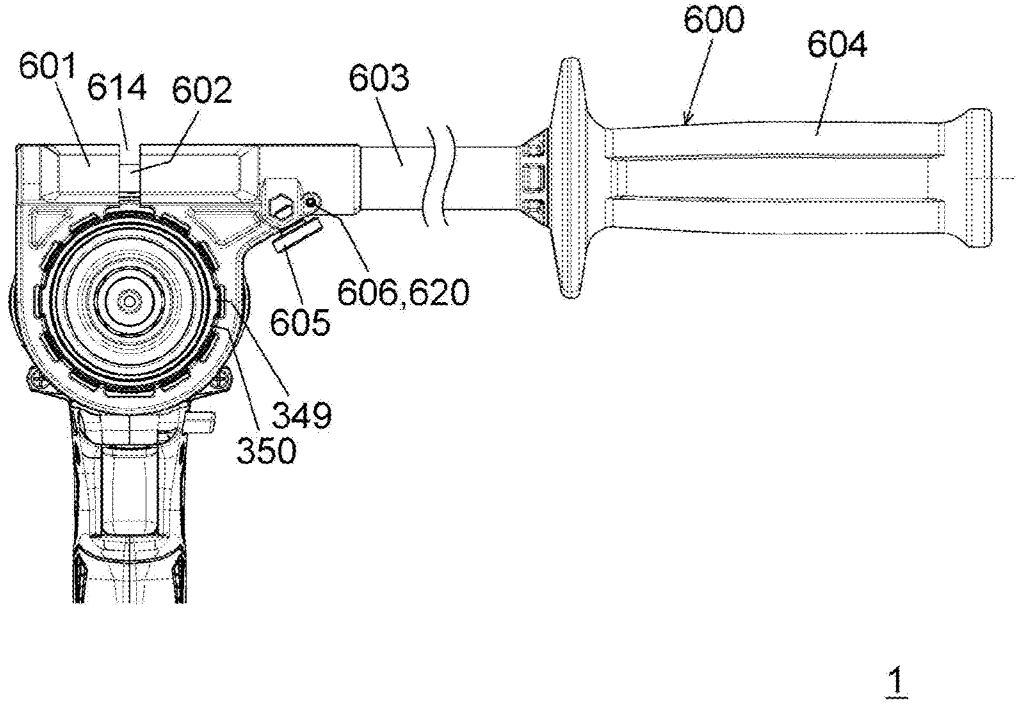
FIG. 33 is a front view of the work machine 1 to which the sub-handle 600 is mounted.
Figure 34:
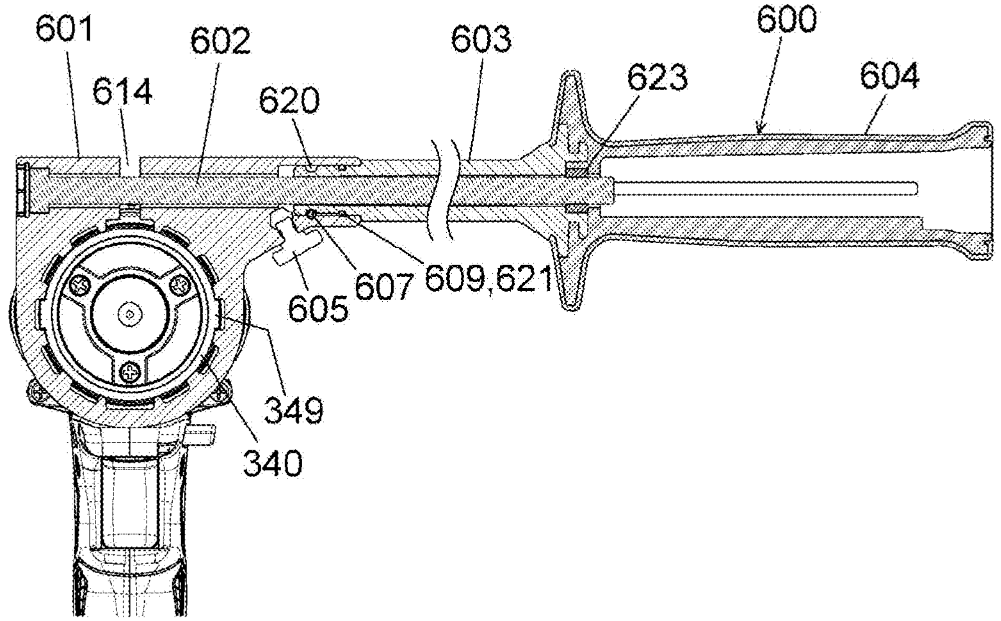
FIG. 34 is a front cross-sectional view of the work machine 1 to which the sub-handle 600 is mounted.

(Sub-handle 600) FIGS. 31 to 39C relate to the sub-handle 600 of the embodiment. FIGS. 31 to 34 and FIGS. 39A to 39C show the work machine 1 with the sub-handle 600 attached. FIGS. 35 to 38 show the sub-handle 600 alone. The front case 340 is a handle installation part of the work machine 1. It should be noted that the sub-handle 600 is not limited to the mounting structure extending leftward from the work machine 1 as shown in FIG. 31, etc., but can also be mounted in a structure extending rightward from the work machine 1.

(Opening and closing structure of a mounting part 601) The sub-handle 600 includes a mounting part 601, a first shaft part 602, and a second shaft part 603.

The mounting part 601 is annular with a gap 614 in a portion in the peripheral direction, and engages with the front case 340 of the work machine 1. The mounting part 601 has a pin through hole 606, a first tubular part 612, a second tubular part 613, and an annular part 615.

The first tubular part 612 is provided on the upper part of the annular part 615 and on a side (the left side in FIG. 35) of the gap 614 in the length direction of the gap 614 (hereinafter referred to as "gap length direction"), and extends in the gap length direction.

The first tubular part 612 has a head holding part 624 and a shaft insertion part 626. The head holding part 624 holds a head part 610 of the first shaft part 602. The head holding part 624 is positioned on a side (the left side in FIG. 35) of the shaft insertion part 626 in the gap length direction, and when viewed from the gap length direction, the head holding part 624 is larger than the shaft insertion part 626 and non-circular, such as being hexagonal, and the head part 610 fits into the head holding part 624. The shaft insertion part 626, when viewed from the gap length direction, is smaller than the head part 610 and allows the shaft part 611 of the first shaft part 602 to pass through.

The second tubular part 613 is provided on the upper part of the annular part 615 and on the other side (the right side in FIG. 35) of the gap 614 in the gap length direction, and extends in the gap length direction. The center axes of the first tubular part 612 and the second tubular part 613 are parallel to the gap length direction.

The second tubular part 613 has a shaft insertion part 627 and an extended diameter part 628. The shaft insertion part 627 allows the shaft part 611 of the first shaft part 602 to pass through. The extended diameter part 628 is positioned on the other side (the right side in FIG. 35) of the shaft insertion part 627 in the gap length direction, has a larger diameter than the shaft insertion part 627, and allows the shaft part 611 of the first shaft part 602 to pass through while also allowing the end of the second shaft part 603 to be inserted. The pin through hole 606 faces the interior of the extended diameter part 628. The pin through hole 606 opens in a direction that intersects with the gap length direction.

The annular part 615 has, on the inner peripheral surface, two first rotation stopping concave parts 616 and ten second rotation stopping concave parts 617. The two first rotation stopping concave parts 616 are provided substantially 180° apart in the peripheral direction of the mounting part 601. The two first rotation stopping concave parts 616 are mutually opposed to each other by sandwiching the center part of the mounting part 601. The ten second rotation stopping concave parts 617 are provided at equal angular intervals, and each five of the second rotation stopping concave parts 617 are provided between the two first rotation stopping concave parts 616 in the peripheral direction of the mounting part 601. The first rotation stopping concave part 616 is longer in the peripheral direction of the mounting part 601 than the second rotation stopping concave part 617.

A depth gauge (not shown) can be mounted to the sub-handle 600, and a knob bolt 605 is used to secure the depth gauge.

The first shaft part 602 and the second shaft part 603 form an adjustment mechanism that can adjust the length of the gap 614 within a predetermined range including a length greater than the natural length. The natural length is a length of the gap 614 in a state where no external force is applied to the mounting part 601 to widen or narrow the gap 614.

The first shaft part 602 extends in the gap length direction and is unmovably provided on the mounting part 601 on a side (the left side in FIG. 35) of the gap 614 in the gap length direction. The first shaft part 602 passes through the gap 614 and protrudes from the mounting part 601 toward the other side in the gap length direction.

The second shaft part 603 extends in the gap length direction and is unmovably provided on the mounting part 601 on the other side (the right side in FIG. 35) of the gap 614 in the gap length direction. The second shaft part 603 protrudes from the mounting part 601 toward the other side in the length direction.

The first shaft part 602 and the second shaft part 603 are engaged to be movable in the gap length direction, and the length of the gap 614 is adjustable by moving the second shaft part 603 relative to the first shaft part 602 in the gap length direction.

The first shaft part 602 and second shaft part 603 are screw-engaged with each other, and by rotating the second shaft part 603 relative to the first shaft part 602, the second shaft part 603 is movable relative to the first shaft part 602 in the length direction.

The first shaft part 602 includes a head part 610 and a shaft part 611. The head part 610 is positioned on a side of the shaft part 611 in the gap length direction and, when viewed from the gap length direction, the head part 610 is larger in size than the shaft part 611 and non-circular, such as being hexagonal. The head part 610 fits into the head holding part 624 of the mounting part 601, thereby making the first shaft part 602 not rotatable relative to the mounting part 601 and preventing the first shaft part 602 from coming out of the mounting part 601 on the other side (the right side in FIG. 35) in the gap length direction. Additionally, a stopping ring 608 provided on the inner peripheral surface of the first tubular part 612 adjacent to the head holding part 624 prevents the first shaft part 602 from coming out of the mounting part 601 on a side (the left side in FIG. 35) in the gap length direction.

The shaft part 611 extends from the head part 610 to the other side in the gap length direction, passes through the shaft through parts 626, 627 of the mounting part 601, and reaches the inner side of the second shaft part 603. A male screw part 622 is provided on the outer peripheral surface of the tip end of the shaft part 611.

The second shaft part 603 includes, in the order from the other side in the gap length direction, a grip part 604, a large-diameter part 618, and a small-diameter part 619.

The small-diameter part 619 is inserted into the extended diameter part 628 of the second tubular part 613 of the mounting part 601. Both the small-diameter part 619 and the extended diameter part 628 have circular cross-sections. The small-diameter part 619 includes a pin through groove 620 and an O-ring fitting groove 621. The pin through groove 620 and the O-ring fitting groove 621 are groove parts that each encircle the outer peripheral part of the small-diameter part 619. The pin through groove 620 is positioned on a side (the left side in FIG. 35) of the O-ring fitting groove 621 in the gap length direction.

The pin 607 inserted into the pin through hole 606 extends into the pin through groove 620. The pin through hole 606 is positioned at the same position as the pin through groove 620 in the gap length direction. The pin 607 passes through the pin through hole 606 and extends into the interior of the pin through groove 620, and prevents the second shaft part 603 from moving in the gap length direction relative to the second tubular part 613 of the mounting part 601.

The second shaft part 603 is rotatable relative to the second tubular part 613. An O-ring 609 fits into the O-ring fitting groove 621. The O-ring 609 generates frictional resistance against the rotation of the second shaft part 603 relative to the second tubular part 613, and suppresses the second shaft part 603 from rotating easily.

Figure 35:
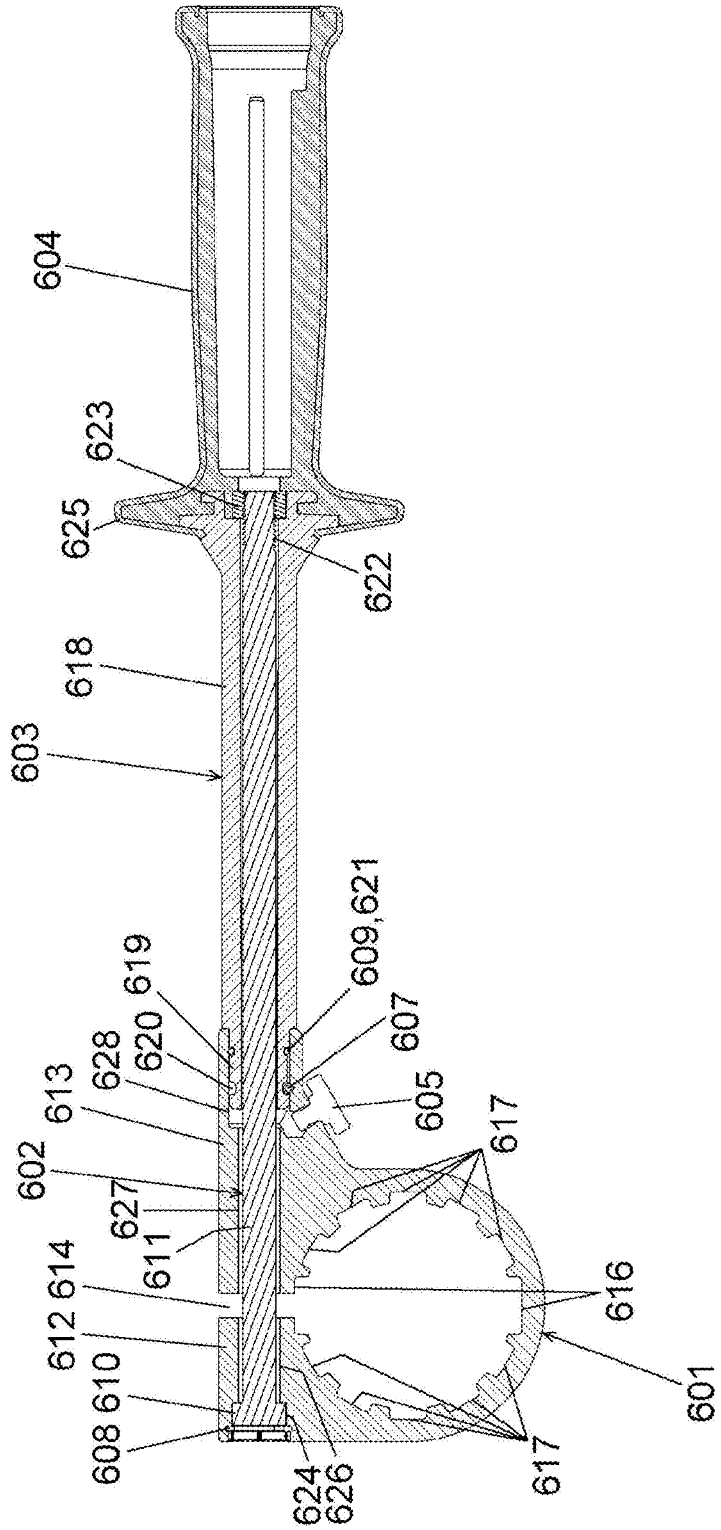
FIG. 35 is a front cross-sectional view of the sub-handle 600.
Figure 36:
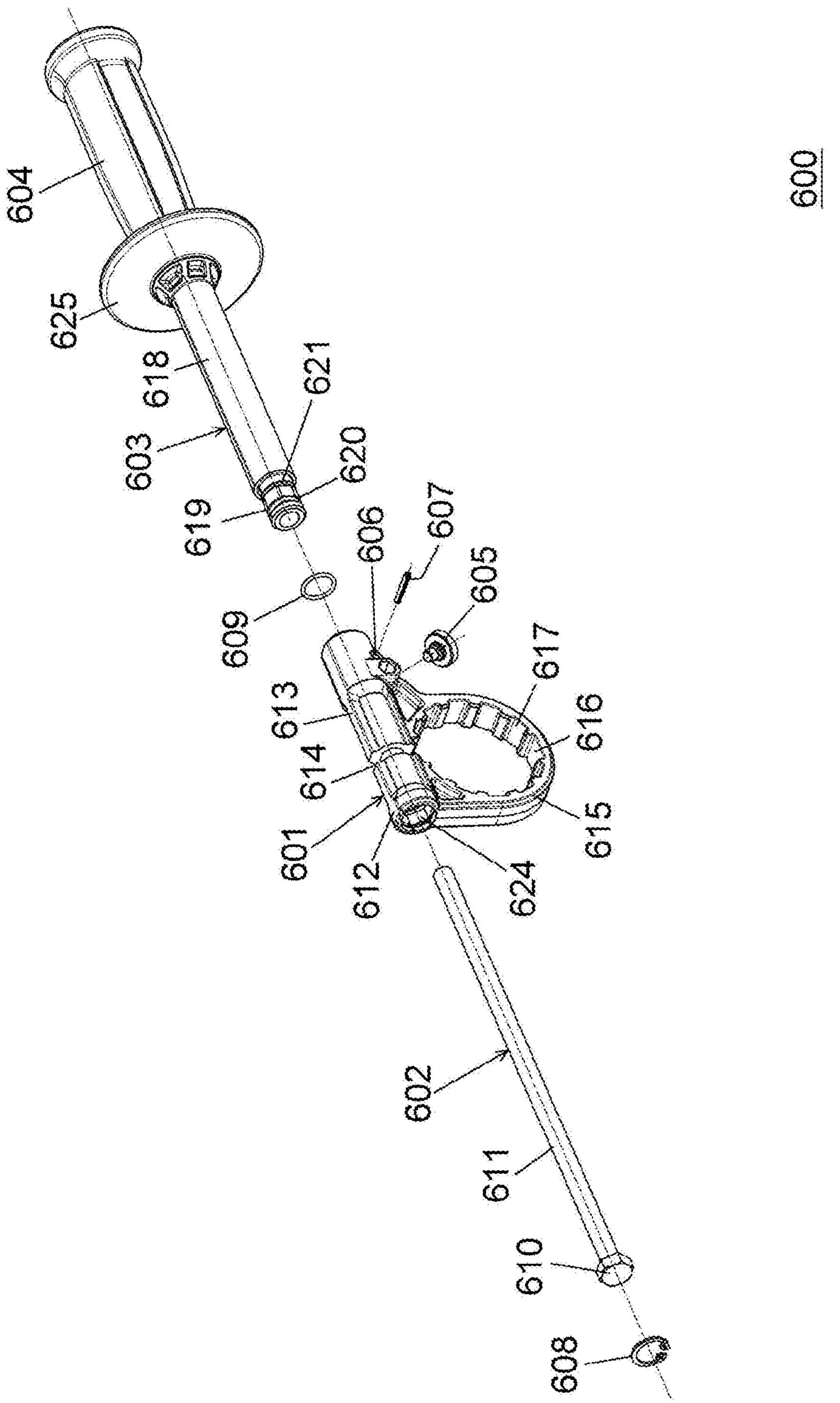
FIG. 36 is an exploded perspective view of the sub-handle 600.
Figure 37:
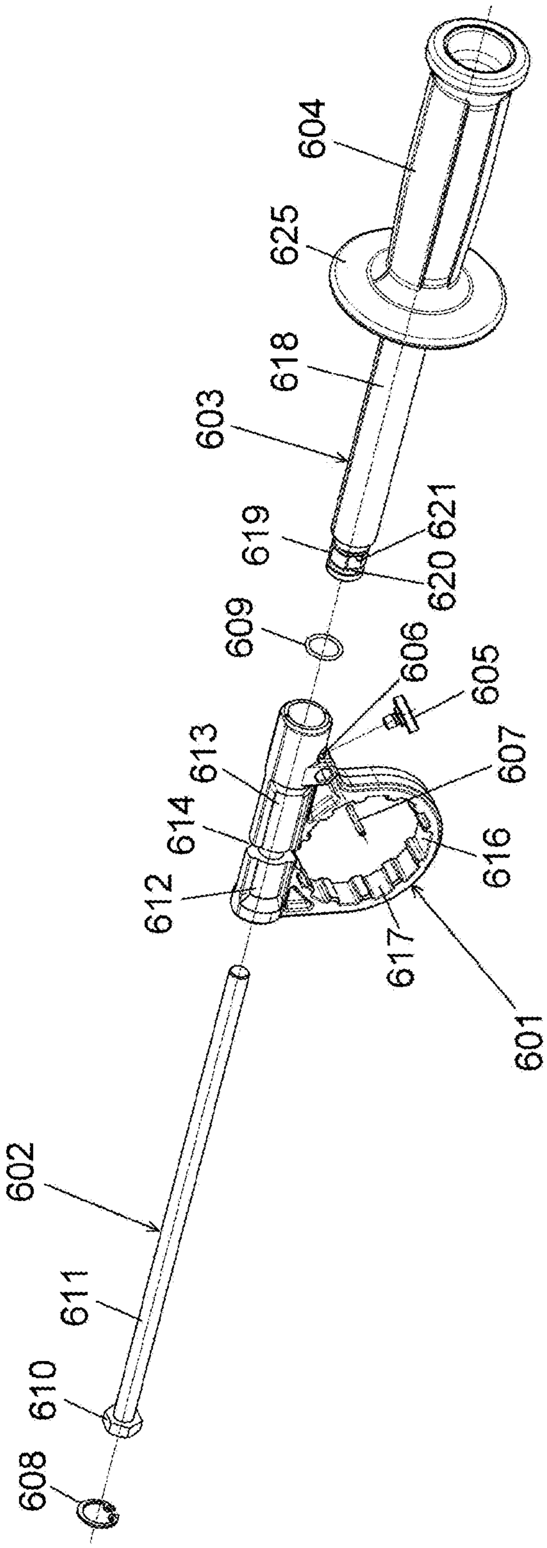
FIG. 37 is an exploded perspective view of the sub-handle 600 as seen from a different viewpoint than FIG. 36.

The second shaft part 603 includes a nut part 623 that forms a female screw part. The nut part 623 is screwed into the male screw part 622 of the first shaft part 602. The nut part 623 may be a separate component from or integrated with the large-diameter part 618 and the small-diameter part 619. In the example of FIG. 35, the nut part 623 is shown as a separate component from the large-diameter part 618 and the small-diameter part 619.

When the grip part 604 is rotated, the entire second shaft part 603 integrally rotates relative to the mounting part 601 and the first shaft part 602. In conjunction with the rotation, due to the screw engagement between the male screw part 622 of the first shaft part 602 and the nut part 623 of the second shaft part 603, the second shaft part 603 moves in the gap length direction relative to the first shaft part 602. At the time, through the engagement between the second shaft part 603 and the second tubular part 613 of the mounting part 601 via the pin 607, the second tubular part 613 moves in the gap length direction relative to the first tubular part 612. This adjusts the length of the gap 614.

Figure 38:
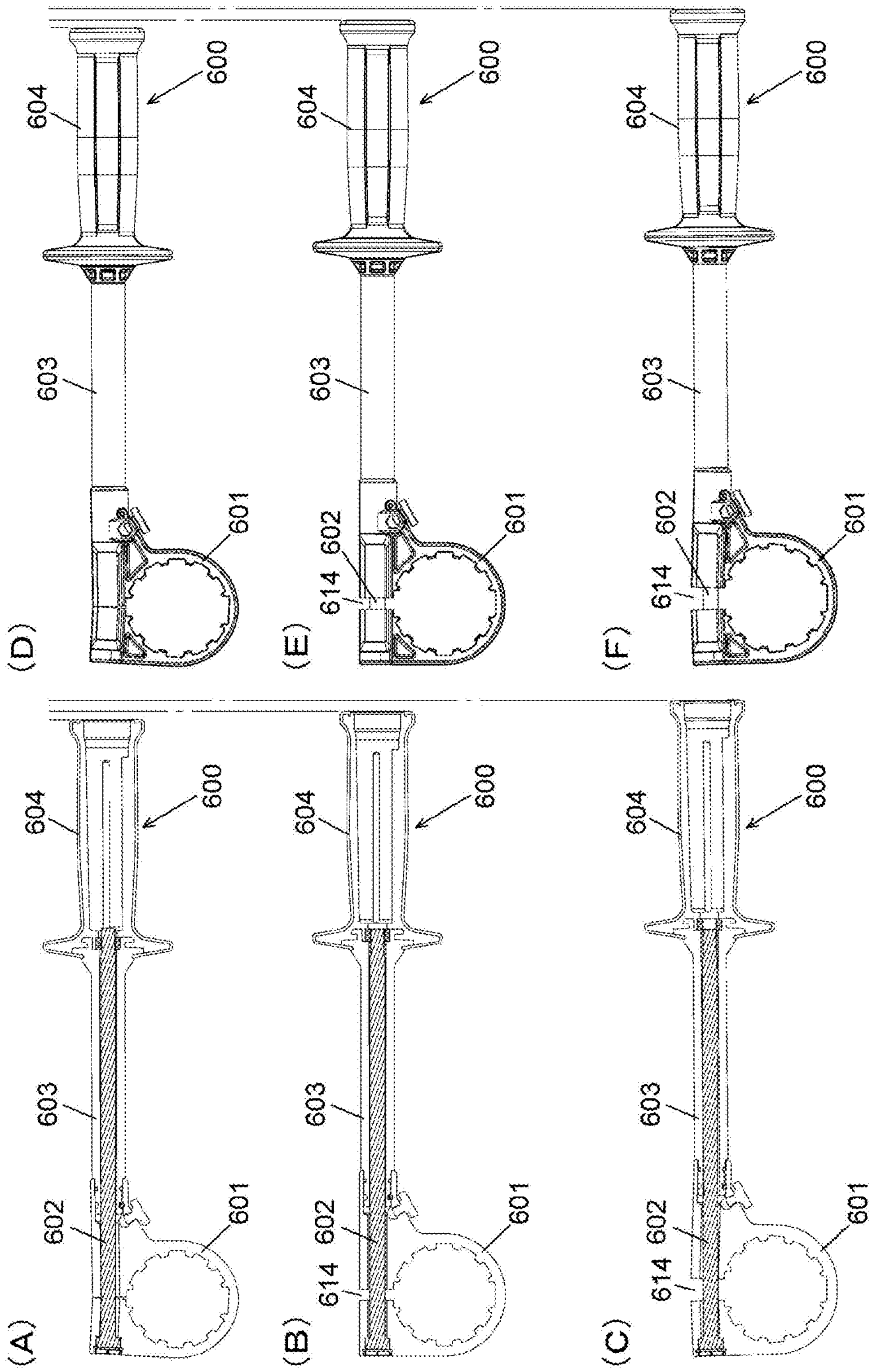
FIG. 38 is an explanatory view of an openable range of a mounting part 601 of the sub-handle 600.

From the state shown in (B) and (E) of FIG. 38, namely the state where the gap 614 is at its natural length, if the grip part 604 is rotated leftward, the second shaft part 603 can be relatively moved to the other side (the right side in FIG. 38) in the gap length direction, thereby adjusting the length of the gap 614 to be longer than the natural length. (C) and (F) of FIG. 38 show the state where the length of the gap 614 is at the maximum, that is, the state where the mounting part 601 is opened to the maximum extent. The length of the screw engagement between the male screw part 622 of the first shaft part 602 and the nut part 623 of the second shaft part 603 is set such that the upper limit of the length of the gap 614 is within a predetermined length that does not damage the mounting part 601.

From the state shown in (B) and (E) of FIG. 38, namely the state where the gap 614 is at its natural length, if the grip part 604 is rotated rightward, the second shaft part 603 and the second tubular part 613 of the mounting part 601 can be relatively moved to a side (the left side in FIG. 35) in the gap length direction, thereby adjusting the length of the gap 614 to be shorter than the natural length. (A) and (D) of FIG. 38 show the state where the length of the gap 614 is at the minimum, that is, the state where the mounting part 601 is closed to the maximum extent. By adjusting the length of the gap 614 to be shorter than its natural length, the mounting part 601 can tighten the front case 340, thereby fixing the sub-handle 600 to the front case 340.

By opening the gap 614 wider than the natural length, it is possible to pass the front case 340 of the work machine 1 to the inner side of the mounting part 601. The stopping convex part 350 of the front case 340 has dimensions that are too large to be inserted into the inner side of the mounting part 601 in the state where the gap 614 is the natural length. The stopping convex part 350 suppresses (prevents) the mounting part 601 from coming off forward from the front case 340 in the state where the gap 614 is at the natural length or shorter than the natural length.

(Easy storage structure of the sub-handle 600) To attach the sub-handle 600 to the front case 340, the mounting part 601 is fitted onto the front case 340 from the front side in the state where the length of the gap 614 is adjusted to be longer than the natural length. Then, the grip part 604 is rotated to the right to reduce the gap 614.

In the case of attaching the sub-handle 600 to the front case 340, the attachment angle can be selected from multiple stages. Among the two first rotation stopping concave parts 616 and ten second rotation stopping concave parts 617 of the mounting part 601, two corresponding to the attachment angle of the sub-handle 600 relative to the front case 340 are in concavo-convex engagement with the two rotation stopping convex parts 349 of the front case 340.

The length of the first rotation stopping concave part 616 of the mounting part 601 in the peripheral direction is longer than the length of the rotation stopping convex part 349 of the front case 340 in the peripheral direction. The length of the second rotation stopping concave part 617 of the mounting part 601 in the peripheral direction is substantially equal to the length of the rotation stopping convex part 349 of the front case 340 in the peripheral direction.

When the second rotation stopping concave part 617 of the mounting part 601 is in concavo-convex engagement with the rotation stopping convex part 349 of the front case 340, the lengths of the two parts in the peripheral direction are substantially equal. Therefore, the sub-handle 600 can be mounted to the front case 340 with no or minimal rattling. The second rotation stopping concave part 617 of the mounting part 601 is used in the non-storage state of the sub-handle 600, that is, when the work machine 1 is in use.

In the case where the first rotation stopping concave part 616 of the mounting part 601 is in concavo-convex engagement with the rotation stopping convex part 349 of the front case 340, since the length of the first rotation stopping concave part 616 in the peripheral direction is greater than the length of the rotation stopping convex part 349 in the peripheral direction, the sub-handle 600 is able to rotate within a predetermined angular range relative to the front case 340. The first rotation stopping concave part 616 is used in the storage state of the sub-handle 600, that is, when the work machine 1 is not in use.

Figure 39A:
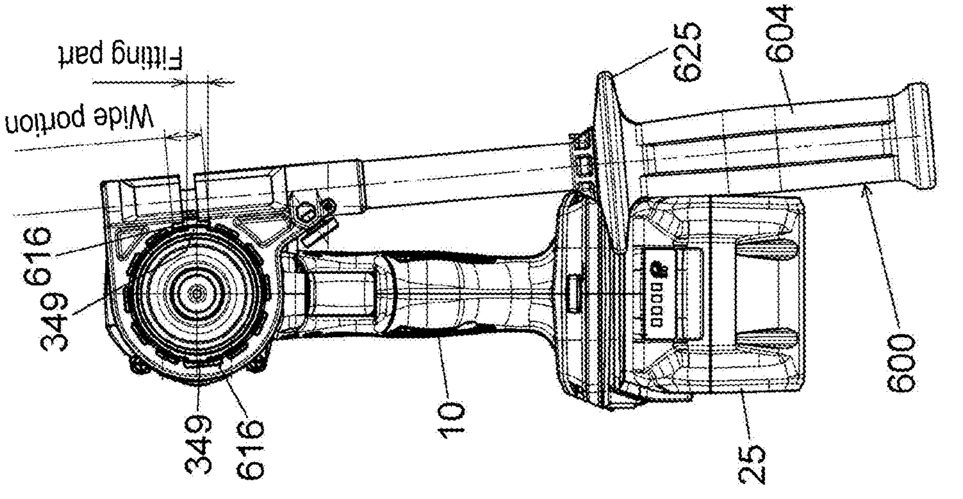
FIGS. 39A to 39C are diagrams showing that the sub-handle 600 is rotatable within a predetermined angular range in an accommodated state.
Figure 39B:
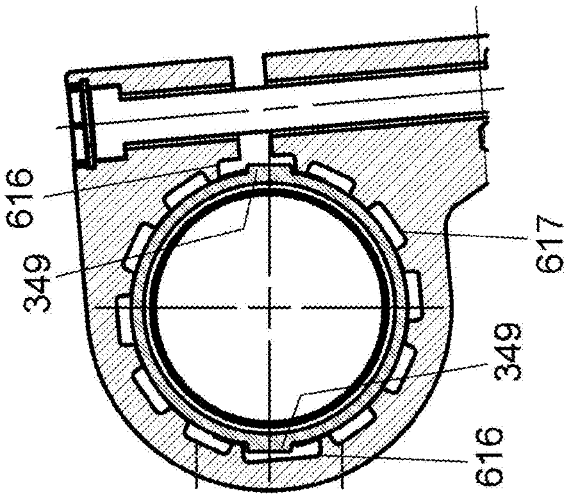
Figure 39C:
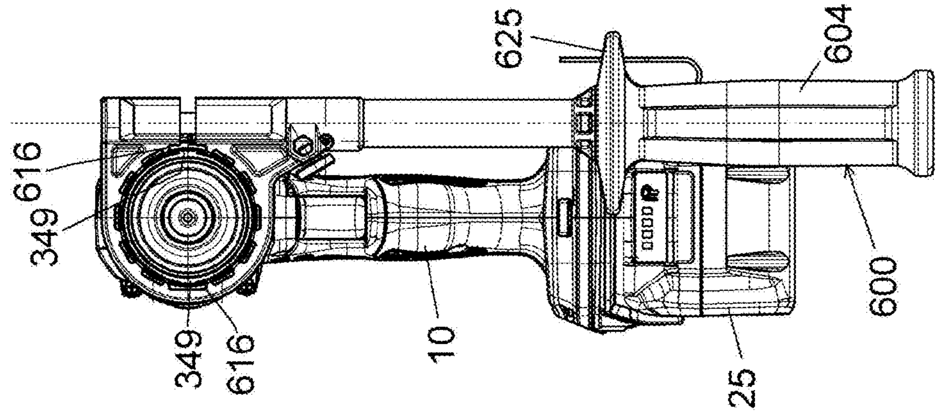

FIGS. 39A to 39C are diagrams showing that the sub-handle 600 is rotatable within a predetermined angular range in an accommodated state.

FIG. 39A shows the state where the sub-handle 600 is rotated counterclockwise to its maximum extent in the figure. Such state, as enlarged in the illustration of FIG. 39B, is a first engagement state where an end-side end of the first rotation stopping concave part 616 of the mounting part 601 engages with an end-side end of the rotation stopping convex part 349 of the front case 340 in the peripheral direction.

FIG. 39B shows the state where the sub-handle 600 is in the center of its rotatable range. Such state is a second engagement state where the end-side end of the first rotation stopping concave part 616 of the mounting part 601 does not contact the end-side end of the rotation stopping convex part 349 of the front case 340 in the peripheral direction. In the second engagement state, the other end-side end of the first rotation stopping concave part 616 of the mounting part 601 may engage with the other end side end of the rotation stopping convex part 349 of the front case 340 in the peripheral direction.

Even in the case where the first rotation stopping concave part 616 of the mounting part 601 is in concavo-convex engagement with the rotation stopping convex part 349 of the front case 340, by making the gap 614 of the mounting part 601 shorter than or equal to the predetermined length less than the natural length, the sub-handle 600 becomes unable to rotate relative to the front case 340 due to the frictional force caused by the mounting part 601 tightening the front case 340.

The embodiment provides the following operational effects.

(1) The work machine 1 includes the output switching unit 6 that switches the output of the output unit 7 (presence or absence of torque or vibration), and that is disposed to be sandwiched between the output unit 7 and a transmission unit 5. When the transmission unit 5 is removed from the output unit 7, the output switching unit 6 can be removed rearward from the output unit 7. Specifically, upon removing the screw 133 and removing the gear case 140 from the front case 340 (removing the transmission unit 5 from the output unit 7), the output switching unit 6 can be removed rearward from the output unit 7. Therefore, even in the case where the fixation of the spindle 470 and chuck 500 cannot be released, the components of the output switching part 6, namely parts such as the clutch dial 300, the nut 260, the clutch spring 250, etc., can be replaced. As a result, the repairability is favorable.

As a comparison, a structure (hereinafter referred to as "Comparative Structure 1") where the gear case 140 is extended forward, the ball bearings 335 and 461 are held, and the clutch dial 300 is prevented from coming off forward relative to the gear case 140 by using a stopping ring is considered. In Comparative Structure 1, the stopping ring cannot be accessed without removing the chuck 500 from the spindle 470, and the clutch dial 300, etc., cannot be removed either forward or backward. Therefore, in Comparative Structure 1, in the case where the clutch dial 300, etc., is damaged and needs replacement, it becomes necessary to either remove the chuck 500 from the spindle 470 by using a special jig, or replace the entire transmission and output configuration part 4, and the time or cost required for repair increases. The embodiment favorably addresses such issue.

(2) The transmission part 5 and the output part 7 can be commonly used as modules across multiple models, providing high convenience.

(3) The work machine 1 includes: the transmission mechanism 50 that includes the final ring gear 90; the stopper block 120 that makes the final ring gear 90 unable to rotate when in the lock position; and the stopper spring 117 that biases the stopper block 120 toward the lock position. Therefore, even in the state where the front end of the convex part 123 of the stopper block 120 attempting to move to the lock position contacts the rear end of the outer peripheral convex part 91 of the final ring gear 90 and cannot reach the lock position, if the final ring gear 90 subsequently rotates, the outer peripheral convex part 91 moves away from the front of the protrusion part 123, and the stopper block 120 automatically moves to the lock position. Consequently, it becomes possible to suppress the malfunction of being unable to make the final ring gear 90 not rotatable, that is, the malfunction of being unable to transition to the drill mode.

(4) The work machine 1 can switch the position of the stopper block 120 between the lock position and the non-lock position by using the clutch dial 300. Specifically, when the clutch dial 300 is rotated to the rotational position for the drill mode, the stopper block 120 moves to the lock position. Here, the force moving the stopper block 120 to the lock position is the biasing force of the stopper spring 117, instead of the screw engagement utilizing the rotation of the clutch dial 300. Therefore, compared with the structure where a stopper pin is pushed against the side of the final ring gear 90 by using the nut 260 moving forward/rearward in conjunction with the rotation of the chuck dial 300, the malfunction of being unable to rotate the clutch dial 300 to the rotational position for the drill mode can be suppressed, and the usability is favorable.

(5) The stopper spring 117 is configured to bias the stopper block 120 forward, and the stopper spring 117 and the stopper block 120 are provided behind the clutch dial 300. Therefore, compared with the case where the stopper spring 117 and the stopper block 120 are provided inside the clutch dial 300, the increase in the diameter of the clutch dial 300 can be suppressed, and the deterioration of the operability in rotating the clutch dial 300 can be suppressed.

(6) The rear stopper cam ring 210 and the front stopper cam ring 230 serve as a restricting part that restricts the movement of the stopper block 120 from the non-lock position to the lock position against the biasing force of the stopper spring 117 when the clutch dial 300 is within the rotational range of the clutch mode. Additionally, the rear stopper cam ring 210 and the front stopper cam ring 230 form a cam mechanism that moves the stopper block 120 between the non-lock position and the lock position in conjunction with the rotation of the clutch dial 300 between the rotational position for the drill mode and the rotational position for the clutch mode. Therefore, the structure can suitably realize the front-rear movement of the stopper block 120 (movement between the non-lock position and the lock position) that is limited to when the clutch dial 300 rotates between the rotational position for the drill mode and the rotational position for the clutch mode, without relying on the screw engagement between the clutch dial 300 and the nut 260.

(7) When the clutch dial 300 rotates between the rotational position for the drill mode and the rotational position for the clutch mode, the outer peripheral protrusion part 232 and the inner peripheral protrusion part 234 of the front stopper cam ring 230 move along the outer peripheral inclination part 212 and the inner peripheral inclination part 214 of the rear stopper cam ring 210. In this case, by making the inclination angle of the outer peripheral inclination part 212 and the inner peripheral inclination part 214 steeper than the inclination of the screw part 301 of the clutch dial 300, the stopper block 120 can be moved back and forth to a greater extent in conjunction with the rotation of the clutch dial 300 than the case where the stopper block 120 is moved by the screw engagement between the clutch dial 300 and the nut 260. This allows a reduced operation amount of the clutch dial 300 required for switching between the clutch mode and the drill mode, and the usability is favorable. Additionally, since the outer peripheral inclination part 212 and the inner peripheral inclination part 214 form a concave part, it becomes easier for the outer peripheral protrusion part 232 and the inner peripheral protrusion part 234 of the front stopper cam ring 230 to enter and exit the concave part. Therefore, the catching during the switching between the clutch mode and the drill mode is suppressed, and the usability is favorable.

(8) The rear stopper cam ring 210 is positioned in front of the final ring gear 90, and the stopper block 120 protrudes forward of the final ring gear 90 and engages with the rear stopper cam ring 210. As a result, the switching structure to the drill mode (the stopper block 120, the stopper spring 117, the rear stopper cam ring 210, the front stopper cam ring 230) is distributed in front of and behind the final ring gear 90. Therefore, differing from the case where the switching structure to the drill mode is biased to either the front or the rear of the final ring gear 90, it is easier to balance the radial sizes of the gear case 140 and the clutch dial 300, and the layout efficiency is favorable.

(9) In the work machine 1, when the clutch hub 370 reaches the vibration-on position, the clutch hub 370 restricts the movement of the rear ratchet 410. Vibration is generated by driving the front ratchet 440 by using the driving force of the motor 30 with respect to the rear ratchet 410 whose movement is restricted. When the clutch dial 300 comes to the rotational position corresponding to the vibration mode, the outer peripheral protrusion part 282 and the inner peripheral protrusion part 284 of the ratchet cam ring 280 enter into the outer peripheral hole part 305 and the inner peripheral concave part 304 of the clutch dial 300 respectively along their own inclination parts 286, 287, and the ratchet cam ring 280 and the clutch hub 370 move from the vibration-off position to the vibration-on position by the biasing of the ratchet spring 360. Therefore, compared with the structure where the clutch hub 370 is pushed forward by the nut 260 that moves forward and rearward in conjunction with the rotation of the clutch dial 300, the operation amount of the clutch dial 300 required to switch between the presence and the absence of vibration can be reduced, and the usability is favorable.

(10) The outer peripheral protrusion part 282 and the inner peripheral protrusion part 284 of the ratchet cam ring 280 possess the inclination parts 286, 287. Therefore, the outer peripheral protrusion part 282 and the inner peripheral protrusion part 284 can smoothly enter and exit the outer peripheral hole part 305 and the inner peripheral concave part 304 of the clutch dial 300, the catching during switching between the drill mode and vibration mode can be suppressed, and the usability is favorable.

(11) The ratchet cam ring 280 and the clutch dial 300 serve as a restricting part that restricts the movement of the clutch hub 370 from the vibration-off position to the vibration-on position by resisting the biasing force of the ratchet spring 360 when the clutch dial 300 is within the rotational ranges of the clutch mode and the drill mode. Additionally, the ratchet cam ring 280 and the clutch dial 300 form a cam mechanism that moves the clutch hub 370 between the vibration-off position and the vibration-on position in conjunction with the rotation of the clutch dial 300 between the rotational position of the vibration mode and the rotational position of the drill mode. As a result, the front-rear movement of the clutch hub 370 is limited to when the clutch dial 300 rotates between the rotational position of the vibration mode and the rotational position of the drill mode, and the front-rear movement of the clutch hub 370 (movement between the vibration-off position and the vibration-on position) can be suitably achieved without relying on the screw engagement between the clutch dial 300 and the nut 260.

(12) As shown in FIGS. 22B and FIG. 22C, the inclination parts 374, 413 are provided on two side parts of the locking convex part 373 of the clutch hub 370 and the locking convex part 412 of the rear ratchet 410 in the peripheral direction, making it difficult for the clutch hub 370 to move from the vibration-on position to the vibration-off position. In the vibration-on position, if a force in the rotational direction is applied to the rear ratchet 410, through the engagement of the inclination parts 374, 413, a forward force is applied to the clutch hub 370, and the movement to the vibration-off position becomes difficult. Consequently, unintentional movement of the clutch hub 370 to the vibration-off position due to vibration, etc., is suppressed.

(13) The motor spacer 40, the rear case 60, and the gear case 140 are fixed with four screws 44, a high-rigidity transmission part housing is formed, so deformation when the clutch mechanism operates is suppressed. On the other hand, there is a gap between the outer surface of the rear case 60 and the two screws 44 on the upper side, and the shift arm 71 extends through the gap to the guide hole 64 of the rear case 60. As a result, compared to the structure where the shift arm 71 extends to the guide hole 64 of the rear case 60 passing the outer side of the screws 44 in the radial direction of the rear case 60, the structure suppresses the enlargement of the motor accommodation part 11 that covers the further outer side of the shift arm 71, and the enlargement of the product can be suppressed.

(14) The two screws 44 on the upper side have portions extending the outer side of the rear case 60 in the front-rear direction. The portions are inserted through screw collars 45, which are tubular parts separate from the rear case 60. As a result, the bending or damage of the motor spacer 40 due to over-tightening of the upper two screws 44 is suppressed.

(15) The front case 340 includes the stopping convex part 350 for the sub-handle 600, suppressing the sub-handle 600 from coming off in the forward direction due to the vibration during operation. The operability is favorable.

(16) The sub-handle 600 includes the mounting part 601 that engages with the front case 340 of the work machine 1 and has an annular shape having the gap 614 in a portion in the peripheral direction. The length of the gap 614 is adjustable within a predetermined range including a length longer than the natural length. As a result, even in the case where attachment and detachment are difficult due to interference with, for example, the stopping convex part 350 of the front case 340 when the length of the gap 614 is in the state of natural length, the attachment and detachment are still possible by adjusting the length of the gap 614 to be longer than the natural length.

(17) The first shaft part 602 and the second shaft part 603 are in screw engagement with each other, and the length of the gap 614 can be adjusted by rotating the grip part 604 provided on the second shaft part 603. Consequently, the adjustment of the length of the gap 614 is easy, and the usability is favorable.

(18) The pin 607 extending within the pin through groove 620 of the second shaft part 603 prevents the second shaft part 603 from moving in the gap length direction relative to the second tubular part 613 of the mounting part 601. Since the pin 607 allows the second shaft part 603 to rotate, the adjustment of the length of the gap 614 by rotating the second shaft part 603 is not affected.

(19) The O-ring 609 generates frictional resistance relative to the rotation of the second shaft part 603 relative to the second tubular part 613. Therefore, the second shaft part 603 is suppressed from rotating easily, and the operability is favorable.

(20) The length of the screw engagement between the male screw part 622 of the first shaft part 602 and the nut 623 of the second shaft part 603 is set such that the upper limit of the length of the gap 614 is within a predetermined length that does not damage the mounting part 601. As a result, regardless of the user's operation, the damage to the mounting part 601 due to excessive widening of the gap 614 can be suppressed, and the usability is favorable.

(21) The mounting part 601 includes the first rotation stopping concave part 616 with a long peripheral length and the second rotation stopping concave part 617 with a short peripheral length. When the second rotation stopping concave part 617 and the rotation stopping convex part 349 of the front case 340 are in concavo-convex engagement, the peripheral lengths thereof are substantially equal. Therefore, the sub-handle 600 can be mounted to the front case 340 with no or minimal rattling, and the operation can be carried out stably. On the other hand, when the first rotation stopping concave part 616 of the mounting part 601 and the rotation stopping convex part 349 of the front case 340 are in concavo-convex engagement, the length of the first rotation stopping concave part 616 in the peripheral direction is longer than the length of the rotation stopping convex part 349 in the peripheral direction. As a result, the sub-handle 600 can rotate within a predetermined angular range relative to the work machine 1 in the storage state, as shown in FIGS. 39A and 39C. That is, the mounting state can be fine-tuned. As a result, the operability of storing the sub-handle 600 on the work machine 1 is improved. Assuming that the angle during storage cannot be changed from the angle shown in FIG. 39C, the flange part 625 of the grip part 604 may interfere with the battery pack 25 or the battery pack mounting part 13, making storage difficult. However, this embodiment can appropriately address such issue.

(22) Even in the case where the first rotation stopping concave part 616 of the mounting part 601 is in concavo-convex engagement with the rotation stopping convex part 349 of the front case 340, by making the gap 614 of the mounting part 601 shorter than or equal to the predetermined length less than the natural length, the sub-handle 600 becomes unable to rotate relative to the front case 340 due to the frictional force caused by the mounting part 601 tightening the front case 340. As a result, the rattling of the sub-handle 600 in the storage state can be suppressed as needed. Additionally, even in the case where the first rotation stopping concave part 616 of the mounting part 601 is configured to be used when the work machine 1 is in use, rattling during operation can also be suppressed.

The invention has been described above using embodiments as examples, but the invention is not limited to the embodiments. Various modifications are possible within the scope described in the claims for each matter specifically described in the embodiments.

The concavo-convex structure exemplified in the embodiment may have the relationship between the concave part and the convex part appropriately reversed. For example, the structure may be configured such that the rear stopper cam ring 210 includes a convex part, and the front stopper cam ring 230 includes a concave part that engages with the convex part. Similarly, the structure may be configured such that the ratchet cam ring 280 includes a concave part, and the clutch dial 300 includes a convex part that engages with the concave part.

The specific numbers exemplified in the embodiment, such as the number of the outer peripheral convex parts 91 of the final ring gear 90, the number of the stopper blocks 120, the number of the screws 44 and 133, the number of the stages of set tightening torque, the number of the types of attachment angles of the sub-handle 600 to the work machine 1, and the number of the first rotation stopping concave parts 616 and the second rotation stopping concave parts 617, do not in any way limit the scope of the invention and can be arbitrarily changed according to the required specifications.

What is claimed is:

1. A work machine, comprising:

a motor, having a motor shaft extending in a front-rear direction;

an output part, having a tip tool holding part extending in the front-rear direction and a bearing part supporting the tip tool holding part, the output part being positioned in front of the motor, a transmission part, configured as a transmission part that transmits a driving force of the motor to the tip tool holding part, and detachably assembled to the output part; and an output switching part, configured as an output switching part that switches an output of the output part, and disposed between the output part and the transmission part, wherein when the transmission part is removed from the output part, the output switching part is able to be removed from the output part, and the bearing part of the output part includes a first bearing and a second bearing disposed in front of the first bearing, the first bearing rotatably supporting a rear part of the tip tool holding part, and the second bearing rotatably supporting an intermediate part of the tip tool holding part.

2. The work machine as claimed in claim 1, comprising:

a fixing part, fixing the output part and the transmission part, wherein when fixation by the fixing part is released, the transmission part is able to be removed from the output part.

3. The work machine as claimed in claim 2, wherein the transmission part comprises:

a transmission mechanism, comprising a gear; and a transmission part housing, accommodating the transmission mechanism, wherein, a transmission-part housing-side installation part is provided on the transmission part housing for attaching the fixing part to the output part.

4. The work machine as claimed in claim 3, wherein the output part has an output part housing that holds the tip tool holding part and the bearing part, and an output-part housing-side installation part to which the fixing part is attached is provided on the output part housing.

5. The work machine as claimed in claim 4, wherein the fixing part is a screw, the transmission-part housing-side installation part is a through hole through which the screw penetrates, and the output-part housing-side installation part is a hole with which the screw is screwed.

6. The work machine as claimed in claim 2, wherein, in the front-rear direction, ranges where at least a portion of the fixing part and the output switching part are present overlap with each other.

7. The work machine as claimed in claim 1, wherein the tip tool holding part comprises:

a spindle, connected with the transmission part; and a chuck, holding a tip tool and integrally rotating with the spindle.

8. The work machine as claimed in claim 7, comprising a clutch mechanism that interrupts rotation transmission from the transmission part to the spindle at a predetermined torque, wherein the output switching part comprises a switching operation part able to switch the predetermined torque.

9. A work machine, comprising:

a motor, having a motor shaft extending in a front-rear direction;

an output part, having a tip tool holding part extending in the front-rear direction and a bearing part supporting the tip tool holding part, the output part being positioned in front of the motor;

a transmission part, configured as a transmission part that transmits a driving force of the motor to the tip tool holding part, and detachably assembled to the output part; and an output switching part, configured as an output switching part that switches an output of the output part, and disposed between the output part and the transmission part, wherein the output part is configured to support a spindle connected with the transmission part, and the bearing part of the output part includes a first bearing and a second bearing disposed in front of the first bearing, the first bearing rotatably supporting a rear part of the tip tool holding part, and the second bearing rotatably supporting an intermediate part of the tip tool holding part.

* * * * *